United States Patent
Pratt et al.

[11] Patent Number: 6,154,561
[45] Date of Patent: Nov. 28, 2000

[54] METHOD AND APPARATUS FOR DETECTING MURA DEFECTS

[75] Inventors: William K. Pratt, Los Altos; Sunil S. Sawkar, Fremont, both of Calif.

[73] Assignee: Photon Dynamics, Inc., San Jose, Calif.

[21] Appl. No.: 09/019,279

[22] Filed: Feb. 4, 1998

Related U.S. Application Data

[60] Provisional application No. 60/041,908, Apr. 7, 1997.

[51] Int. Cl.[7] .................................................. G06K 9/00
[52] U.S. Cl. ...................... 382/141; 382/149; 345/904; 348/125
[58] Field of Search ................................ 382/141, 145, 382/149, 274, 275, 264; 345/191, 904; 324/770; 348/125, 126; 356/237.2

[56] References Cited

U.S. PATENT DOCUMENTS

| | | | |
|---|---|---|---|
| 4,870,357 | 9/1989 | Young et al. | 324/158 R |
| 5,325,443 | 6/1994 | Beatty et al. | 382/8 |
| 5,339,093 | 8/1994 | Kumagai et al. | 345/149 |
| 5,588,068 | 12/1996 | Longest et al. | 382/141 |
| 5,650,844 | 7/1997 | Aoki et al. | 356/237 |
| 5,717,780 | 2/1998 | Mitsumune et al. | 382/141 |
| 5,917,934 | 6/1999 | Chiu et al. | 382/149 |
| 5,917,935 | 6/1999 | Hawthorne et al. | 382/149 |
| 5,966,458 | 10/1999 | Yukawa et al. | 382/141 |

*Primary Examiner*—Bhavesh Mehta
*Attorney, Agent, or Firm*—Townsend and Townsend and Crew LLP

[57] ABSTRACT

A method for locating blobs in an image, includes the steps of: forming a blob reference mask from the image, the blob reference mask including a portion indicating a portion of the image containing a first blob, if any, and forming a reference image from the image, the reference image corresponding to the image. The method also includes the steps of forming a modified image from the image by replacing the portion of the image containing the first blob, if any, with a portion of the reference image corresponding to the portion of the image, and locating a second blob in the image in response to the modified image.

38 Claims, 58 Drawing Sheets

If phase 1 size count is greater than S :

Reject all blobs.

If phase 1 size count is less than or equal to S :

Create bounding box, which encloses all vertically oriented blobs that are of height $H_1$ or greater and are in the same column region of width $W_1$ or less.

Set all pixels in bounding box of Phase 1 segmentation mask to FALSE state.

Classify bounding box as S-line [Class 1] and set classification mask to value 1.

Reject all remaining blobs, and erase them from Phase 1 segmentation mask.

Compute individual blob measures.

FIG. 11

If phase 2 size count is greater than S :

Reject all blobs.

If phase 2 size count is less than or equal to S :

Create bounding box, which encloses all horizontally oriented blobs that are of width $W_2$ or greater and are in the same row region of width $H_2$ or less.

Set all pixels in bounding box of Phase 2 segmentation mask to FALSE state.

Classify bounding box as G-line [Class 2] and set classification mask to value 2.

Reject all remaining blobs, and erase them from Phase 2 segmentation mask.

Compute individual blob measures.

FIG. 14

If phase 3 size count is less than $S_3$:

Reject all blobs.

If phase 3 size count is greater than or equal to $S_3$:

Classify all blobs as straw mura [Class 3] and set classification mask to value 3.

After Phase 11 is complete, create a super bounding box, which encloses all blobs.

Compute blob measures of super bounding box.

FIG. 17B

If phase 4 size count is greater than $S_4$:

Reject all blobs.

If phase 4 size count is less than or equal to $S_4$:

If no straw mura blobs were detected in Phase 3:

Classify all blobs not touching a border and of size $W_4 \times H_4$ or smaller as white interior spot [Class 4] and set classification mask to value 4.

Classify blobs within $W_5 \times H_5$ corner region as white corner spot [Class 5] and set classification mask to value 5.

Classify all non-corner blobs touching a border within distance $D_6$ from the border as white border bloom [Class 6] and set classification mask to value 6.

If straw mura blobs were detected in Phase 3:

Classify all interior blobs as straw mura [Class 3] and set classification mask to value 3.

Reject all remaining blobs, and erase them from Phase 4 segmentation mask.

FIG. 20

If phase 5 size count is greater than $S_5$:

Reject all blobs.

If phase 5 size count is less than or equal to $S_5$:

If no straw mura blobs were detected in Phase 3:

Classify all blobs not touching a border and of size $W_7 \times H_7$ or smaller as black interior spot [Class 7] and set classification mask to value 7.

Classify blobs within $W_8 \times H_8$ corner region as black corner spot [Class 8] and set classification mask to value 8.

Classify all non-corner blobs touching a border within distance $D_9$ from the border as black border bloom [Class 9] and set classification mask to value 9.

If straw mura blobs were detected in Phase 3:

Classify all interior blobs as straw mura [Class 3] and set classification mask to value 3.

Reject all remaining blobs, and erase them from Phase 5 segmentation mask.

FIG. 23

If phase 6 size count is greater than $S_6$ :

Reject all blobs.

If phase 6 size count is less than or equal to $S_6$ :

If straw mura blobs were detected in Phase 3:

Reject all blobs.

If no straw mura blobs were detected in Phase 3:

Classify all blobs that are of length $L_{10}$ or greater as horizontal line mura [Class 10] and set classsifciation mask to value 10.

Reject all remaining blobs.

Compute individual blob measures.

FIG. 26

If phase 7 size count is greater than $S_7$:

Reject all blobs.

If phase 7 size count is less than or equal to $S_7$:

If straw mura blobs were detected in Phase 3:

Reject all blobs.

If no straw mura blobs were detected in Phase 3:

Classify all blobs that are of length $L_{11}$ or greater as vertical line mura [Class 11] and set classifciation mask to value 11.

Reject all remaining blobs.

Compute individual blob measures.

FIG. 29

If phase 8 size count is greater than $S_8$:

Reject all blobs.

If phase 8 size count is less than or equal to $S_8$:

If straw mura blobs were detected in Phase 3:

Reject all blobs.

If no straw mura blobs were detected in Phase 3:

Classify all blobs that are of length $L_{12}$ or greater as positive diagonal line mura [Class 12] and set classsifciation mask to value 12.

Reject all remaining blobs.

Compute individual blob measures.

FIG. 32

If phase 9 size count is greater than $S_9$:

Reject all blobs.

If phase 9 size count is less than or equal to $S_9$:

If straw mura blobs were detected in Phase 3:

Reject all blobs.

If no straw mura blobs were detected in Phase 3:

Classify all blobs that are of length $L_{13}$ or greater as negative diagonal line mura [Class 13] and set classsifciation mask to value 13.

Reject all remaining blobs.

Compute individual blob measures.

FIG. 35

If phase 10 size count is greater than $S_{10}$:

Reject all blobs.

If phase 10 size count is less than or equal to $S_{10}$:

Classify all horizontally oriented blobs that are of width $W_{18}$ or greater and height $H_{18}$ or less as horizontal blocking [Class 18] and set classsifciation mask to value 18.

Reject all remaining blobs.

Compute individual blob measures.

FIG. 40

If phase 11 size count is greater than $S_{11}$:

Reject all blobs.

If phase 11 size count is less than or equal to $S_{11}$:

Classify all vertically oriented blobs that are of height $H_{19}$ or greater and width $W_{19}$ or less as vertical blocking [Class 19] and set classsifciation mask to value 19.

Reject all remaining blobs.

Compute individual blob measures.

FIG. 43

If phase 12 size count is greater than $S_{12}$:

Reject all blobs.

If phase 12 size count is less than or equal to $S_{12}$:

If straw mura blobs were detected in Phase 3:

Classify all blobs as straw mura [Class 3] and set classification mask to value 3.

If no straw mura blobs were detected in Phase 3:

If phase count is greater than $C_{12}$:

Classify all blobs touching a border less than or equal to distance $D_{14}$ from the border as white border bloom [Class 6] and set classification mask to value 6.

Classify all blobs touching a border greater than or equal to distance $D_{14}$ from the border and classify it as a bright region collection [Class 15] and set classification mask to value 15.

Create a super bounding box, which encloses all non-border blobs and classify it as a bright region collection [Class 15] and set classification mask to value 15.

Computer blob statistics of super bounding box.

If phase count is less than or equal to $C_{12}$:

Classify all blobs not touching a border as bright region mura [Class 14] and set classification mask to value 14.

Classify all blobs touching a border less than or equal to distance $D_{14}$ from the border as white bloom [Class 6] and set classification mask to value 6.

Classify all blobs touching a border extending greater than distance $D_{14}$ from the border as bright region mura [Class 14] and set classification mask to value 14.

Compute individual blob statistics.

FIG. 47

If phase 13 size count is greater than $S_{13}$:
    Reject all blobs.

If phase 13 size count is less than or equal to $S_{13}$:
    If straw mura blobs were detected in Phase 3

Classify all blobs as straw mura [Class 3] and set classification mask to value 3.

If no straw mura blobs were detected in Phase 3:

If phase count is greater than $C_{11}$:
            Classify all blobs touching a border less than or equal to distance $D_{16}$ from the border as darke border bloom [Class 9] and set classification mask to value 9.

Create a super bounding box, which encloses all non-border blobs and classify it as a dark region collection [Class 17] and set classification mask to value 17.

Computer blob statistics of super bounding box.

If phase count is less than or equal to $C_{16}$:
            Classify all blobs not touching a border as dark region mura [Class 16] and set classification mask to value 16.

Classify all blobs touching a border less than or equal to distance $D_{16}$ from the border as dark bloom [Class 9] and set classification mask to value 9.

Classify all blobs touching a border extending greater than distance $D_{16}$ from the border as dark region mura [Class 16] and set classification mask to value 16.

Compute individual blob statistics.

FIG. 50

If phase 14 size count is greater than $S_{14}$:

Reject all blobs.

If phase 14 size count is less than or equal to $S_{14}$:

Classify all blobs touching a designated border of width $W_{21}$ or less and height $H_{21}$ or less as bright border non-uniformity [Class 21] and set classification mask to value 21.

Classify all remaining blobs as bright region non-uniformity [Class 20] and set classification mask to value 20.

Compute individual blob statistics.

FIG. 53

If phase 15 size count is greater than $S_{15}$:

Reject all blobs.

If phase 15 size count is less than or equal to $S_{15}$:

Classify all blobs touching a designated border of width $W_{23}$ or less and height $H_{23}$ or less as dark border non-uniformity [Class 23] and set classification mask to value 23.

Classify all remaining blobs as dark region non-uniformity [Class 22] and set classification mask to value 22.

Compute individual blob statistics.

FIG. 56 ured Mura defects during subsequent processing runs. However,
METHOD AND APPARATUS FOR DETECTING MURA DEFECTS This application claims benefit of Provisional application Ser. No. 60/041,908 filed Apr. 7, 1997.

BACKGROUND OF THE INVENTION

The present invention relates to methods and apparatus for detecting multiple types of defects in an image. More specifically, the present invention relates to methods and apparatus for detecting defects having different levels of contrast on an image of a substrate. Typical substrates include liquid crystal displays (LCDs), plasma displays, semiconductor wafers, textiles, lumber, and the like.

The use of a flat panel liquid crystal displays (FPLCD), plasma displays, and other types of displays continues to grow rapidly. Consumer items such as portable televisions, video recorders, notebook computers, handheld computers, personal digital assistants (PDAs), engineering workstations, high-definition televisions (HDTV), watches, and the like use such displays. Based upon the continued demand for such displays, industry has made massive capital investments in creating state-of-art manufacturing lines.

Despite such capital outlay, however, the industry still relies primarily upon human test operators to perform the final test and inspection of such substrates. The test operator performs a variety of visual inspections of each display for defects and accepts or rejects the display based upon the operator's perceptions. Such inspection includes, non-exclusively, pixel-based defects, such as pixels that are inoperative, and area-based defects, such as areas on the display where pixels are brighter or darker than surrounding pixels. The quality and completeness of the inspection is dependent on the individual test operator, who has been trained using limited samples of displays that are characterized as passing or failing. Accordingly, the inspection results are highly subjective, prone to error, and cannot be used consistently and efficiently to monitor, control, and improve the quality of the various manufacturing processes. In addition, the subjective testing criteria results in a lack of industry wide quality standards.

Effective process monitoring and control of display production cycles is possible only through quantitative inspection methods by way of automatic inspection machines. An example of one of the first automatic inspection machines was conceived by Photon Dynamics, Inc. (PDI) in 1992, assignee of the present application. FIG. 1 shows its roles during the final testing stages of a substrate such as the FPLCD manufacturing processes 10. The FPLCD undergoes steps from cell completion 20, first inspection via flat panel inspection system 30, module assembly 40, second inspection via flat panel inspection system 50, shipment 60, and incoming inspection via flat panel inspection system 70. A communication network 80 provides an interface between each of the inspections at the flat panel inspection system and a process control work-station 90.

Mura Defect

"Mura" defects are area-based contrast-type defects, where a group of pixels is brighter or darker than surrounding pixels, when they should be uniform. Mura defects are also known as "Alluk" defects. Generically, such contrast-type defects are termed "blobs" until they are classified as Mura defects. There are many stages in the manufacturing process where problems may result in Mura defects on the display. In the case of a FPLCD, such problems include mis-registration of a source or a gate line, contaminants between layers in the display, non-uniform liquid crystal layer, and others, as will be described below.

Different types of manufacturing problems typically result in Mura defects having different characteristic shapes. In the case of a FPLCD, for example, a source line registration problem causes vertical streaks on an display. Further, different types of manufacturing problems typically result in Mura defects having different levels of contrast. In the example of a FPLCD, a gate line registration problem causes high-contrast horizontal streaks on an display, and a non-uniform liquid crystal layer causes a low-contrast straw-type pattern. Further description of typical Mura defect characteristics and associated manufacturing problems can be found in co-pending application Ser. No. 08/651,417, filed May 22, 1996, now U.S. Pat. No. 5,917,935, assigned to the present assignee. Application Ser. No. 08/651,417, now U.S. Pat. No. 5,917,935 is herein by incorporated by reference for all purposes.

Because certain manufacturing problems cause certain types of Mura defects, identification and, elimination of such manufacturing problems often leads to the reduction of Mura defects during subsequent processing runs. However, it is often difficult to recognize low-contrast Mura defects in images when higher-contrast defects are also present. As a result, false-positive or false-negative identification of Mura defects often results in misidentification of sources or causes of the defects.

What is needed are improved techniques and apparatus for detecting Mura defects.

SUMMARY OF THE INVENTION

The present invention discloses methods and apparatus for detecting blobs on an image of a substrate.

According to a preferred embodiment of the present invention, a method for locating blobs in an image, includes the steps of forming a blob reference mask from the image, the blob reference mask including a portion indicating a portion of the image containing a first blob, if any, and forming a reference image from the image, the reference image corresponding to the image. The method also includes the steps of forming a modified image from the image by replacing the portion of the image containing the first blob, if any, with a portion of the reference image corresponding to the portion of the image, and locating a second blob in the image in response to the modified image.

According to another embodiment a computer program product for a system including a plurality of processors for locating blobs in an image, each of the plurality of processors configurable into more than one group of processors, includes a computer-readable memory that includes code that directs a first group of processors to form a blob reference mask from the image, the blob reference mask including a portion indicating a portion of the image containing a first blob, if any, code that directs a second group of processors to form a reference image from the image, the reference image corresponding to the image, code that directs a third group of processors to form a modified image from the image by replacing the portion of the image containing the first blob, if any, with a portion of the reference image corresponding to the portion of the image, and code that directs a fourth group of processors to locate a second blob in the image in response to the modified image.

According to yet another embodiment of the present invention, a system for locating blobs in an image, includes an image masking unit for forming a blob reference mask from the image, the blob reference mask including a portion indicating a portion of the image containing a first blob, if any, and a reference unit for forming a reference image from the image, the reference image corresponding to the image. The system also includes a modifying unit for forming a modified image from the image by replacing the portion of the image containing the first blob, if any, with a portion of the reference image corresponding to the portion of the image, and a locating unit for locating a second blob in the image in response to the modified image.

Further understanding of the nature and advantages of the invention may be realized by reference to the remaining portions of the specification and drawings.

BRIEF DESCRIPTION OF THE DRAWINGS

FIG. 11 illustrates a process for removing blobs from a first segmentation mask, according to an embodiment of the present invention;

FIG. 14 illustrates a process for removing blob from a second segmentation mask, according to an embodiment of the present invention;

FIG. 17b illustrates a process for removing blob from a third segmentation mask, according to an embodiment of the present invention;

FIG. 20 illustrates a process for removing blobs from a fourth segmentation mask, according to an embodiment of the present invention;

FIG. 23 illustrates a process for removing blobs from a fifth segmentation mask, according to an embodiment of the present invention;

FIG. 26 illustrates a process for rejecting blobs from the sixth segmentation mask, according to an embodiment of the present invention;

FIG. 29 illustrates a process for rejecting blobs from the seventh segmentation mask, according to an embodiment of the present invention;

FIG. 32 illustrates a process for rejecting blobs from the eighth segmentation mask, according to an embodiment of the present invention;

FIG. 35 illustrates a process for rejecting blob from the ninth segmentation mask, according to an embodiment of the present invention;

FIG. 40 illustrates a process for rejecting blobs from the tenth segmentation mask, according to an embodiment of the present invention;

FIG. 43 illustrates a process for rejecting blobs from the eleventh segmentation mask, according to an embodiment of the present invention;

FIG. 47 illustrates a process for characterizing blobs from the twelfth segmentation mask, according to an embodiment of the present invention;

FIG. 50 illustrates a process for characterizing blobs from the thirteenth segmentation mask, according to an embodiment of the present invention;

FIG. 53 illustrates a process for characterizing blobs from the fourteenth segmentation mask, according to an embodiment of the present invention;

FIG. 56 illustrates a process for characterizing blobs from the fifteenth segmentation mask, according to an embodiment of the present invention;

DESCRIPTION OF SPECIFIC EMBODIMENTS

I. Glossary

The following terms are intended to have the following general meanings as described herein.

A. Mura Defects: Examples and Definitions

Mura defects are defined as areas of illumination (pixels on the substrate) which are different, or anomalous, from the neighborhood surrounding the defect, also termed Patterned Brightness Non-Uniformity (BNU). The BNU is generally measured by an image acquisition device position normal to the substrate and is generally of very low contrast. Regions of a substrate often include pixels that appear either brighter or darker than pixels surrounding the region, and are classified as Mura defects when specific contrast threshold limits, BNUs, are reached or exceeded. Boundaries for Mura defects are not always well defined even within a Mura defect. Further, the BNU within a Mura defect may not be homogenous.

Pixel defects, in comparison, are defined as points of illumination that exceed or are lower than the neighboring pixels of the respective pixels. Pixel defects may include individual pixels, clustered pixels, or line segments of pixels that are obvious when visually inspected.

A priori knowledge regarding characteristic appearance, size, shape, contrast, etc. of Mura defects enables facilitated detection of Mura defects. Two exemplary types of Mura classes, line Mura defects and area Mura defects, are described below and illustrated by FIGS. 2 and 3, respectfully.

Figure 1:
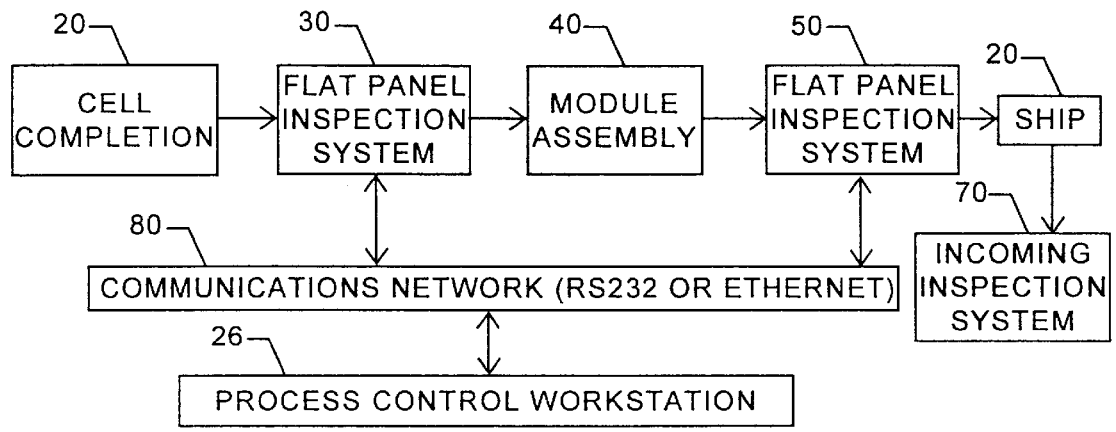
FIG. 1 shows its roles during the final testing stages of the FPLCD manufacturing processes.
Figure 2:
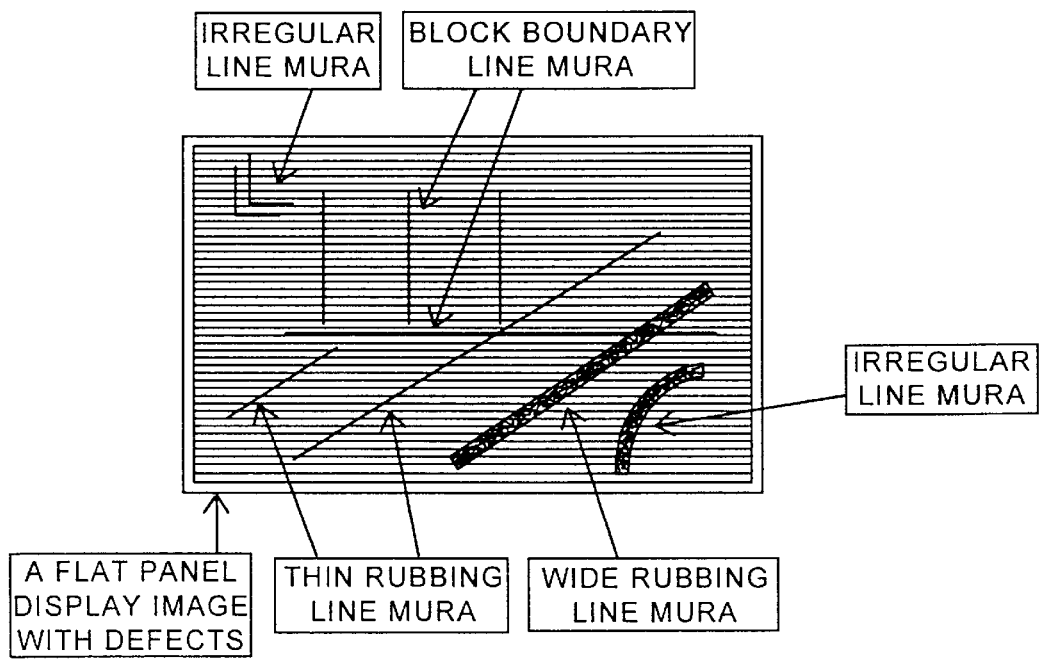
FIG. 2 illustrates typical line Mura defects.

1. Line Mura Defects FIG. 2 illustrates typical line Mura defects. A line Mura defect is defined as a narrow straight or curved strip of illumination which is different from its neighborhood. In other words, pixels making-up a line Mura defect have anomalous pixels values, compared to values of pixels surrounding the line Mura defect. The defect may originate and terminate anywhere within the substrate and can run across the entire length of the substrate. The line Mura defect is classified by the length and width of the strip and the angle of occurrence. Typically, such defects have a length-to-width ratio exceeding twenty. There are several types of line Mura defects that are classified according to their shape, size, and position, below. Typical manufacturing processes that cause these defects are also listed.

a) Rubbing Line Mura, "Straw Mura"
      i) Thin short or long line segments at rubbing angles anywhere within the panel.
      ii) Wide short or long line segments as above.
      Note: The two rubbing line Mura types may occur either singly or in groups and are related to the alignment layer rubbing process due to imperfections in the surface of the mechanical rollers used in the rubbing process.
   b) Irregular Line Mura
      Arcs and L-shaped line segments that appear anywhere within the panel area.
      Note: The irregular line Mura is often caused by particle or fiber contamination trapped between the polarizer and the glass, by cleaning process residue or by alignment layer rubbing process.
   c) Block Boundary Line Mura
      Thin long lines that run the length of driver blocks of the panel, horizontal or vertical, perpendicular to the panel edges.
      Note: The block boundary line Mura is often caused by improper driver block voltages.

2. Area Mura Defects

Figure 3:
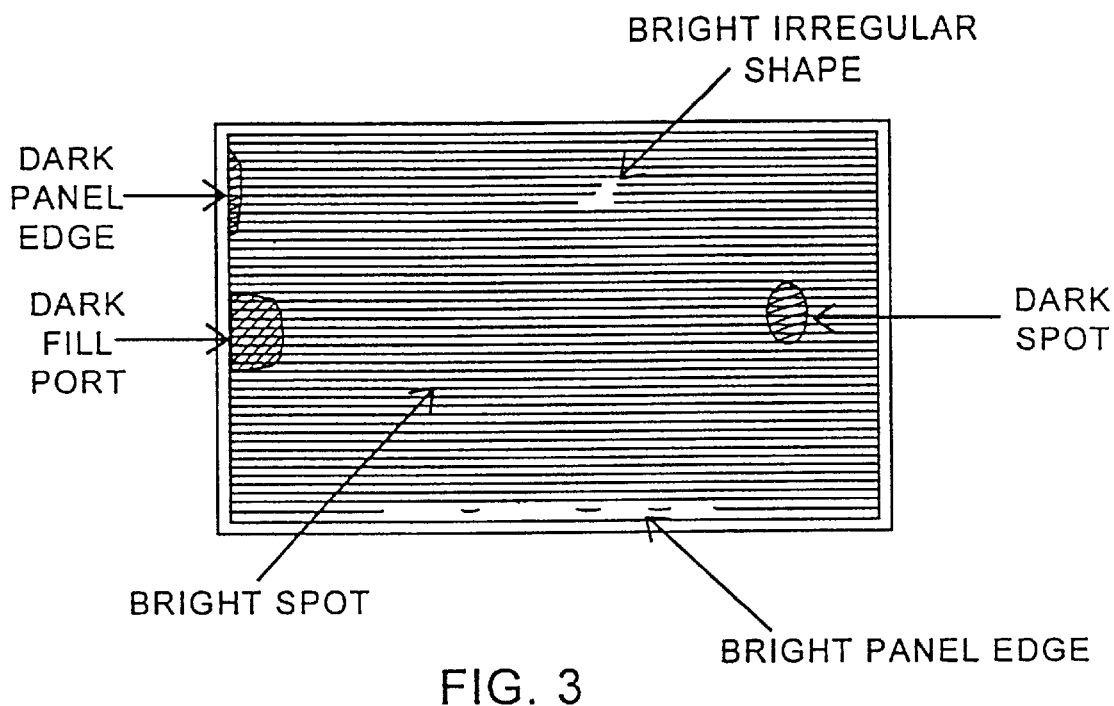
FIG. 3 illustrates typical area Mura defects.

FIG. 3 illustrates typical area Mura defects. An area Mura defect is defined as groups of illumination (pixels on the substrate) which are different from their neighborhood. In other words, pixels making-up an area Mura defect have anomalous pixel values, compared to values of pixels surrounding the area Mura defect. The area Mura defect range in size from approximately six pixels in diameter for spot shaped Mura to approximately 25% of the panel display area.

There are several types of area Mura defects that are classified according to their shape, size, and position, below. Typical manufacturing processes that cause these defects are also listed.

a) Spot Mura
      i) Elliptical shaped spot, ellipticity ratio can vary from a circle to almost a line.
      Note: The elliptical shaped spot Mura is often caused by cell gap variation or clustering of spacer balls.
      ii) Cluster type spot, circular in shape.
      Note: The cluster type spot Mura is often caused by electro-static charge built-up on spacer balls.
   b) Fill Port Mura
      i) Elliptical shape positioned at the fill port.
      ii) Multiple lines that arch away from the fill port.
      Note: Both types of fill port Mura are often caused by contamination of the liquid crystal material.

c) Panel Edge Mura
   i) Located around the entire perimeter of the panel active area.
   Note: The panel edge Mura is often caused by polarizer variations or local bleeding of uncured epoxy board material.
d) Irregular shape Mura
   i) Wavy arched shape ranges from small thick shape to more regular L shape.
   Note: The irregular shape Mura is often caused by fiber contamination trapped between the polarizer and the glass cleaning process residue or alignment layer rubbing process.

B. Image Processing Operations

The following are brief summaries of well-known image processing operations that are typically performed on a pixel by pixel basis and that are used in embodiments of the present invention. Typically, the following functions can be omnidirectional, e.g. square, or directional, e.g. horizontal. Thus for example, a vertical Sobel filter would enhance edges in the vertical direction, and a horizontal smoothing function would reduce edges in the horizontal direction. The following functions typically can be used for grayscale or binary (Boolean) images.

AND—An AND function provides the Boolean AND operation between two incoming binary images, on a pixel by pixel basis, to produce an output image.

Derivative of Gaussian—A Derivative of Gaussian filter is typically used for edge enhancement. To perform such a filter, a Derivative of Gaussian kernel is typically convolved with the image. For a typical 7×7 forming element, the typical values of one row of a horizontal derivative of Gaussian filter are as follows $\{1, 4, 3, 0, -3, -4, -1\}$.

Difference—A difference function subtracts a first incoming image from a second incoming image, on a pixel by pixel basis, to produce a signed difference image.

Kernel—A kernel is typically an array of values that is convolved with an image to perform various functions. Kernels can be formed in a square, rectangle, line, etc. Depending on the values in the Kernel, functions such as Sobel filters, smoothing filters, sharpening filters, etc. can be performed.

Magnitude—The Magnitude (Mag) function is equivalent to an absolute value function. This function removes or ignores the sign of a pixel value and returns the positive value of the pixel.

MAX—A MAX function returns the maximum pixel value from a region around a particular pixel, as the new value for the particular pixel.

MIN—A MIN function returns the minimum pixel value from a region around a particular pixel, as the new value for the particular pixel.

Morphological Opening—Opening is used typically to remove bright spots on an image. To perform a grayscale or binary opening function, typically a MIN function is performed on the image. Subsequently, a MAX function is performed on the image.

Morphological Closing—Closing is used typically to connect adjacent bright spots on an image. To perform a grayscale or binary closing function, typically a MAX function is performed on the image. Subsequently, a MIN function is performed on the image.

OR—An OR function provides the Boolean OR operation between two incoming binary images, on a pixel by pixel basis, to produce an output image.

Smoothing—Smoothing operations are used typically to reduce high frequencies from the image. To perform a smoothing operation, a smoothing kernel is typically convolved with the image. For a typical 3×3 forming element, the typical values of a smoothing filter are as follows $\{1, 1, 1, 1, 1, 1, 1, 1, 1\}$, with a scaling factor of $\frac{1}{9}$.

Sobel Operator—Sobel operators or filters are used typically for edge enhancement. To perform a Sobel filter, a Sobel kernel is typically convolved with the image. For a typical 3×3 forming element, the typical values of a vertical Sobel filter are $\{-\frac{1}{4}, -\frac{1}{2}, -\frac{1}{4}, 0, 0, 0, \frac{1}{4}, \frac{1}{2}, \frac{1}{4}\}$.

Sum—A Sum function adds a first incoming image to a second incoming image, on a pixel by pixel basis, to produce a summation image.

Threshold—A threshold typically produces a binary output image in response to a grayscale input image. To perform a threshold function, a threshold is first determined. The threshold may be user defined, or defined by the result of another function. The values of the binary image are typically the maximum or the minimum pixel value, for example, for an 8 bit image "high" pixels are set to intensity 255 and "low" pixels are set to intensity 0. The thresholds may be positive or negative, for example, for a 12 bit signed image, the threshold may be 125, −300, −150, etc.

XOR—An Exclusive Or (XOR) function is used herein in two ways. In the binary case, the XOR function provides conventional Boolean XOR functionality in response to incoming values on a pixel by pixel basis. For example, if two incoming pixels are both high or both low, the output is low, and if the two incoming pixels are high and low, respectively, the output is high.

In the grayscale case, the XOR function is used as an output selector on a pixel by pixel basis. For example, suppose inputs into the grayscale XOR function are images one, two, and three, and the output is four. Image three, is typically a binary reference image, whereas the other images are grayscale images. For example, in response to the regions where pixels in image three are high, the pixels in image four are set equal to the pixels in image one. Further, in response to the regions where pixels in image three are low, the pixels in image four are set equal to the pixels in image two.

Figure 13:
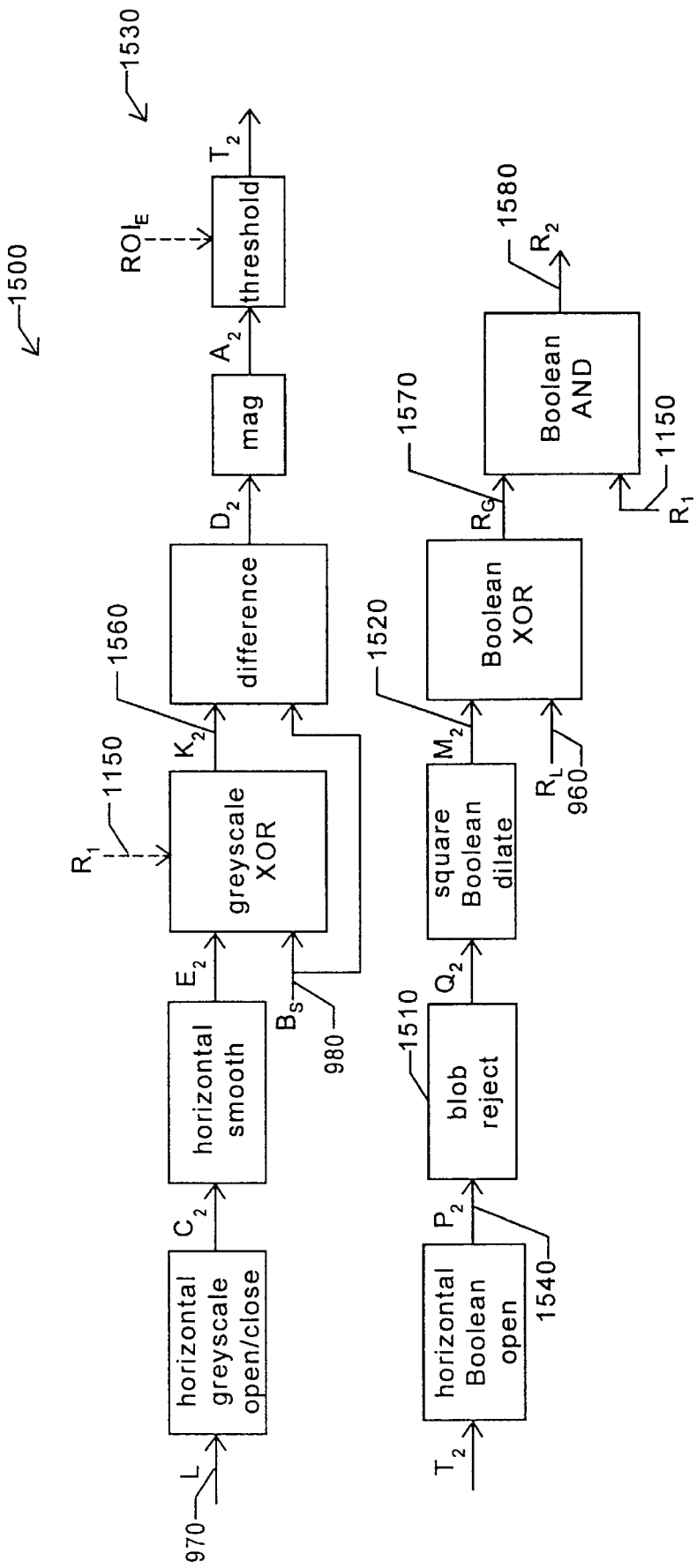
FIG. 13 illustrates a block diagram of a typical module in the segmentation block, according to an embodiment of the present invention.

An example of a grayscale XOR function can be seen in FIG. 13. As illustrated, E2 and BS 980 are the input images, R1 1150 is the binary image, and K2 1560 is the resulting image. In this example, in regions where pixels in R 1150 are high, pixels in K2 1560 are equal to corresponding pixels in E2, and in regions where pixels in R1 1150 are low, pixels in K2 1560 are equal to corresponding pixels in BS 980.

Figure 57A:
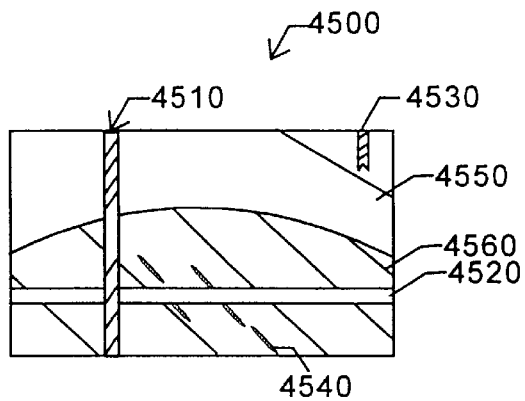
FIGS. 57*a*–*p* illustrate an example of the present invention.
Figure 57E:
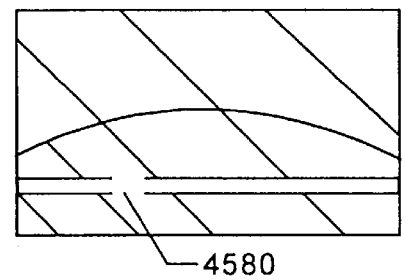
Figure 57B:
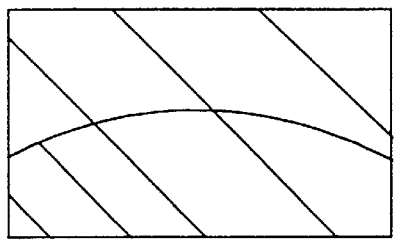
Figure 57F:
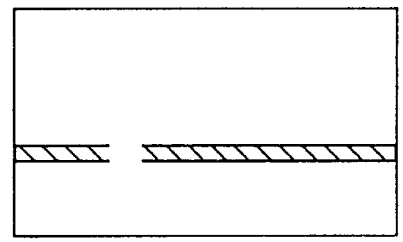
Figure 57C:
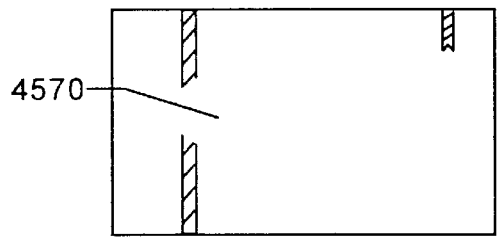
Figure 57G:
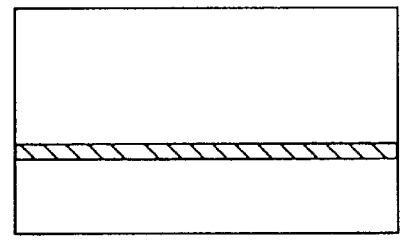
Figure 57D:
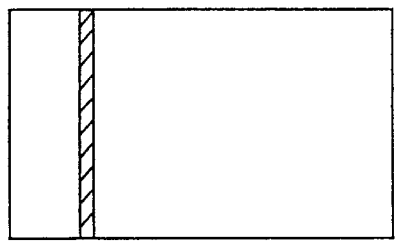
Figure 57H:
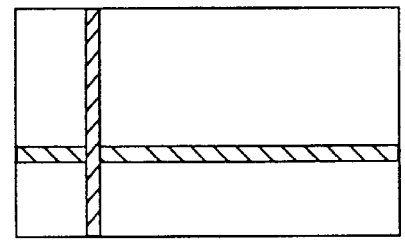
Figure 57I:
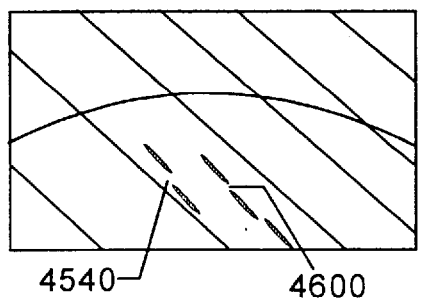
Figure 57M:
Figure 57J:
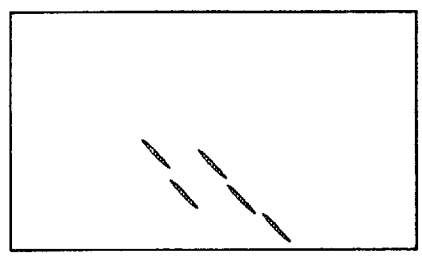
Figure 57N:
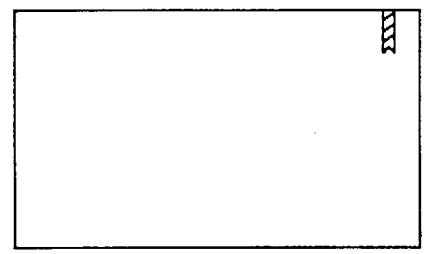

Another example of a grayscale XOR can be seen in FIGS. 57A, 57B, 57M, and 57N. In this example, FIGS. 57A and 57B are the input images, FIG. 57M is the binary reference image, and 57N is the resulting image. As illustrated, in regions where FIG. 57M is bright, active high, FIG. 57N is the same as FIG. 57A. Further, in regions where FIG. 57M is dark, active low, FIG. 57N is the same as FIG. 57B.

II. System Overview

Figure 4A:
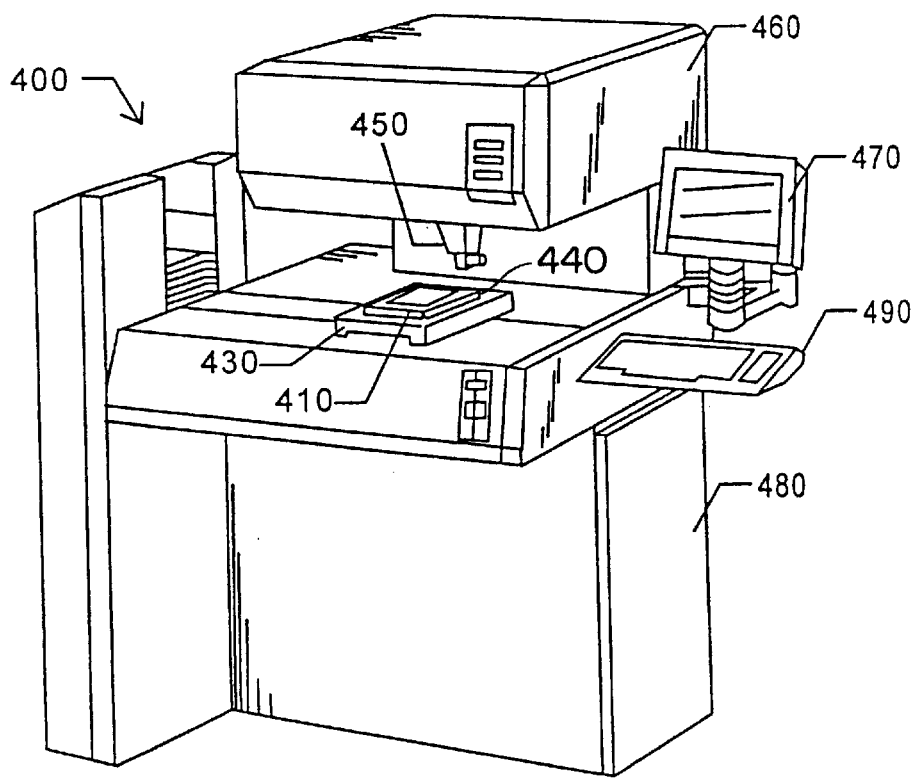
FIG. 4A is a simplified illustration of an embodiment of an inspection apparatus, according to the present invention.

FIG. 4A is a simplified illustration of an embodiment of an inspection apparatus 400 according to the present invention. The present invention is preferably embodied in a machine not yet available from Photon Dynamics, Inc. The inspection apparatus includes a flat panel display, such as an LCD panel 410 and the like. The LCD panel 410 is positioned on a slidable table 430, and a hinged frame 440 is brought down to secure the display panel in place. The slidable table 430 allows for easy positioning of the LCD panel in an x-y plane under a camera 450 such as a CCD-type camera and the like. The slidable table also allows for the LCD panel to be shifted relative to the camera. Alternatively, the camera is mounted onto an x-y plane to shift the camera relative to the LCD panel. A flexible ribbon type wire supplies drive signals from the pixel drive circuitry in the test system to conductors on the hinged frame 440. The camera 450 is preferably a high resolution camera, and is encased with an upper body 460 of the inspection apparatus. A monitor 470, a computer 480, and a keyboard 490 are also shown. The inspection apparatus includes a plurality of color filters, among other features. An example of such an inspection apparatus is in U.S. application Ser. No. 08/394,668 (Attorney Docket No. 14116-35-2), which is hereby incorporated by reference for all purposes.

The flat panel display (FPD) includes regularly patterned light emitting areas surrounded by light blocking borders. The light emitting areas are electrically addressed and are often referred to as pixels. The pixels are typically spaced equally from each other with opaque borders to form a two dimensional periodic pattern.

The CCD camera may have a construction similar to the flat panel display. Each of the pixels in the camera responds to light by converting an electrical signal (with a voltage) which is proportional to the amount of light that strikes the camera pixel. The camera pixel typically includes a border that does not respond to light. Each of the pixels are spaced equally from each other, and also form a two dimensional periodic pattern. The pattern of pixels forms discrete sampling points of light intensity that define the image impinging on the CCD camera.

Figure 4B:
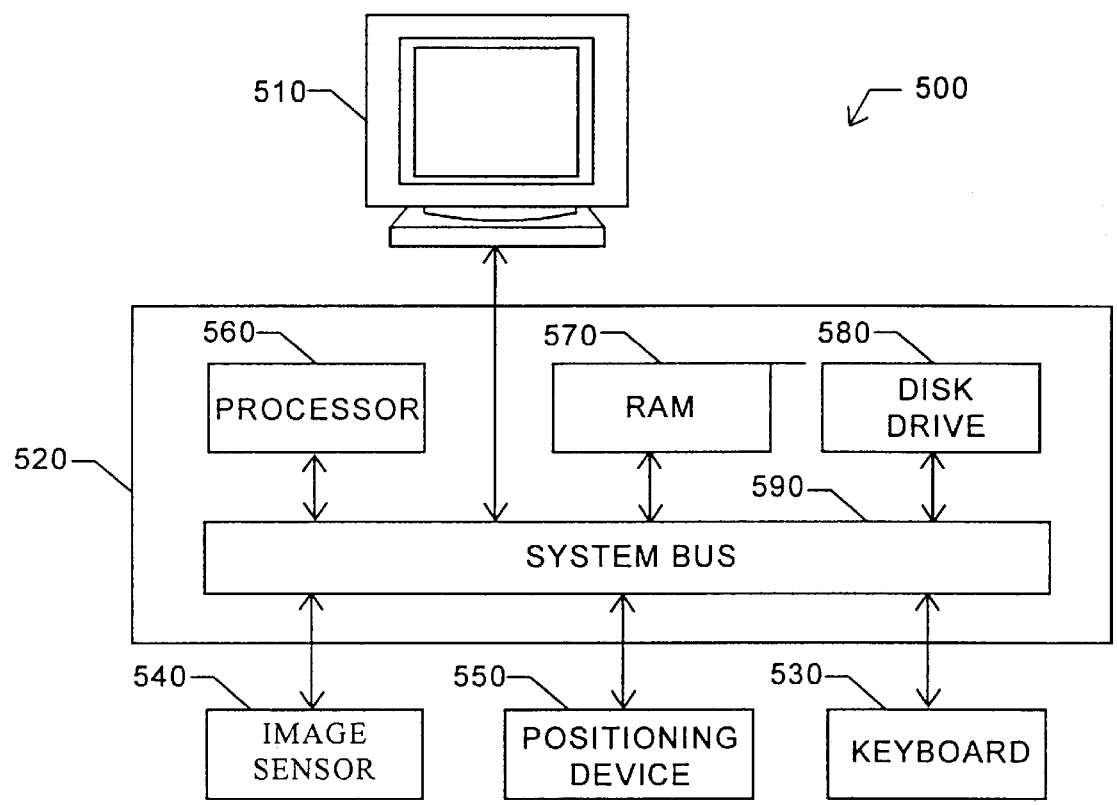
FIG. 4B is a block diagram of a system according to an embodiment of the present invention.

FIG. 4B is a block diagram of a system 500 according to an embodiment of the present invention. System 500 includes a monitor 510, a computer 520, a keyboard 530, a pointing device, an image sensor 540, and a positioning device 550. Computer 520 includes familiar computer components such as a processor 560, and memory storage devices, such as a random access memory (RAM) 570, a disk drive 580, and a system bus 590 interconnecting the above components. A network interface device (not shown) can be coupled to system bus 590 to provide system 500 with network access. Processor 560 may include specialized image processing hardware processors.

A mouse, a trackball, and a drawing tablet are examples of pointing devices. RAM 570 and disk drive 580 are examples of tangible media for storage of data and computer programs, other types of tangible media include floppy disks, removable hard disks, network servers, optical storage media such as CD-ROMS and bar codes, semiconductor memories such as flash memories, read-only-memories (ROMS), ASICs, and battery-backed volatile memories, and the like. The system bus may be a PCI bus, VME bus, or the like.

Positioning device 550 enables the user to position image sensor 540 relative to a substrate, as was previously described. An x-y stepper station is but one example of a well known positioning device.

Image sensor 540 allows the user to acquire an image of the substrate being inspected. Typical image sensors include CCD cameras, line scan cameras, and the like. In the preferred embodiment, image sensor 540 is a 2K×2K 10-bit CCD array camera from Kodak that acquires an image of a FPLCD, described above.

In an embodiment, System 500 includes a Sun SparcStation™ computer, running the Solaris™ operating system from Sun Microsystems, Inc. and proprietary software available from Photon Dynamics, Incorporated.

In another embodiment, System 500 includes a Sun Ultra computer running the Solaris operating system from Sun Microsystems, Inc. including Max PCI image processing accelerator boards from Datacube, Inc. and proprietary and software available from Photon Dynamics, Incorporated.

FIG. 4B is representative of but one type of system for embodying the present invention. It will be readily apparent to one of ordinary skill in the art that many system types and configurations are suitable for use in conjunction with the present invention.

III. Detailed Embodiment

A. Overview

Figure 5A:
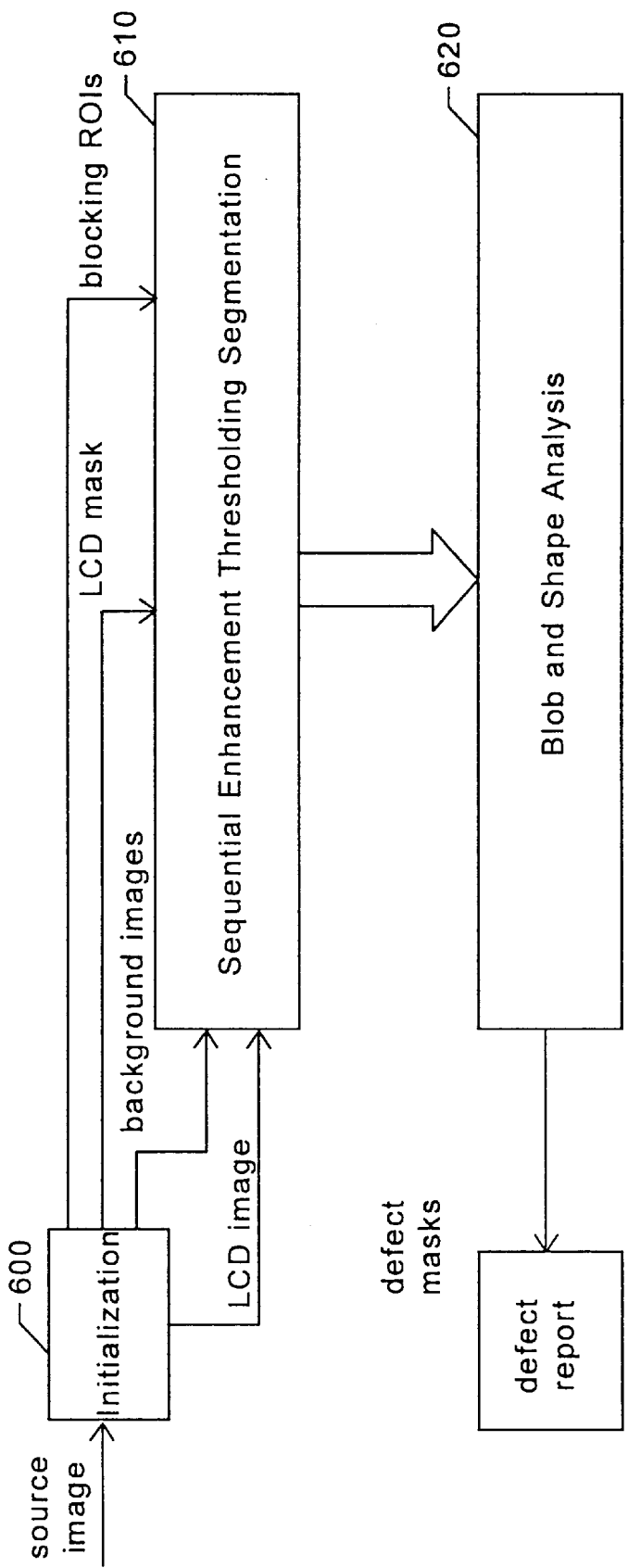
FIG. 5A illustrates a block diagram of a Mura detection architecture.

FIG. 5a illustrates a block diagram of a Mura detection architecture. FIG. 5a includes an initialization block 600, a sequential enhancement thresholding segmentation block (segmentation block) 610, and a blob and shape analysis block 620.

Figure 5B:
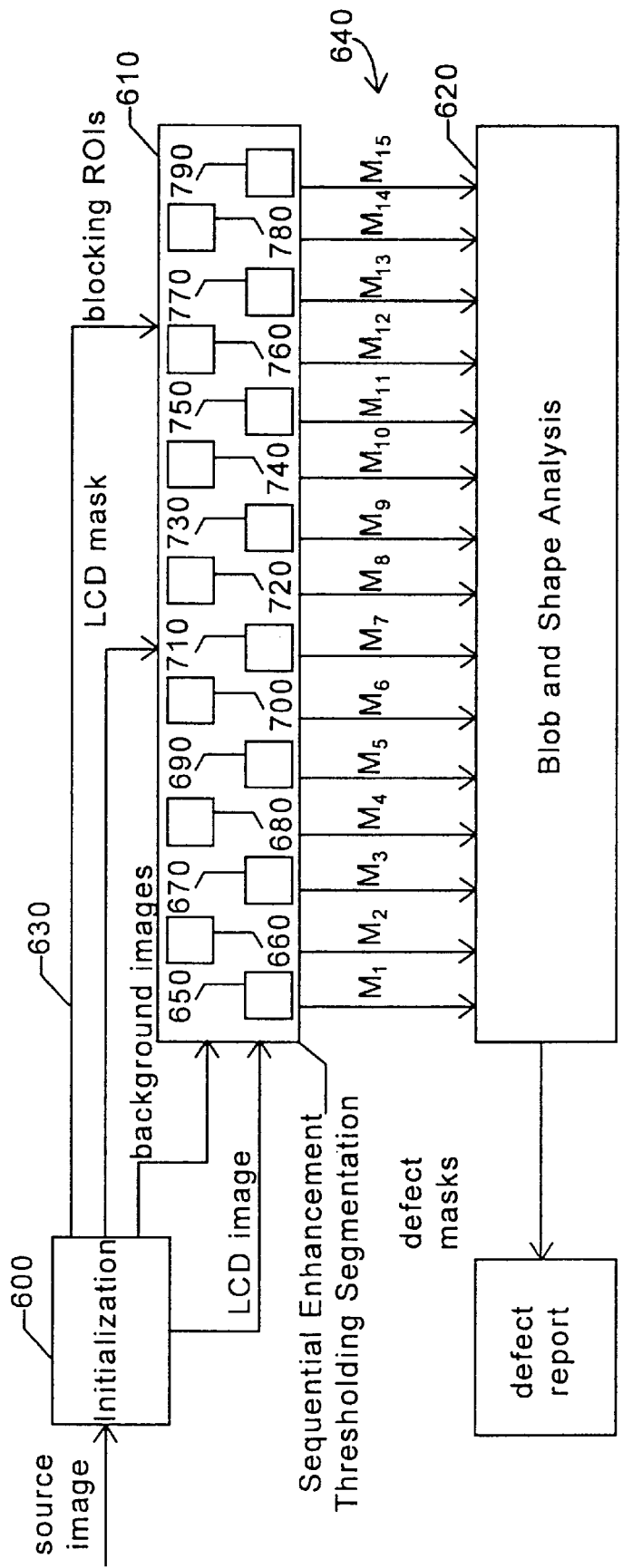
FIG. 5B illustrates a more detailed block diagram of a Mura detection architecture, according to the present invention.

FIG. 5b illustrates a more detailed block diagram of a Mura detection architecture according to the preferred embodiment of the present invention. As illustrated, initialization block 600 provides regions of interest (ROIs) 630 to segmentation block 610. In turn segmentation block 610 is coupled to blob analysis block 620 to communicate images 640 between segmentation block 610 and blob analysis block 620. Segmentation block 610 preferably includes a plurality of processing modules 650–790.

Figure 6:
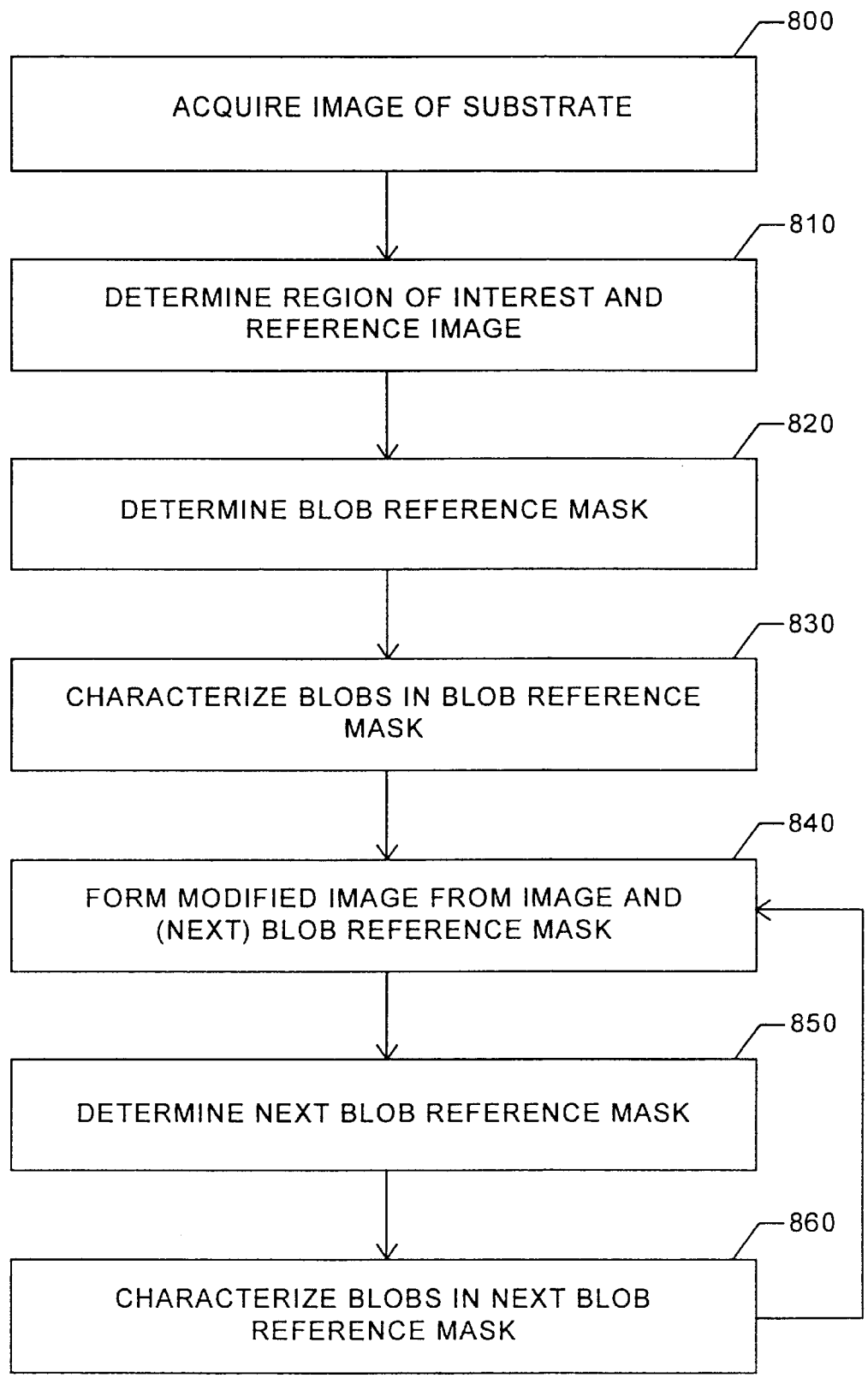
FIG. 6 is a simplified flow diagram of a Mura detection method according to the present invention.

FIG. 6 is a simplified flow diagram of a Mura detection method according to the present invention. FIG. 6 includes steps 800–860, with reference to the embodiment of FIG. 5B for convenience.

In operation, an image of a substrate to be inspected is initially acquired, step 800. In one embodiment, for on-assembly-line (on-line) processing, the image may be acquired using any conventional image acquisition device or image sensor, as described above. Alternatively, in an another embodiment, the image may be retrieved from a tangible media, the output from other image processing hardware machines or software modules, or the result of previous image processing iterations, as will be discussed below. In one embodiment of the present invention, the acquired image is approximately 2K×2K×10bits. This acquired image is preferably subsampled to approximately 1K×1K for enhanced processing speed.

Initialization block 600 determines regions of interest 630 from the image and passes the images to segmentation block 610, step 810. Segmentation block 610 determines a first set of blobs, if any exist, in response to the image and to regions of interest 630 in the form of a "blob reference mask", step 820. In the preferred embodiment of the present invention, segmentation block 610 begins by detecting blobs within the image that have a high-contrast. Next, blob analysis block 620 determines defects from the blob reference mask and creates a defect report, step 830.

In response to the defects, segmentation block 610 forms a modified image, step 840. As will be described, the modified image formed by segmentation block 610 is an approximate representation of the image without the defects found in step 830.

Segmentation block 610 then determines a next set of blobs from the modified image and regions of interest 630 in the form of another blob reference mask, step 850. In the preferred embodiment, in this step, typically segmentation block 610 detects blobs within the image that have a lower contrast than in previous detection steps, such as in step 820. Next, blob analysis block 620 determines defects from the new blob reference mask and creates a defect report, step 860.

This process is then repeated a number of times in the preferred embodiment of the present invention, preferably using a different contrast threshold for each successive blob detection step. In alternative embodiments of the present invention, the determining step of 820 determines one type of characteristic blobs, such as diagonal line blobs and step 850 determines another type of blobs, such as vertical blocking blobs. A more detailed flow diagram is described below.

In embodiments of the present invention, if no blobs are detected in step 820, the process nevertheless continues through step 830 and onto step 840 for the sake of convenience only. In such a case the modified image in step 840 will appear substantially similar to the original image. In alternative embodiments, if no blobs are determined in step 820, for example, the image obtained in step 800 is directly passed to step 840 or to step 850.

B. Initialization Block

Figure 7:
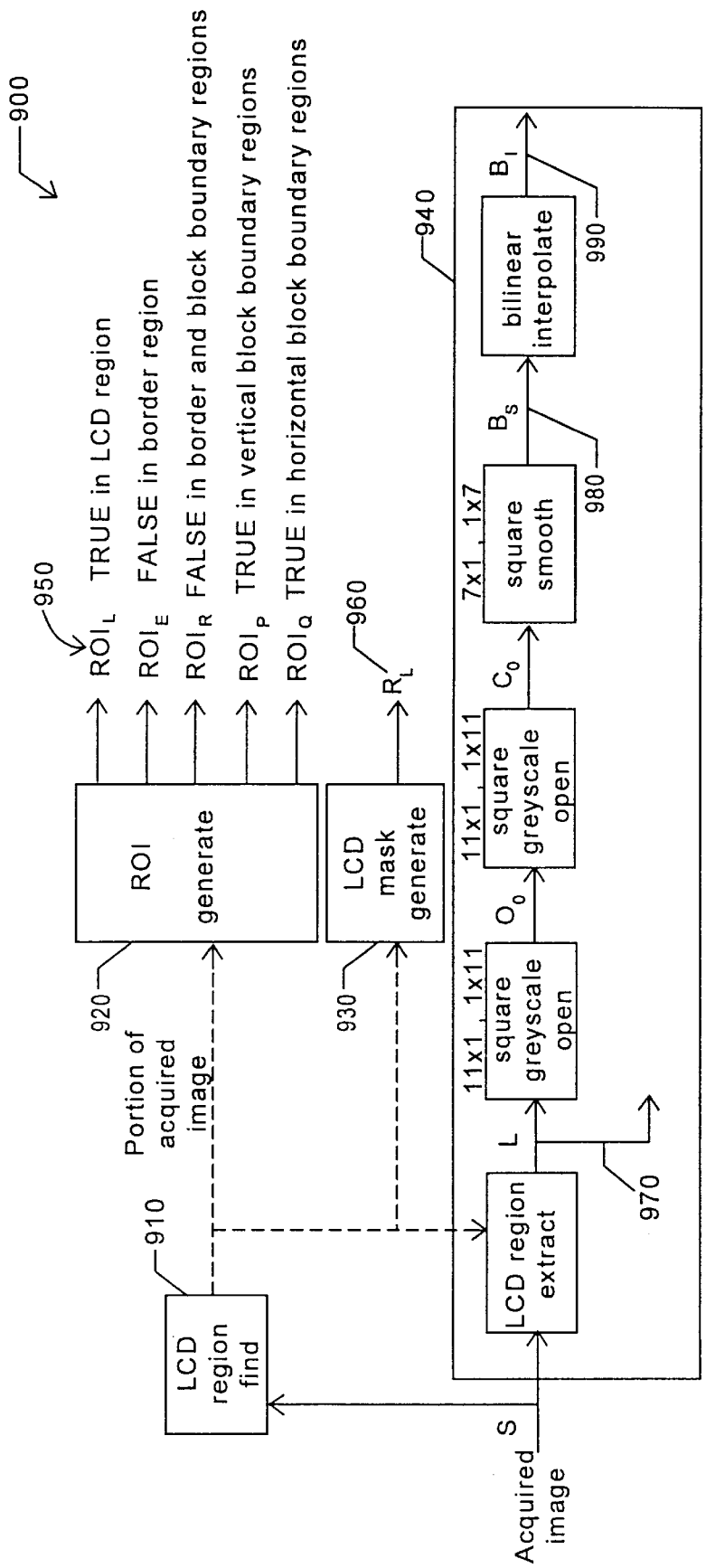
FIG. 7 illustrates an embodiment of a block diagram of an initialization block.

FIG. 7 illustrates an embodiment of a block diagram of an initialization block 900. Initialization block 900 includes a substrate locate block 910, a region of interest (ROI) generating block 920, a mask generator 930, and processing modules 940. ROI generating block includes various regions of interest (ROIs) 950. Mask generator 930 includes a mask RL 960. Processing modules 940 provide an extracted image L 970, a first reference image 980, and a second reference image 990.

Substrate locate block 910 determines the actual portion of an acquired image to perform processing upon to enhance processing speed. Next, based upon the portion of the acquired image, ROI generating block 920 determines various regions of interest (ROIs) 950.

In the preferred embodiment of the present invention, various ROIs 950 are used to facilitate blob detection on the acquired image. Typically, a user knows a priori information about characteristics of typical defects, for example, where certain defects are typically located and what certain defects look like. Thus, by searching or processing for blobs within particular regions where defects are most likely located, a user can reduce the amount of processing time required. Various ROIs 950 are thus located and formed by substrate locate block 910 for use in the preferred embodiment of the present invention.

In response to the portion of the acquired image from substrate locate block 910, mask generator 930 determines LCD mask RL 960, that is used to mask- out portions of the acquired image that are not of interest.

In response to the acquired image and to substrate locate block 910, processing modules 940 performs various processing to obtain extracted image L 970, a first reference image 980, and a second reference image 990.

Figure 8A:
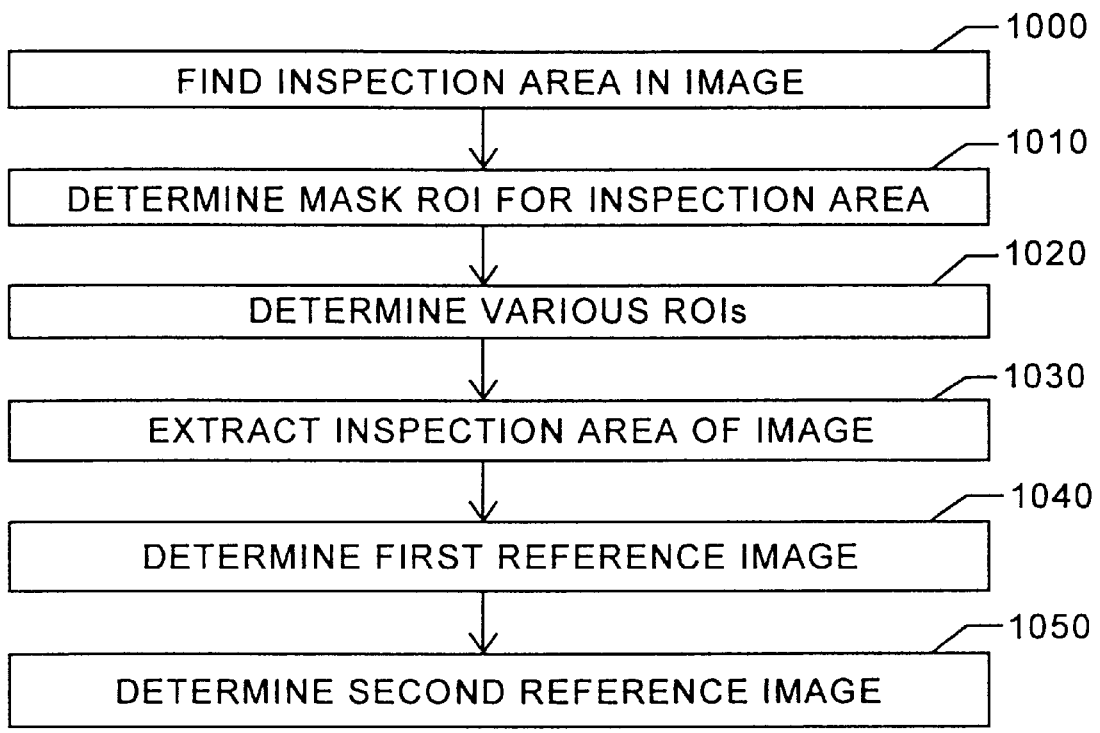
FIGS. 8a and 8b are simplified flow diagrams of the operation of initialization block.
Figure 8B:
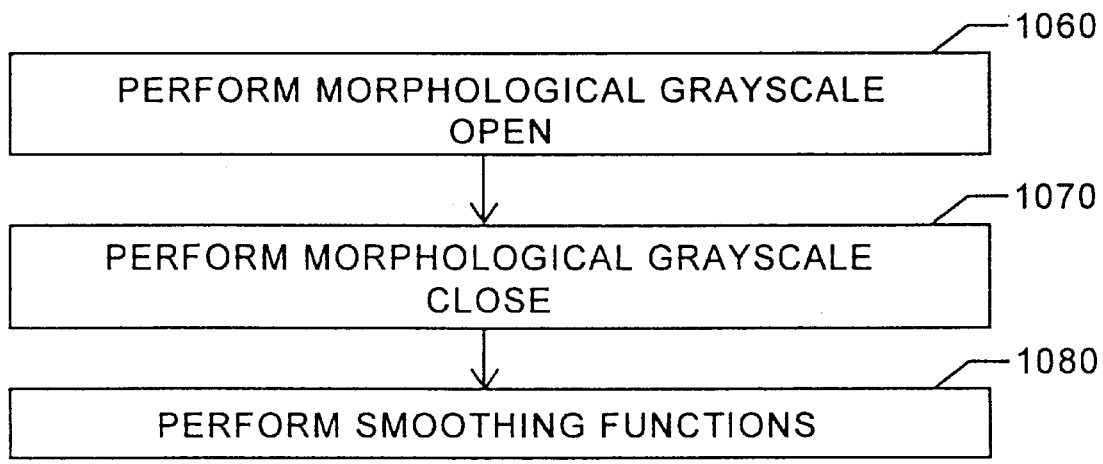

FIGS. 8a and 8b are simplified flow diagrams of the operation of initialization block 900. FIG. 8 includes steps 1000–1040, with reference to the embodiment of FIG. 7 for convenience.

Initially, substrate locate block 910 determines the proper registration of the portion of the image that should be processed, step 1000. Typically, an acquired image of a LCD display will not only include the LCD display, but also a small border around the LCD. This "overscan" border should be ignored when performing the subsequent processing, thus only a portion of the acquired image is processed. This overscan is typically performed to inhibit the effects of non- linearities in the edges of the image sensor, the optics, etc. In alternative embodiments of the present invention, an acquired image may be preprocessed to eliminate any overscan borders, thus substrate locate block 910 or step 1000 are not included. In the embodiment including substrate locate block 910, mask generator 930 determines LCD mask $R_L$ 960 for masking-out the border regions during subsequent processing steps, step 1010.

Next, various ROIs 950 are determined by ROI generating block 920 in order to facilitate subsequent processing, step 1020. In the present embodiment, various ROIs 950 illustrated in FIG. 7 include $ROI_L$, an ROI that masks out the LCD portion of an image, $ROI_R$ an ROI that masks out the borders of an image and the horizontal and vertical blocking regions of an image, $ROI_P$, an ROI that masks out everything but vertical blocking regions of an image, $ROI_Q$, an ROI that masks out everything but horizontal blocking regions of an image, and $ROI_E$, an ROI that masks out the borders of an image. A larger number of R a fewer number of ROIs may be predetermined for various ROIs 950 depending on the specific embodiment. Further, in alternative embodiments of the present invention, processing can occur on the entire image, thus ROI generating block 920 or step 1020 are not included.

At the same or different time from the above steps, processing modules 940 process the acquired image. Preferably extracted image L 970 is formed, step 1030, first reference image 980 is determined, step 1040, and second reference image 990 is determined, step 1050, FIG. 8b illustrates that step 1040 in the preferred embodiment of the present invention, includes steps 1060–1080. In response to extracted image L 970, a grayscale open morphological operation is performed on extracted image L 970, step 1060. Preferably a 11×11 kernel is used for the MIN portion of the opening and a 11×11 kernel is used for the MAX portion of the opening, as illustrated in FIG. 7.

Next, a grayscale close morphological operation is performed on the image, step 1070. Preferably a 11×11 kernel is used for the MAX portion of the closing and a 11×11 kernel is used for the MIN portion of the closing, as illustrated in FIG. 7. Then, a smoothing function is performed to form first reference image 980 and second reference image 990, step 1080. Other methods, techniques, and processing steps, for calculating first reference image 980 and second reference image 990 from extracted image L 970 are foreseeable and contemplated in alternative embodiments of the present invention.

The above steps can be performed entirely within software modules, or more preferably with a combination of specialized hardware processing modules and software processing modules.

C. Segmentation Block and Blob Analysis Modules

O. Overview

Figure 9A:
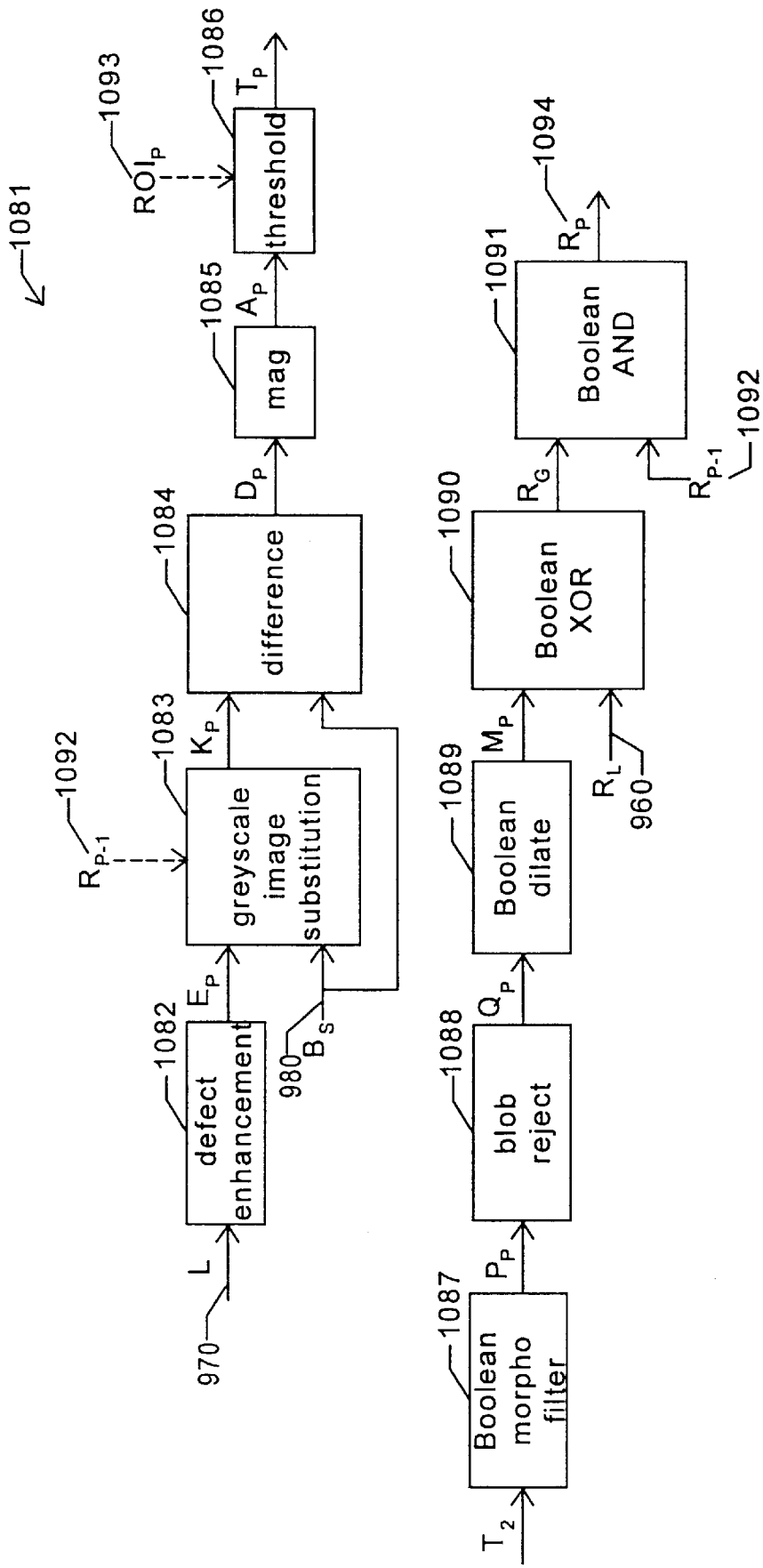
FIGS. 9a illustrates a block diagram of a typical module in segmentation block according to the present invention.

FIG. 9a illustrates a block diagram of a typical module 1081 in segmentation block 610 according to an embodiment of the present invention. FIG. 9a typically includes a defect enhancement module 1082, a grayscale image substitution module 1083, a subtraction module 1084, a magnitude module 1085, a thresholder 1086, a Boolean morphological filter 1087, a blob rejection module 1088, a Boolean dilator 1089, a Boolean XOR module 1090, and a Boolean AND module 1091. Inputs into module 1081 include extracted image L 970, first reference image 980, a blob reference mask (from a previous phase, if any) 1092, a $ROI_P$ 1093, $ROI_L$ 960. Outputs from module 1081 include a new blob reference mask 1094.

Module 1081 is typically used for determining blobs corresponding to different user-selected Mura defects and for generating new blob reference mask 1094 in response. Description of the above modules is given in conjunction with the flowchart in the following figure.

Figure 9B:
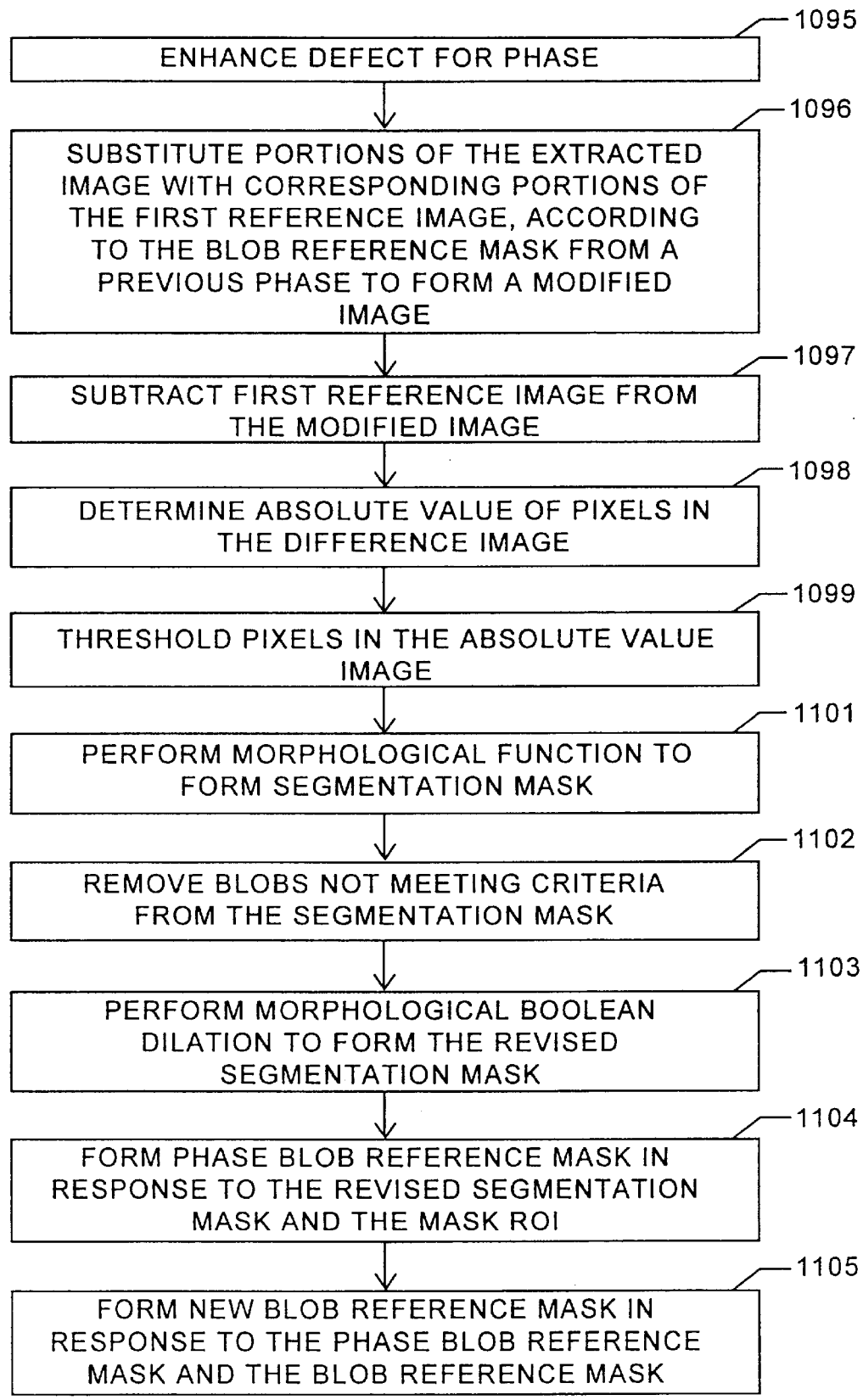
FIG. 9b is a simplified flow diagram of a operation of typical module.

FIG. 9b is a simplified flow diagram of the operation of module 1081. FIG. 9b includes steps 1095–1105, with reference to the embodiment of FIG. 9a for convenience.

Initially, extracted image L 970 is enhanced in a way to bring-out a particular defect to be analyzed and to form an enhanced image ($E_p$), step 1095. For example, when detecting blobs corresponding to (vertically oriented) S-Line Mura defects, horizontal blobs are inhibited from the image.

Next, a modified image ($K_p$) is formed in response to the grayscale image substitution of first reference image 980 ($B_S$) and the enhanced image ($E_p$), using blob reference mask 1092, step 1096. This grayscale substitution is also referred to as a grayscale XOR function in this document and is performed with grayscale substitution module 1083.

As discussed in the glossary section, with grayscale substitution, the pixels within the modified image ($K_p$) are taken from either the enhanced image ($E_p$) or first reference image 980, on a pixel by pixel basis. Because the enhanced image ($E_p$), first reference image 980, and blob reference mask 1092 are typically of the same pixel resolution, each pixel in blob reference mask 1092 corresponds to a respective pixel in the enhanced image ($E_p$) and to a respective pixel in first reference image 980. Further, because the pixels in blob reference mask 1092 are typically either ON or OFF, or Black or White, etc., corresponding to whether a blob was previously indicated or not, the value of the pixels in blob reference mask 1092 are used to select the source for the modified image ($K_p$). For example, when a pixel at location (250, 250) in blob reference mask 1092 is high, the value of the pixel at location (250, 250) in the modified image ($K_p$) is set equal to the value of the pixel at location (250, 250) in the enhanced image ($E_p$). Further, when a pixel at location (1024, 3) in blob reference mask 1092 is low, the value of the pixel at location (1024, 3) in the modified image ($K_p$) is set equal to the value of the pixel at location (1024, 3) in first reference image 980.

In summary, in the preferred embodiment, the modified image ($K_p$) is formed from the enhanced image ($E_p$), except in portions where a blob is present in blob reference mask 1092. In those portions where blobs are present, the modified image ($K_p$) is formed from corresponding portions of first reference image 980. Specific examples of the above process are described in the sections below.

In the first iteration of the present embodiment, there are no "previous blobs" identified or a blob reference mask 1092, thus step 1096 is skipped.

Next, in the preferred embodiment, the modified image ($K_p$) is subtracted from first reference image 980 in a conventional pixel by pixel manner using subtraction module 1084 in order to highlight the remaining blobs, step 1097. Because the result of the subtraction can be signed, magnitude module 1085 removes any signs, step 1098. In the typical embodiment, both bright and dark blobs are determined at the same time. In alternative embodiments, step 1098 may be eliminated and the sign data preserved.

Next, the image ($A_p$) is typically binarized using a user-defined threshold, step 1099. The threshold of thresholder 1086 can be adjusted according to the type and brightness of the blobs being detected. Typically, the thresholded image ($T_p$) is then passed through Boolean morphological filter 1087 to eliminate blobs or to join blobs together, step 1101.

Next, blob rejection module 1088 typically removes blobs from the image ($P_p$) that do not meet the criteria for the phase, step 1102. For example, when in the phase of determining blobs corresponding to (horizontal) G-Line Mura defects, blobs that appear diagonal or vertical in shape are inhibited from the image ($P_p$). Further, in some embodiments, blob rejection module 1088 increases or "extends" blobs based upon a priori knowledge of the typical blob shape. This image is termed the P-th segmentation mask.

A Boolean dilation function is then performed on the image ($P_p$) in order to connect distinct blobs that should be connected, preferably based again upon a priori knowledge of the blob shape, step 1103. This image is termed P-th revised segmentation mask ($M_p$).

Next, by performing a logical XOR between pixels in the P-th revised segmentation mask ($M_p$) and the LCD mask RL 960, a blob reference mask for this phase is formed ($R_G$), step 1104. The blob reference mask $R_G$ is typically a binary image where for example, black represents where blobs are located in this phase, and white otherwise. A P-th blob reference mask ($ROI_p$) is then formed by combining the (previous) blob reference mask ($P_{p-1}$) 1092 (if any) and the blob reference mask for this phase ($R_G$), step 1105.

In the first iteration of the present embodiment, there are no "previous blobs" identified, thus step 1105 is skipped.

In alternative embodiments of the present invention, each of the above steps may themselves comprise a sequence of steps. Further, not all of the above steps are required to be performed, and even further, additional steps not listed above can be performed in different phases.

For the following detailed descriptions, the value of p in the subscripts will represent the phase number, and the terminology will follow the phase number. For example, in Phase 6, $R_5$ is referred to as the fifth blob reference mask, and $K_6$ is referred to as the sixth modified image. As another example, in Phase 10, $R_9$ is referred to as the ninth blob reference mask, and $K_{10}$ is referred to as the tenth modified image, even though no sixth blob reference mask, seventh modified image, seventh blob reference mask, or eighth modified image, etc. exist.

The above steps can be performed entirely within software modules, or more preferably with a combination of specialized hardware processing modules and software processing modules. Further, the same modules are preferably used in subsequent phases. For example, subtraction module 1084 is preferably used to perform the difference function of FIGS. 10, 13, 19, etc.

The phase numbering used below, although corresponding to one embodiment of the present invention, does not in any way limit the order in which the phases are performed in alternative embodiments of the present invention. Rearrangement of the order of the phases and/or omission of phases are certainly contemplated in alternative embodiments of the present invention.

1. S-Line Mura Defect

Figure 10:
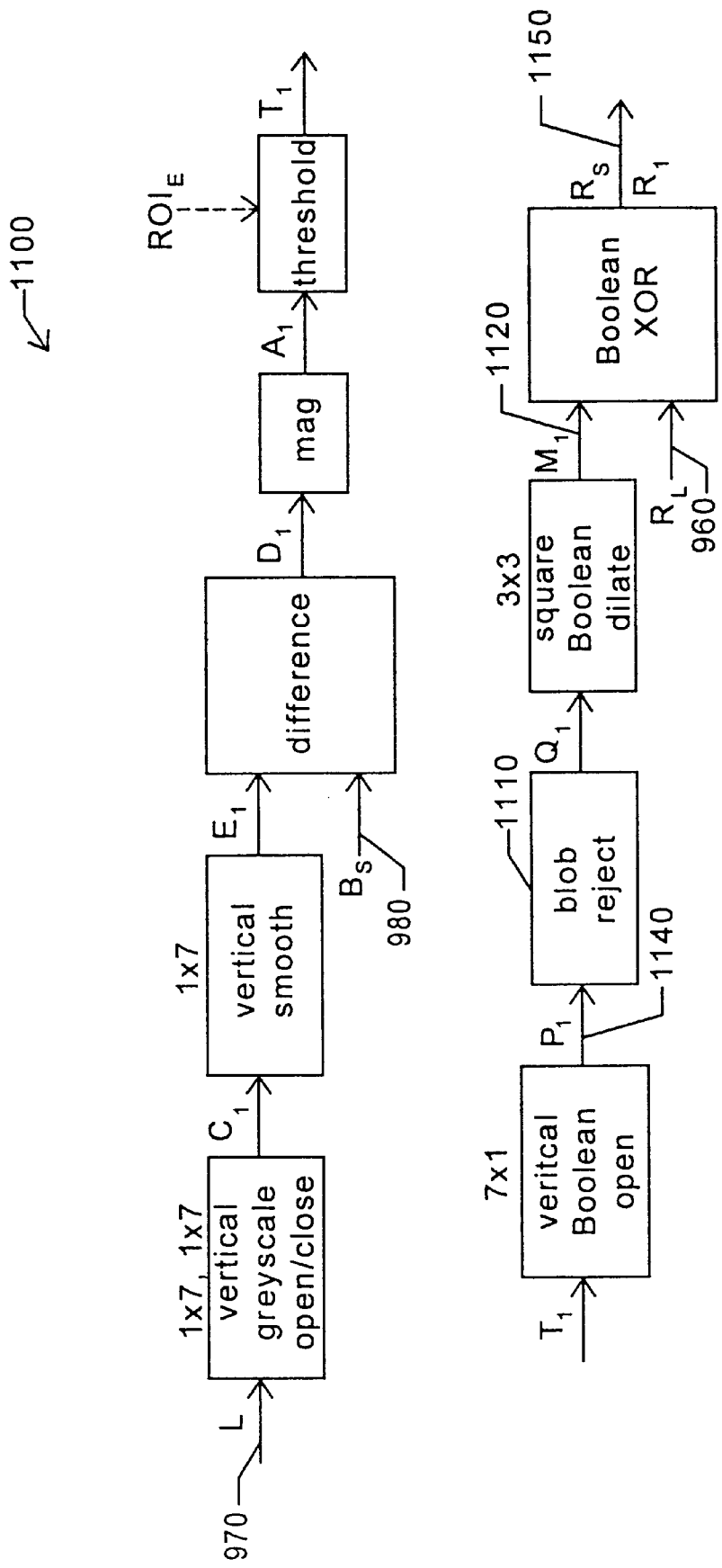
FIG. 10 illustrates a block diagram of a typical module in segmentation block according to an embodiment of the present invention.

FIG. 10 illustrates a block diagram of a typical module 1100 in segmentation block 610 according to an embodiment of the present invention. Inputs into module 1100 include extracted image L 970, Region-of-interest $ROI_E$, LCD mask $R_L$ 960, first reference image $B_S$ 980. Module 1100 includes processing modules that provide a first blob reference mask 1150 including a blob reject module 1110.

Module 1100 is typically used to determine blobs corresponding to source-line (S-Line) type Mura defects. Module 1100 forms a first segmentation mask 1140 that represents a set of blobs meeting a certain blob criteria, such as contrast. Module 1100 also typically determines which blobs within first segmentation mask 1140 are blobs that represent the source-line Mura defects and which blobs are blobs that do not represent such defects. Revised first segmentation mask 1120 is formed from blobs that represent the source-line Mura defects.

FIG. 11 illustrates a process for rejecting blobs from the first segmentation mask 1140, according to an embodiment of the present invention.

FIG. 11 illustrates in one embodiment that if blobs within first segmentation mask 1140 have a size count greater than $S_1$, all blobs are rejected from first segmentation mask 1140. Otherwise, a square Boolean dilate function is preferably performed and revised first segmentation mask 1120 is formed. Next, if blobs within revised first segmentation mask 1120 are vertically oriented and have a height greater than $H_1$ pixels and a width less than $W_1$ pixels, they are classified as blobs corresponding to S-line Mura defects. Blobs that do not meet the criteria are rejected. Values for $S_1$, $H_1$, and $W_1$ can be determined by one of ordinary skill in the art by ordinary experimentation, in light of the current patent disclosure.

Because typical S-line defects appear as vertical stripes running a substantial portion of the height of the image, if a line "fades-out" half way through, a blob running the height of the image is substituted for the existing blob. An illustration of this is discussed in the Example Section IV and FIGS. 57C and 57D.

Figure 12:
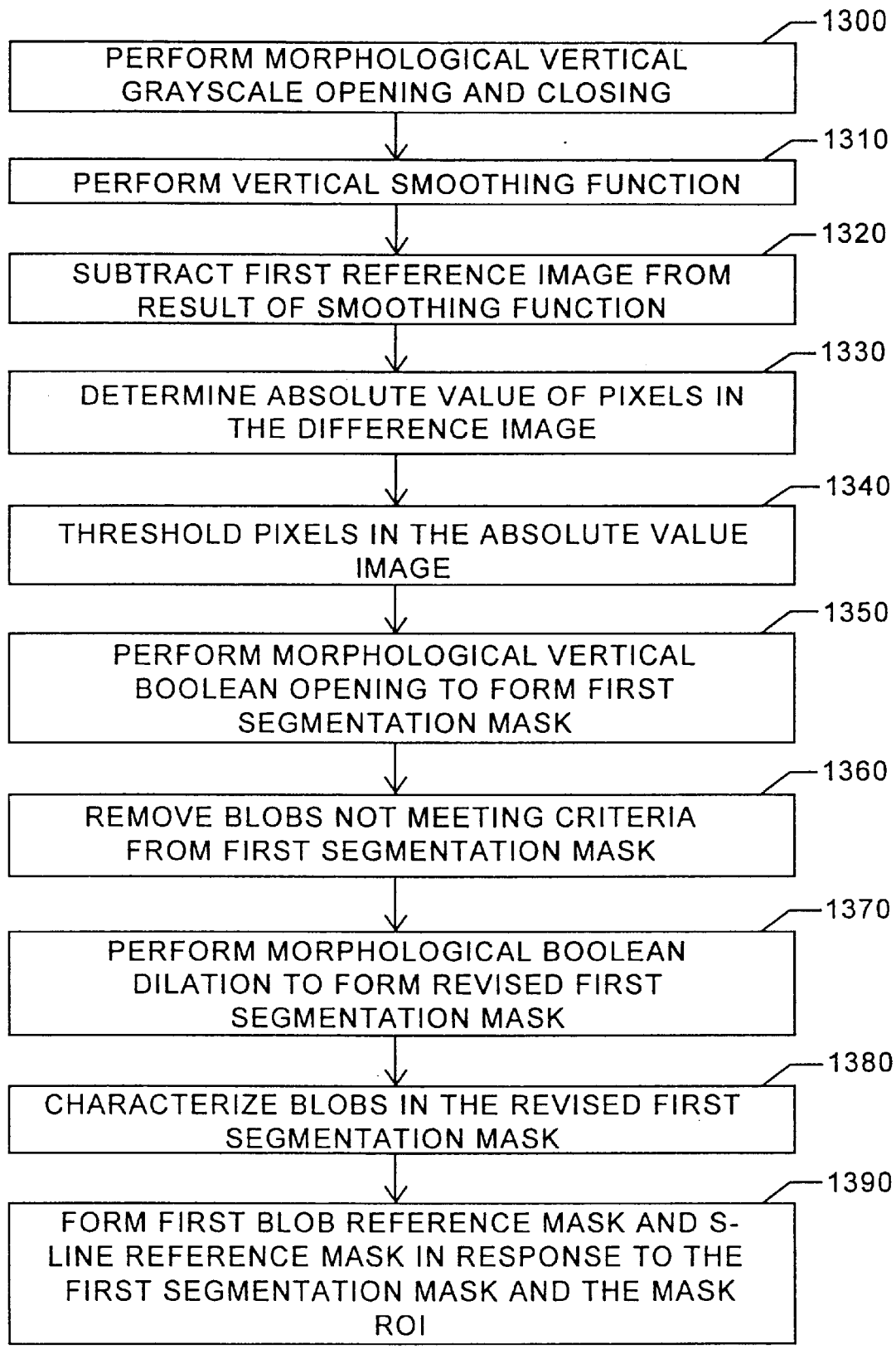
FIG. 12 is a simplified flow diagram of the operation of a typical module.

FIG. 12 is a simplified flow diagram of the operation of module 1100. FIG. 12 includes step 1300–1390, with reference to the embodiment of FIG. 10 for convenience.

Initially, in response to extracted image L 970, a vertical grayscale opening and then a vertical grayscale closing is performed on the image (L), step 1300. As illustrated, this is typically performed by using the listed kernel sizes, i.e. 1×7 for the vertical grayscale opening, followed by a 7×1 for the vertical grayscale closing. The image (Cl) is then passed through a vertical smoothing filter, step 1310. A typical kernel size is 1×7, as illustrated. The smoothed image ($E_1$) is then subtracted on a pixel by pixel basis from first reference image 980 ($B_S$), step 1320, and then the absolute value of each pixel is determined, step 1330.

The absolute value image ($A_1$) is then binarized using a threshold, step 1340. The threshold of the absolute value image ($A_1$) occurs preferably only in the ROI defined by $ROI_E$. Since $ROI_E$ includes a region of interest excluding the border regions, the thresholding occurs at regions in the absolute value image ($A_1$) inside the borders. A specific value of the threshold in one embodiment is provided in a following section.

The thresholded image ($T_1$) is subsequently processed using a vertical Boolean opening function, step 1350. At this stage, first segmentation mask 1140 is formed. The threshold level is preferably user-definable.

Based upon the criteria set forth above for blob reject module 1110, blobs not meeting the length criteria $S_1$ for an S-line Mura defect are preferably removed from first segmentation mask 1140, step 1360. Next, the image ($Q_1$) is processed using a conventional Boolean dilate function, step 1370. At this stage, revised first segmentation mask 1120 is formed. Blobs meeting the S-line Mura defects are preferably characterized on-line, or later, off-line, by blob analysis block 610 as previously described, step 1380.

In alternative embodiments of the present invention, step 1380 is not performed if the user is only interested in detecting or characterizing subsequent, or lower contrast blobs. If this is the case, although blobs corresponding to S-Line Mura defects may be present, they need not be analyzed.

Next, the pixels in revised first segmentation mask 1120 are logically XORed with corresponding pixels in LCD mask $R_L$ 960 to form a S-Line blob reference mask ($R_S$) and first blob reference mask 1150 ($R_1$), step 1390. In the preferred embodiment of the present invention, first blob reference mask 1150 (a binary image) will be logically high at all regions, except where blobs, if any, corresponding to S-Line Mura defects are present (logically low).

Not all images include blobs corresponding to S-line Mura defects, as a result, revised first segmentation mask 1120 and first blob reference mask 1150 may not include any blobs at all. In the preferred embodiment of the present invention, even if no blobs are reported in first segmentation mask 1140 or revised first segmentation mask 1120, it is preferred to continue performing step 1390 for sake of convenience.

Other methods, techniques, and processing steps, for determining first segmentation mask 1140, revised first segmentation mask 1120, and first blob reference mask 1150 are foreseeable and contemplated in alternative embodiments of the present invention.

2. G-Line Mura Defect

FIG. 13 illustrates a block diagram of a typical module 1500 in segmentation block 610 according to an embodiment of the present invention. Inputs into module 1500 include extracted image L 970, first reference image $B_S$ 980, first blob reference mask $R_1$ 1150, $ROI_E$, LCD mask $R_L$ 960. Module 1500 includes processing modules 1530 that provide a second segmentation mask 1540, a second blob reference mask 1550, a second modified image 1560, a Gate line (G-Line) blob reference mask 1570, and a revised second segmentation mask 1520.

Module 1500 is typically used to determine blobs corresponding to gate-line (G-Line) type Mura defects. Module 1500 forms second segmentation mask 1540 that represents a set of blobs meeting a certain blob criteria, such as contrast. Module 1500 also typically determines which blobs within second segmentation mask 1540 are blobs that represent the gate-line Mura defects and which blobs are blobs that do not represent such defects. Revised second segmentation mask 1520 is formed from blobs that represent the gate-line Mura defects.

FIG. 14 illustrates a process for rejecting blobs from the second segmentation mask 1540, according to an embodiment of the present invention.

FIG. 14 illustrates in one embodiment, that if blobs within second segmentation mask 1540 have a size count greater than $S_2$, all blobs are rejected from second segmentation mask 1540. Otherwise, a square Boolean dialate function is preferably performed and revised second segmentation mask 1520 is formed. Next, if blobs within revised second segmentation mask 1520 are horizontally oriented and have a width greater than $W_2$ pixels and a height less than $H_2$ pixels, they are classified as blobs corresponding to G-line Mura defects. Blobs that do not meet the criteria are rejected. Values for $S_2$, $W_2$, and $H_2$ can be determined by one of ordinary skill in the art by ordinary experimentation, in light of the current patent disclosure.

Because typical G-line defects appear as horizontal stripes running a substantial portion of the width of the image, if a line "fades-out" or is broken, a blob running the width of the image is substituted for the existing blob. An illustration of this is discussed in the Example Section IV and FIGS. 57F and 57H.

Figure 15:
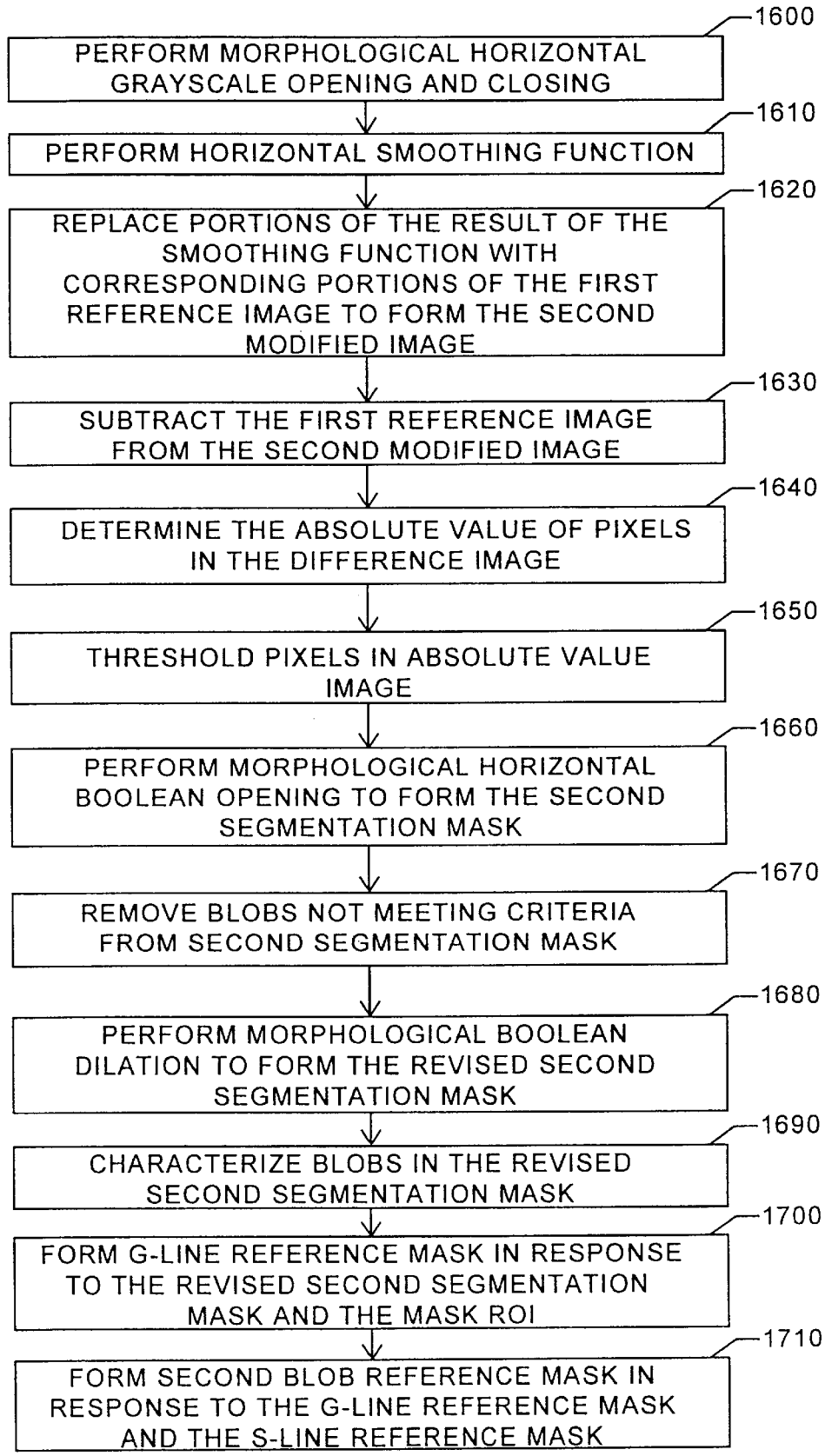
FIG. 15 is a simplified flow diagram of the operation of a typical module.

FIG. 15 is a simplified flow diagram of the operation of module 1500. FIG. 15 includes steps 1600–1710, with reference to the embodiment of FIG. 13 for convenience.

Initially, in response to extracted image L 970, a horizontal grayscale opening is performed with a 7×1 kernel and then a horizontal grayscale closing is performed with a 1×7 kernel on the image (L), step 1600. The image ($C_2$) is then passed through a horizontal smoothing filter, step 1610. A typical kernal size is 7×1. These steps are examples of defect enhancement steps.

Next, second modified image 1560 is formed in response to the grayscale XORing of first reference image 980 ($B_S$) and the smoothed image ($E_2$), referencing first blob reference mask 1150, step 1620. As discussed in the glossary section, preferably the pixels within second modified image 1560 are determined on a pixel by pixel basis depending upon the pixel values in first blob reference mask 1150.

For example, when a pixel value in first blob reference mask 1150 is high, the corresponding pixel in second modified image 1560 is set according to the corresponding pixel in the smoothed image ($E_2$). Further, when a pixel value in first blob reference mask 1150 is low, the corresponding pixel in second modified image 1560 is set according to the corresponding pixel in first reference image $B_S$ 980. In other words, in portions where first blob reference mask is low, corresponding portions of the smoothed image ($E_2$) will be replaced with corresponding portions of first reference image 980 ($B_S$).

In alternative embodiments of the present invention, steps 1600 and 1610 are not included. In such an embodiment, in step 1620, second modified image 1560 is equal to extracted image L 970, except at portions where first blob reference mask has low pixels. In those portions, second modified image 1560 is equal to the corresponding portion of first reference image 980 ($B_S$).

Next, second modified image 1560 is then subtracted on a pixel by pixel basis from first reference image 980 ($B_S$), step 1630, and then the absolute value of each pixel is determined, step 1640.

The absolute value image ($A_2$) is then binarized using a threshold, step 1650. In particular, a threshold of the absolute value image ($A_2$) occurs preferably only in a region of interest specified by $ROI_E$. Since $ROI_E$ excludes the border regions, the thresholding occurs at regions in the absolute value image ($A_2$) inside the borders.

The thresholded image ($T_2$) is subsequently processed using a horizontal Boolean opening function, step 1660. At this stage second segmentation mask 1540 is formed. The threshold level is preferably user-definable.

Based upon the criteria set forth above for blob reject module 1510 in FIG. 14, blobs not meeting the length criteria ($S_2$) for a G-line Mura defect are preferably removed from second segmentation mask 1540, step 1670. Next, the image ($Q_2$) is processed using a conventional Boolean dilate function, step 1680. Blobs meeting the G-line Mura defects are preferably characterized on-line, or later, off-line, by blob analysis block 620 as previously described, step 1690. At this stage, revised second segmentation mask 1520 is formed.

In alternative embodiments of the present invention, step 1690 is not performed if the user is only interested in detecting or characterizing subsequent or lower contrast blobs. If this is the case, although blobs corresponding to G-Line Mura defects may be present, they need not be analyzed.

Next, the pixels in revised second segmentation mask 1520 are logically XORed with corresponding pixels in LCD mask $R_L$ 960 to form G-Line blob reference mask 1570 ($R_G$), step 1700. In the preferred embodiment of the present invention, the G-Line reference mask 1570 ($R_G$) (a binary image) will be logically high at all regions, except where blobs, if any, corresponding to G-Line Mura defects are present (logically low).

Next, the pixels in G-line blob reference mask 1570 ($R_G$) are logically ANDed with corresponding pixels in first blob reference mask 1150 ($R_1$) to form the second blob reference mask 1550 ($R_2$), a composite blob reference mask, step 1710. In the preferred embodiment of the present invention, second blob reference mask 1550 (a binary image) will be logically high at all regions, except regions where Mura defects are present (logically low). In this example, blobs correspond to where S-Line Mura defects and G-Line Mura defects, if any, are present.

Not all images include blobs corresponding to G-line Mura defects, as a result, revised second segmentation mask 1520, and G-line blob reference mask 1570 ($R_G$) may not include any blobs at all. In the preferred embodiment of the present invention, even if no blobs are reported in second segmentation mask 1540 or revised second segmentation mask 1520, it is preferred to continue performing steps 1700 and 1710 for sake of convenience.

Other methods, techniques, and processing steps, for determining second segmentation mask 1540, revised second segmentation mask 1520, G-line blob reference mask 1570 ($R_G$), and second blob reference mask 1550 are foreseeable and contemplated in alternative embodiments of the present invention.

3. Straw Mura Defect

Figure 16:
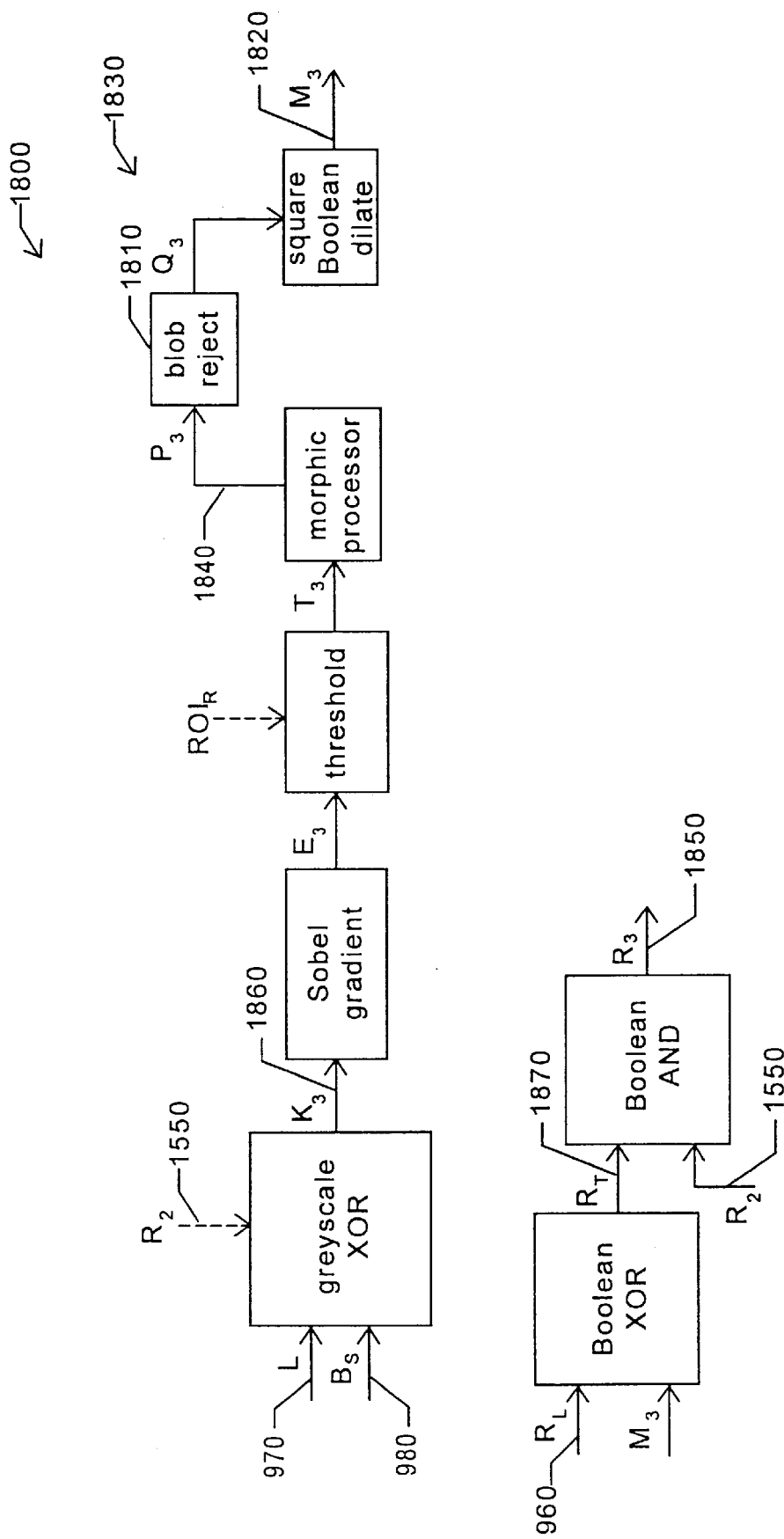
FIG. 16 illustrates a block diagram of a typical module in the segmentation block, according to an embodiment of the present invention.

FIG. 16 illustrates a block diagram of a typical module 1800 in segmentation block 610 according to an embodiment of the present invention.

Inputs into module 1800 include extracted image L 970, first reference image $B_S$ 980, second blob reference mask 1550, Region-of-interest $ROI_R$, and LCD mask $R_L$ 960. Module 1800 includes processing modules 1830 that provide a third blob reference mask 1850.

Module 1800 is typically used to determine blobs corresponding to straw type Mura defects. Module 1800 forms third segmentation mask 1820 that represents a set of blobs meeting a certain blob criteria, such as contrast.

Module 1800 is typically used to determine blobs corresponding to source-line (S-Line) type Mura defects. Module 1800 forms a third segmentation mask 1840 that represents a set of blobs meeting a certain blob criteria, such as contrast. Module 1800 also typically determines which blobs within third segmentation mask 1840 are blobs that represent the straw Mura defects and which blobs are blobs that do not represent such defects. Revised third segmentation mask 1820 is formed from blobs that represent the straw Mura defects.

FIG. 17B illustrates a process for rejecting blobs from the third segmentation mask 1840, according to an embodiment of the present invention.

FIG. 17B illustrates in one embodiment that if blobs within third segmentation mask 1840 have a size count greater than $S_3$, all blobs are rejected from third segmentation mask 1840. Otherwise, a square Boolean dialate function is preferably performed and revised third segmentation mask 1820 is formed. Values for $S_3$ can be determined by one of ordinary skill in the art by ordinary experimentation, in light of the current patent disclosure.

Figure 17A:
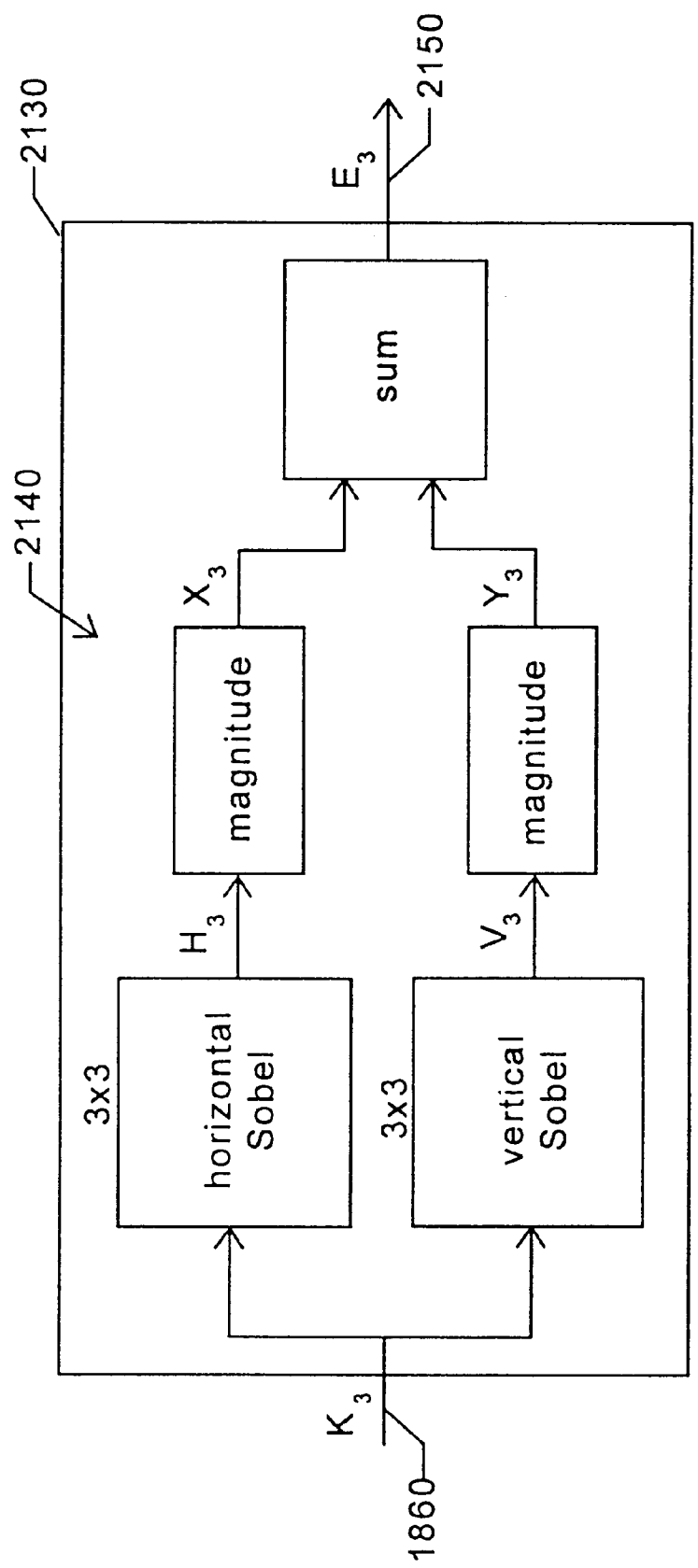
FIG. 17a illustrates a block diagram of a Sobel module within a module according to an embodiment of the present invention.

FIG. 17A illustrates a block diagram of a Sobel module 2130 within module 1800 according to an embodiment of the present invention. Sobel module 2130 includes a plurality of processing modules 2140. Sobel module 2130 receives a third modified image 1860 as input, and forms a processed image 2150 ($E_3$).

Figure 18A:
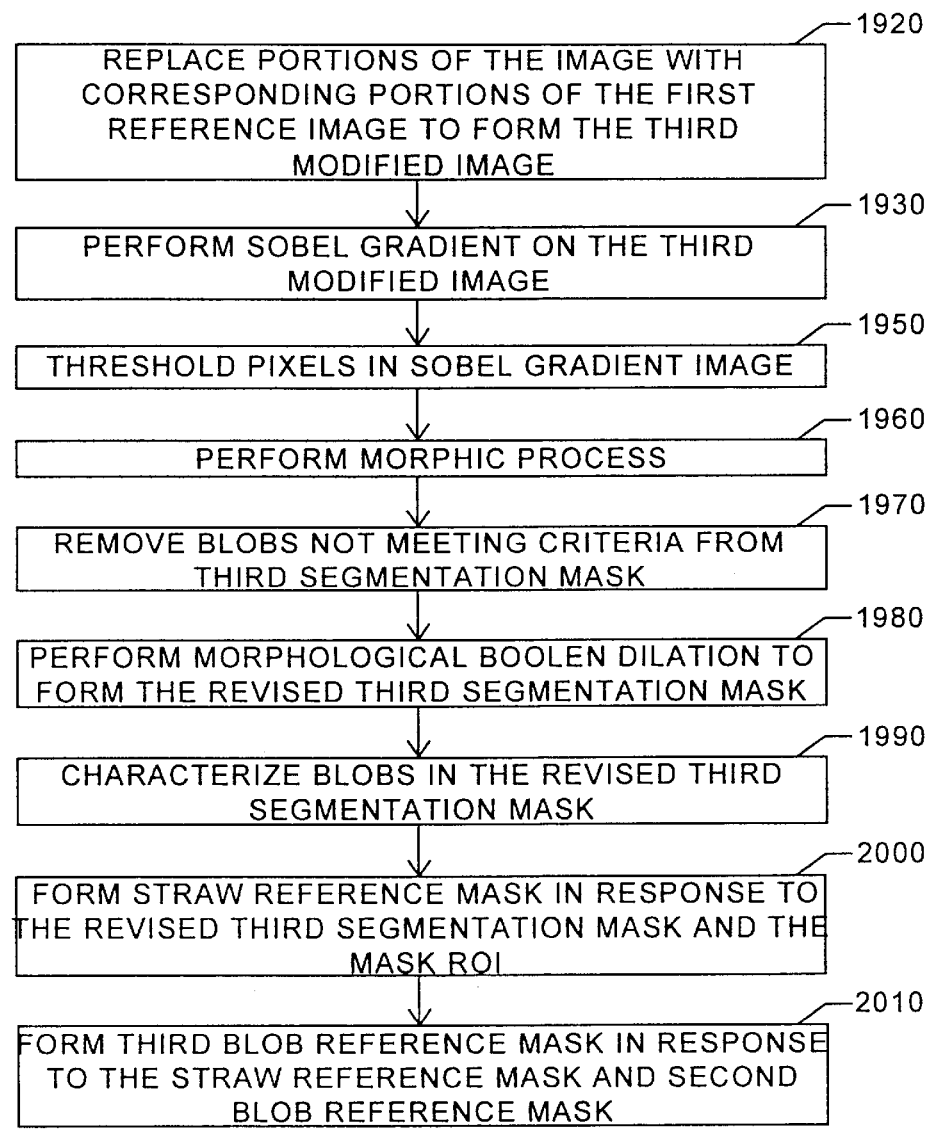
FIGS. 18a and 18b are simplified flow diagrams of the operation of a typical module.
Figure 18B:
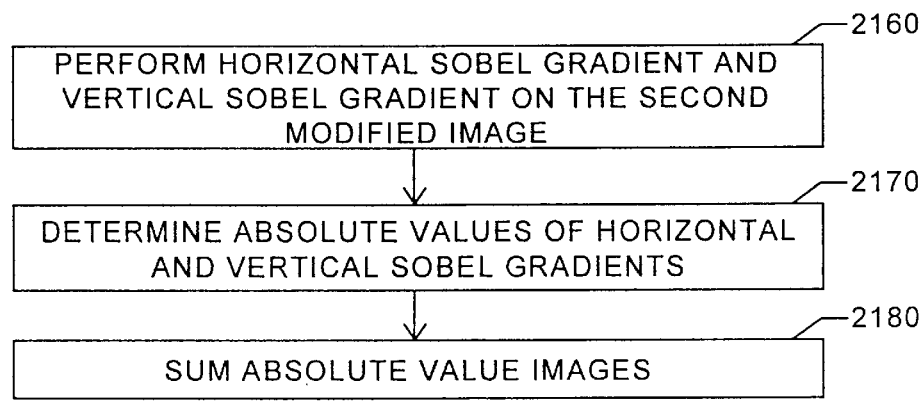

FIGS. 18a and 18b are simplified flow diagrams of the operation of module 1800. FIG. 18a includes steps with reference to the embodiment of FIG. 16 for convenience.

Initially, third modified image 1860 is formed in response to the grayscale XORing of first reference image 980 ($B_S$) and extracted image L 970, referencing second blob reference mask 1550, step 1920. As discussed in the glossary section, preferably the pixels within third modified image 1860 are determined on a pixel by pixel basis depending upon the pixel values in second blob reference mask 1550.

For example, when a pixel value in second blob reference mask 1550 is high, the corresponding pixel in third modified image 1860 is set according to the corresponding pixel in extracted image L 970. Further, when a pixel value in second blob reference mask 1550 is low, the corresponding pixel in third modified image 1860 is set according to the corresponding pixel in first reference image $B_S$ 980.

Next, third modified image 1860 is passed through a Sobel gradient, step 1930. In the preferred embodiment of the present invention, Sobel gradient is formed by steps 2160–2180.

Initially, third modified image 1860 is input into both a horizontal Sobel filter and a vertical Sobel filter, preferably simultaneously, that in turn form a horizontal Sobel gradient ($H_3$) and a vertical Sobel gradient ($V_3$), respectively, step 2160. Next, the magnitudes of the horizontal Sobel gradient ($H_3$) and the vertical Sobel ($V_3$) are then respectively taken, step 2170. The magnitude image ($X_3$) and the magnitude image ($Y_3$) are then added together in a conventional pixel by pixel basis to form processed image 2150, step 2180.

Processed image 2150 ($E_3$) is then binarized using a threshold, step 1950. In particular, a threshold of the processed image ($E_3$) occurs preferably only in the region of interest specified by $ROI_R$. In this case $ROI_R$ includes regions of interest excluding the horizontal and vertical block regions and the border regions.

The thresholded image ($T_3$) is subsequently processed using morphic processor, step 1960. The threshold is preferably user definable.

In the present embodiment of the present invention, a morphic processor is used to detect blobs that are contiguous and appear similar to the types of blobs being detected. Further, a morphic processor is used to reject individual pixel anomalies from the image. In the present embodiment, this function is typically performed by scanning a region around a center pixel for values of neighboring pixels. For example, if the value of the center pixel is high and the values of the neighboring pixels are low, the center pixel is set low.

Based upon the criteria set forth above for blob reject module 1810 in FIG. 17B, blobs not meeting the count criteria ($S_3$) for a straw Mura defect are preferably removed from third segmentation mask 1840, step 1970. Next, the image ($Q_3$) is processed using a conventional Boolean dilate function, step 1980 to form revised third segmentation mask 1820. Blobs meeting the straw Mura defects are preferably characterized on-line, or later, off-line, by blob analysis block 620 as previously described, step 1990.

In alternative embodiments of the present invention, step 1990 is not performed if the user is only interested in detecting or characterizing subsequent or lower contrast blobs. If this is the case, although blobs corresponding to straw Mura defects may be present, they need not be analyzed.

Next, the pixels in third segmentation mask 1820 are logically XORed with corresponding pixels in mask $R_L$ 960 to form Straw reference mask 1870 ($R_T$), step 2000. In the preferred embodiment of the present invention, the Straw reference mask 1870 ($R_T$) (a binary image) will be logically high at all regions, except where blobs, if any, corresponding to Straw Mura defects are present (logically low).

Next, the pixels in blob reference mask 1870 ($R_T$) are logically ANDed with corresponding pixels in second blob reference mask 1550 ($R_2$) to form the third blob reference mask 1850 ($R_3$), a composite mask of blobs detected as of this phase, step 2010. In the preferred embodiment of the present invention, third blob reference mask 1850 (a binary image) will be logically high at all regions, except regions where Mura defects are present (logically low). In this example, blobs correspond to where S-Line Mura defects, G-Line Mura defects, and Straw Mura defects, if any, are present.

Not all images include blobs corresponding to Straw Mura defects, as a result, third segmentation mask 1820 and Straw blob reference mask 1870 ($R_T$) may not include any blobs at all. In the preferred embodiment of the present invention, even if no blobs are reported in third segmentation mask 1820, it is preferred to continue performing steps 2000 and 2010 for sake of convenience.

Other methods, techniques, and processing steps, for determining third segmentation mask 1820, Straw blob reference mask 1870 ($R_T$), and third blob reference mask 1850 are foreseeable and contemplated in alternative embodiments of the present invention.

4. Strong White Mura Defect

Figure 19:
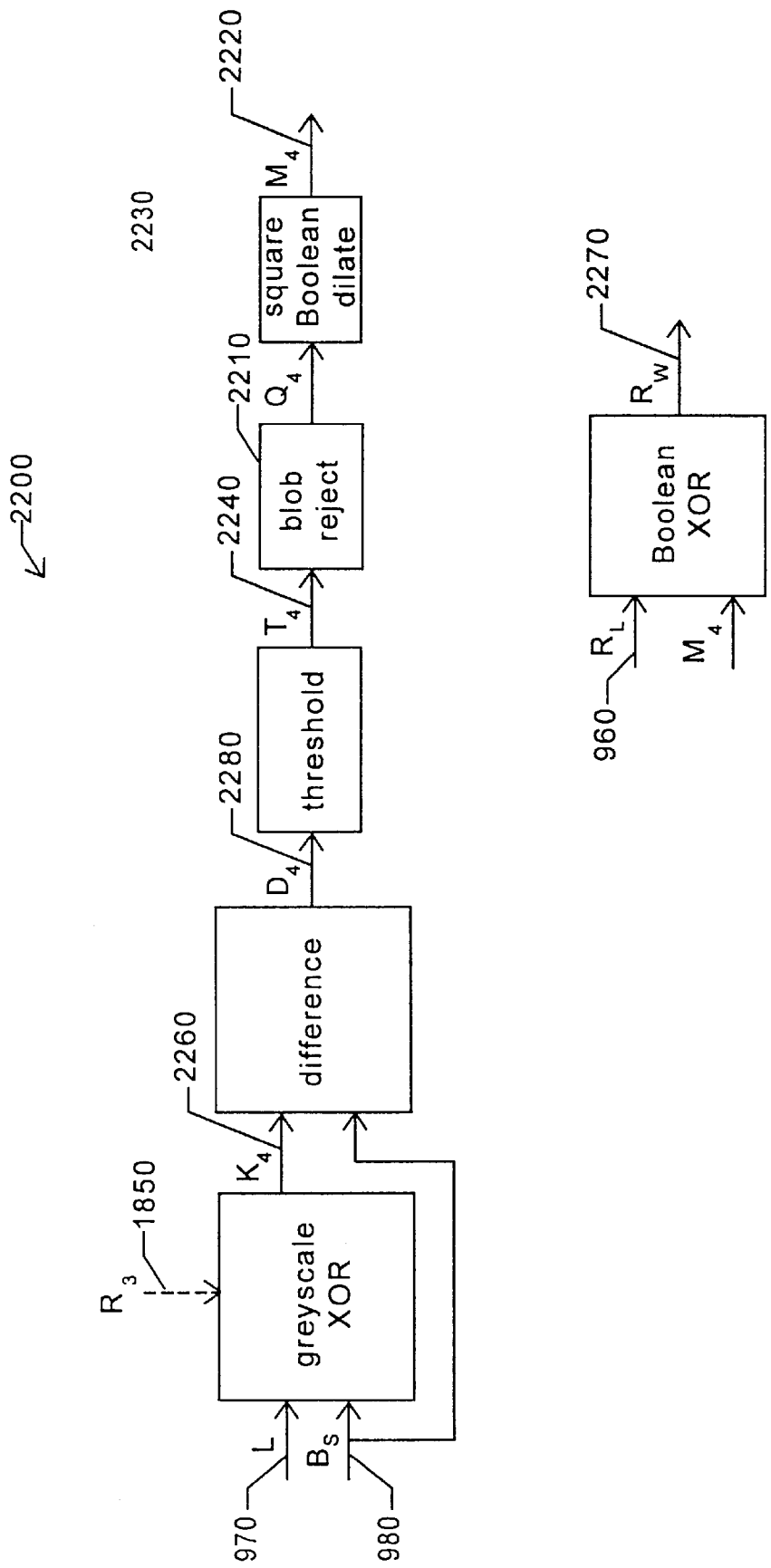
FIG. 19 illustrates a block diagram of a typical module in the segmentation block, according to an embodiment of the present invention.

FIG. 19 illustrates a block diagram of a typical module 2200 in segmentation block 610 according to an embodiment of the present invention. Inputs into module 2200 include extracted image L 970, first reference image $B_S$ 980, third blob reference mask 1850, and LCD mask $R_L$ 960. Module 2200 includes processing modules 2230 that provide a fourth segmentation mask 2220, a revised fourth segmentation mask 2220, a strong white blob reference mask 2270, and a first difference image 2280.

Module 2200 is typically used to determine blobs corresponding to strong white type Mura defects. Module 2200 forms a strong white blob reference mask 2240 that represents a set of blobs meeting a certain blob criteria, such as contrast. Module 2200 also typically determines which blobs within fourth segmentation mask 2240 are blobs that represent the strong white Mura defects and which blobs are blobs that do not represent such defects. Revised fourth segmentation mask 2220 is formed from blobs that represent the strong white Mura defects.

FIG. 20 illustrates a process for rejecting blobs from fourth segmentation mask 2240, according to an embodiment of the present invention.

FIG. 20 illustrates in one preferred embodiment, that if blobs within fourth segmentation mask 2240 have a size count greater than $S_4$, all blobs are rejected from fourth segmentation mask 2240. Otherwise, a square Boolean dilate function is preferably performed and revised fourth segmentation mask 2220 is formed. Next, if no blobs corresponding to Straw Mura defects were detected in the previous phase, for blobs not touching a border and that are of size $W_4$ by $H_4$ or smaller, they are classified as white interior spots; for blobs that are within $W_5$ and $H_5$ and within the corner regions, these are classified as white corner bloom; for blobs not touching a corner, but are within distance $D_6$ from a border, these are classified as white border bloom. If blobs corresponding to Straw Mura defects were detected, these blobs are classified as blobs corresponding to Straw Mura defects.

Blobs that do not meet the criteria are typically rejected. Values for $S_4$, $W_4$, $H_4$, $W_5$, $H_5$, and $D_6$ can be determined by one of ordinary skill in the art by ordinary experimentation, in light of the current patent disclosure.

Figure 21:
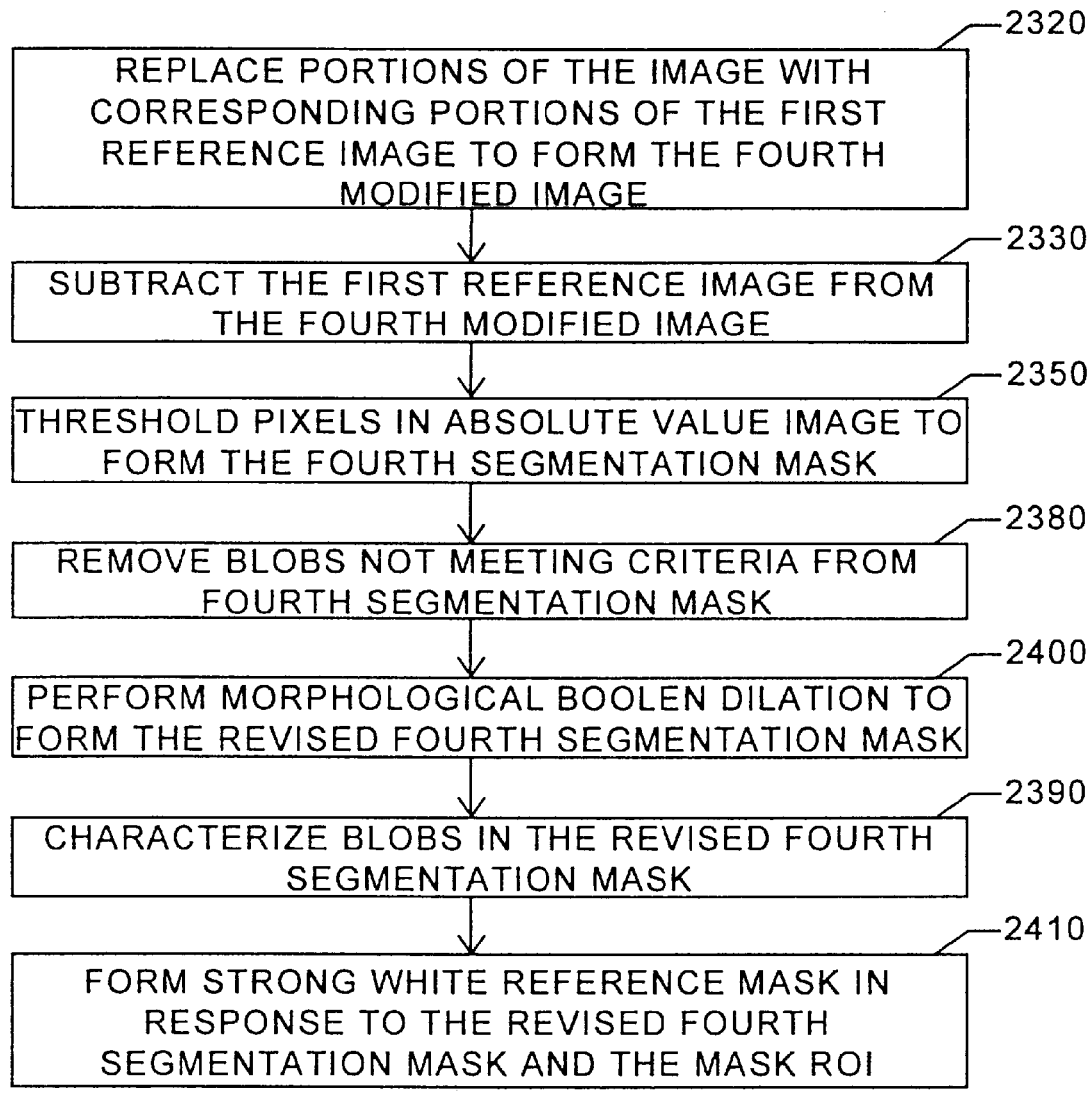
FIG. 21 is a simplified flow diagram of the operation of a typical module.

FIG. 21 is a simplified flow diagram of the operation of module 2200. FIG. 21 includes steps with reference to the embodiment of FIG. 19 for convenience.

Initially, fourth modified image 2260 is formed in response to the grayscale XORing of first reference image 980 ($B_S$) and extracted image L 970, referencing third blob reference mask 1850, step 2320. As discussed in the glossary section, preferably the pixels within fourth modified image 2260 are determined on a pixel by pixel basis, depending upon the pixel values in third blob reference mask 1850.

For example, when a pixel value in third blob reference mask 1850 is high, the corresponding pixel in extracted image L 970 is output as the corresponding pixel in fourth modified image 2260. Further, when a pixel value in second blob reference mask 1550 is low, the corresponding pixel in first reference image $B_S$ 980 is output as the corresponding pixel in fourth modified image 2260.

Next, fourth modified image 2260 is subtracted on a pixel by pixel basis from reference image 980 ($B_S$) to form first difference image 2280, step 2330. First difference image 2280 is then binarized using a threshold, step 2350. A specific value of the threshold is provided in a following section. At this stage fourth segmentation mask 2240 is formed. The threshold is preferably user-definable.

Based upon the criteria set forth above for blob reject module 2210, blobs not meeting the criteria for Straw or strong white Mura defect are preferably removed from fourth segmentation mask 2240, step 2380. Next, the image ($Q_4$) is processed using a conventional Boolean dilate function, step 2400. Blobs meeting the Straw or Strong White Mura defects are preferably characterized on-line, later, off-line, by blob analysis block 620 as previously described, step 2390. At this stage, revised fourth segmentation mask 2220 is formed.

In alternative embodiments of the present invention, step 2390 is not performed if the user is only interested in detecting or characterizing other types of defects or lower contrast blobs. If this is the case, although blobs corresponding to Straw or strong white Mura defects may be present, they are not analyzed.

Next, the pixels in revised fourth segmentation mask 2220 are logically XORed with corresponding pixels in LCD mask $R_L$ 960 to form Strong white blob reference mask 2270 ($R_W$), step 2410. In the preferred embodiment of the present invention, the Strong white blob reference mask 2270 ($R_W$) (a binary image) will be logically high at all regions, except where blobs, if any, corresponding to Strong white Mura defects are present (logically low).

Other methods, techniques, and processing steps, for determining fourth segmentation mask 2240, revised fourth segmentation mask 2220, and Strong White blob reference mask 2270 ($R_W$) are foreseeable and contemplated in alternative embodiments of the present invention.

5. Strong Black Mura Defect

Figure 22:
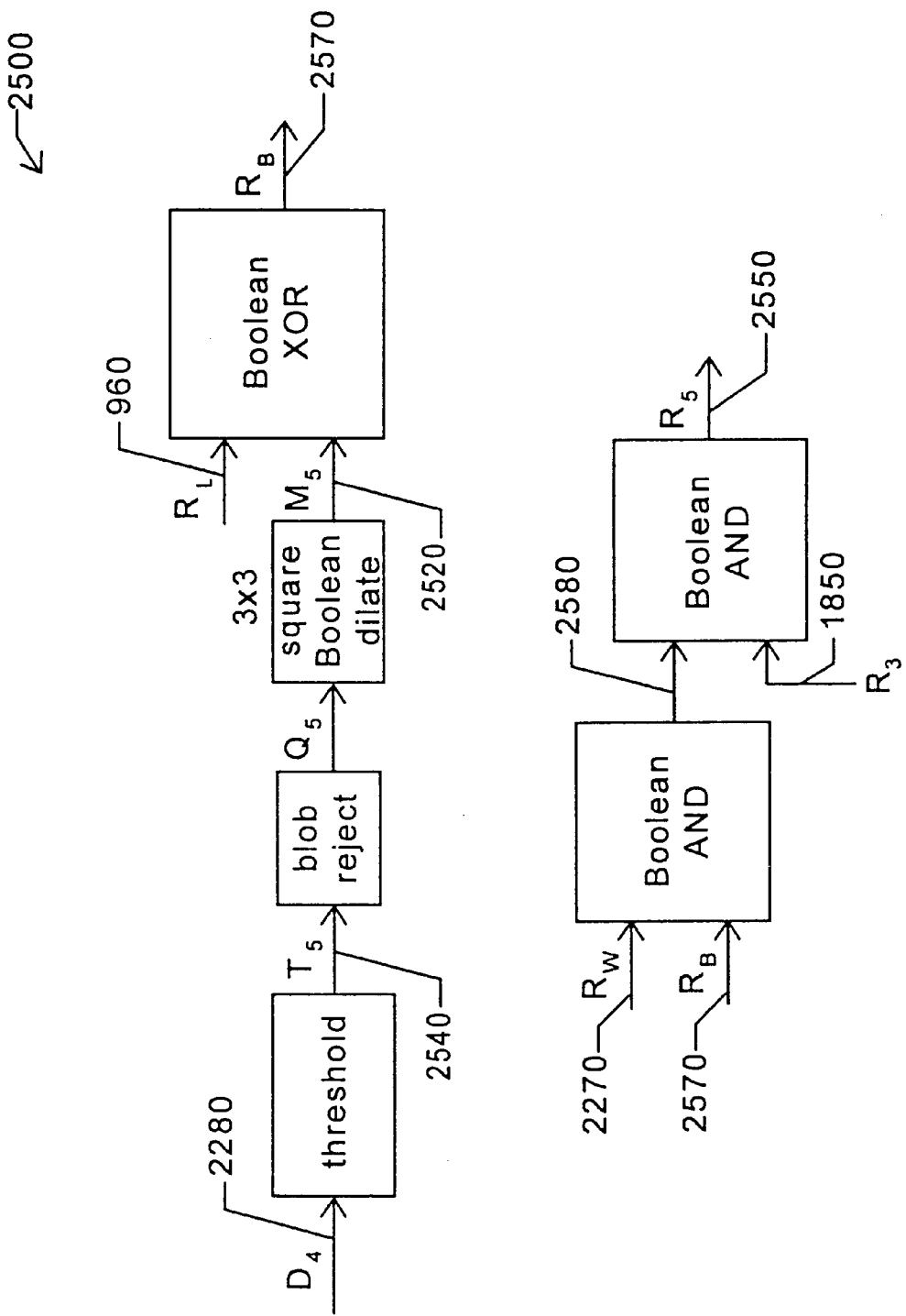
FIG. 22 illustrates a block diagram of a typical module in the segmentation block, according to an embodiment of the present invention.

FIG. 22 illustrates a block diagram of a typical module 2500 in segmentation block 610 according to an embodiment of the present invention. Inputs into module 2500 include first difference image 2280 ($D_4$), Strong white blob reference mask 2270, third blob reference mask 1850, and LCD mask $R_L$ 960. Module 2500 includes processing modules that provide a Strong black blob reference mask 2570, a Strong blob reference mask 2580, and a fifth blob reference mask 2550.

Module 2500 is typically used to determine blobs corresponding to strong black type Mura defects. Module 2500 forms a strong black blob reference mask 2540 that represents a set of blobs meeting a certain blob criteria, such as contrast. Module 2500 determines which blobs within fifth segmentation mask 2540 are blobs that represent the strong black Mura defects and which blobs are blobs that do not represent such defects. Revised fifth segmentation mask 2520 is formed from blobs that represent the strong black Mura defects.

FIG. 23 illustrates a process for rejecting blobs from fifth segmentation mask 2540, according to an embodiment of the present invention.

FIG. 23 illustrates in one preferred embodiment, that if blobs within fifth segmentation mask 2540 have a size count greater than $S_5$, all blobs are rejected from fifth segmentation mask 2540. Otherwise, a square Boolean dilate function is preferably performed and revised fifth segmentation mask 2520 is formed. Next, if no blobs corresponding to Straw Mura defects were detected in a previous phase, for blobs not touching a border and that are of size $W_7$ by $H_7$ or smaller, these are classified as black interior spots; for blobs that are within $W_8$ and $H_8$ and within the corner region, these are classified as black corner spots; for blobs not touching a corner, but are within distance $D_9$ from a border, these are classified as black border bloom. If blobs corresponding to Straw Mura defects were detected, these blobs are classified as blobs corresponding to Straw Mura defects.

Blobs that do not meet the criteria are typically rejected. Values for $S_5$, $W_7$, $H_7$, $W_8$, $H_8$, and $D_9$ can be determined by one of ordinary skill in the art by ordinary experimentation in light of the current patent disclosure.

Figure 24:
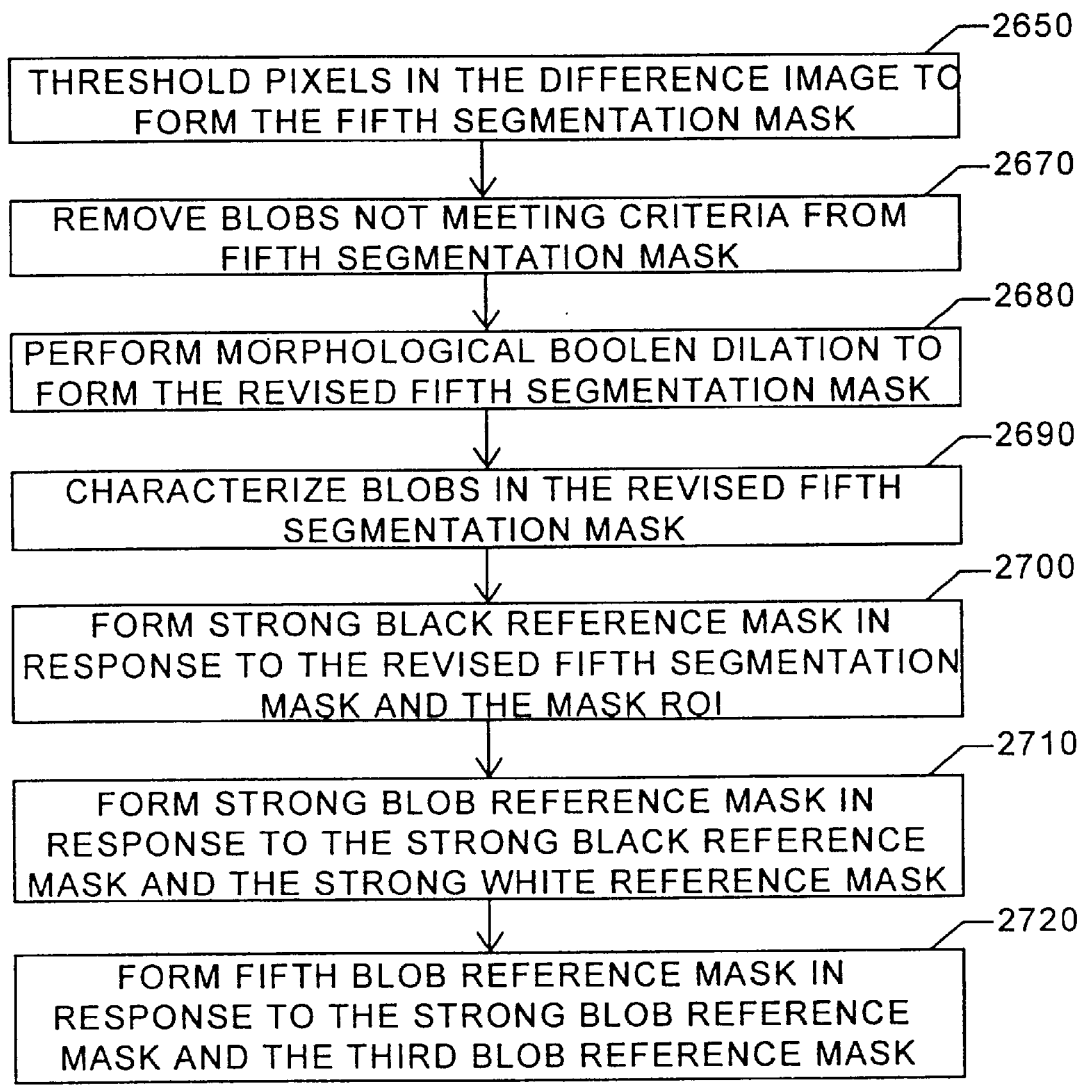
FIG. 24 is a simplified flow diagram of the operation of a typical module.

FIG. 24 is a simplified flow diagram of the operation of module 2500. FIG. 24 includes steps with reference to the embodiment of FIG. 22 for convenience.

Initially first difference image 2580, from module 2200 (FIG. 19), is binarized using a threshold, step 2650. A specific value of the threshold is provided in a following section. At this stage fifth segmentation mask 2540 is formed. The threshold level is preferably user-definable.

In alternative embodiments of the present invention module 2500 may include the grayscale XOR module and the difference module, as illustrated in module 2200, and module 2500 may generate first difference image 2580 itself. However, by using images that were previously generated in previous stages or phases, processing times are reduced.

Based upon the criteria set forth above for blob reject module 2510, blobs not meeting the criteria for Straw or Strong black Mura defect are preferably removed from fifth segmentation mask 2540, step 2670. Next, the image ($Q_5$) is processed using a conventional Boolean dilate function, step 2680. At this stage revised fifth segmentation mask 2520 is formed. Blobs meeting the Straw or Strong black Mura defects are preferably characterized on-line, later, off-line, by blob analysis block 620 as previously defined, step 2690.

In alternative embodiments of the present invention, step 2690 is not performed if the user is only interested in detecting or characterizing other types of defects or lower contrast blobs. If this is the case, although blobs corresponding to Straw or Strong black Mura defects may be present, they are not analyzed.

Next, the pixels in revised fifth segmentation mask 2520 are logically XORed with corresponding pixels in LCD mask $R_L$ 960 to form Strong black blob reference mask 2570 ($R_B$), step 2700. In the preferred embodiment of the present invention, Strong black blob reference mask 2570 ($R_B$) (a binary image) will be logically high at all regions, except where blobs, if any, corresponding to Strong black Mura defects are present (logically low).

Next, the pixels in Strong black blob reference mask 2570 ($R_B$) are logically ANDed with corresponding pixels in Strong white reference mask 2270 ($R_B$) to form Strong blob reference mask 2580, step 2710. In the preferred embodiment of the present invention, Strong blob reference mask 2580 (a binary image) will be logically high at all regions, except regions where Strong white or Strong black Mura defects are present (logically low), if any, are present.

Next, the pixels in Strong blob reference mask 2580 are logically ANDed with corresponding pixels in third blob reference mask 1850 ($R_3$) to form the fifth blob reference mask 2550 ($R_5$), another composite blob reference mask, step 2720. In the preferred embodiment of the present invention, fifth blob reference mask 2550 (a binary image) will be logically high at all regions, except regions where Mura defects are present (logically low). In this example, blobs correspond to where S-Line Mura defects, G-Line Mura defects, Straw Mura defects, Strong white and/or Strong black defects, if any, are present.

Not all images include blobs corresponding to Strong blob Mura defects, as a result, revised fifth segmentation mask 2520, Strong black blob reference mask 2570 ($R_B$), etc. may not include any blobs at all. In the preferred embodiment of the present invention, even if no blobs are reported in fifth segmentation mask 2540 or revised fifth segmentation mask 2520, etc. it is preferred to continue performing steps 2700–2720 for sake of programming convenience.

Other methods, techniques, and processing steps, for determining fifth segmentation mask 2540, revised fifth segmentation mask 2520, Strong black blob reference mask 2570 ($R_B$), Strong blob reference mask 2580, and fifth blob reference mask 2550 are foreseeable and contemplated in alternative embodiments of the present invention.

6. Horizontal Line Mura Defect

Figure 25:
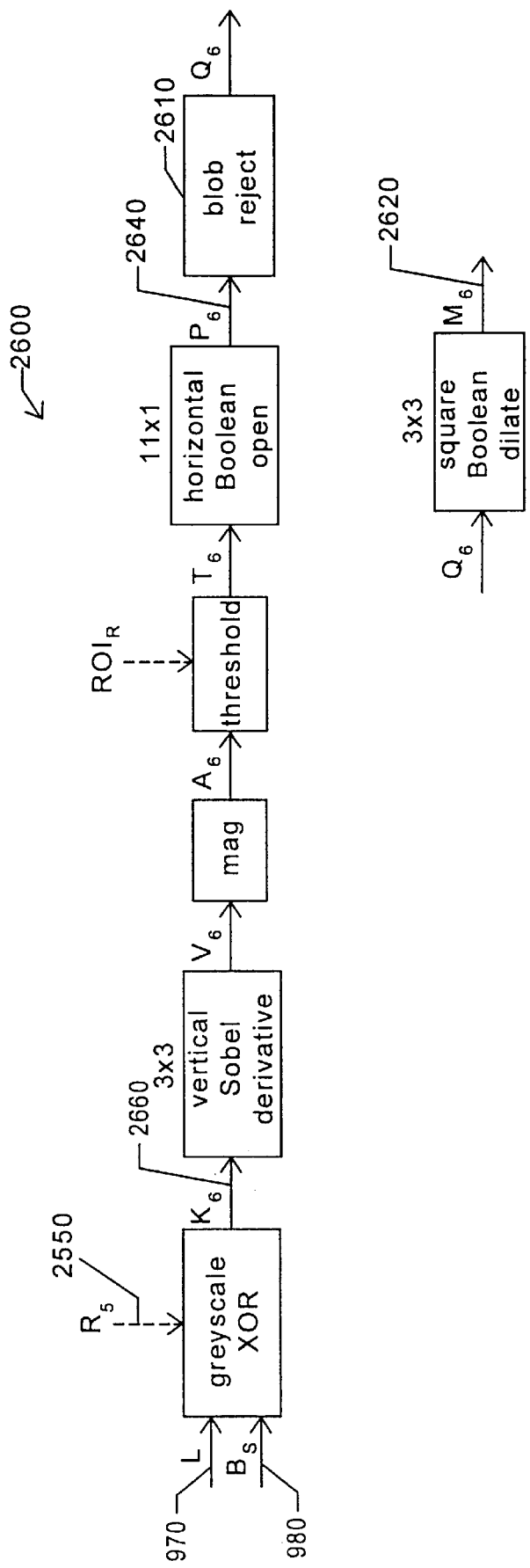
FIG. 25 illustrates a block diagram of a typical module in the segmentation block, according to an embodiment of the present invention.

FIG. 25 illustrates a block diagram of a typical module 2600 in segmentation block 610 according to an embodiment of the present invention. Module 2600 includes a blob reject module 2610. Inputs into module 2600 include extracted image L 970, first reference image $B_S$ 980, fifth blob reference mask 2550, and Region-of-Interest $ROI_R$. Module 2600 is typically used to determine blobs corresponding to horizontal line type Mura defects that are not G-Line defects. Module 2600 forms a sixth modified image 2660, a sixth segmentation mask 2640 and a revised sixth segmentation mask 2620 that represents a set of blobs meeting a certain blob criteria, such as contrast.

FIG. 26 illustrates a process for rejecting blobs from the sixth segmentation mask 2640, according to an embodiment of the present invention.

FIG. 26 illustrates in one preferred embodiment, that if blobs within sixth segmentation mask 2640 have a size count greater than $S_6$, all blobs are rejected from sixth segmentation mask 2640. Otherwise, a square Boolean dilate function is preferably performed and revised sixth segmentation mask 2620 is formed. Next, blobs that are $L_{10}$ or greater in length are classified as horizontal line Mura and blobs that do not meet the criteria are rejected. Values for $S_6$ and $L_{10}$ can be determined by one of ordinary skill in the art by ordinary experimentation, in light of the current patent disclosure.

Figure 27:
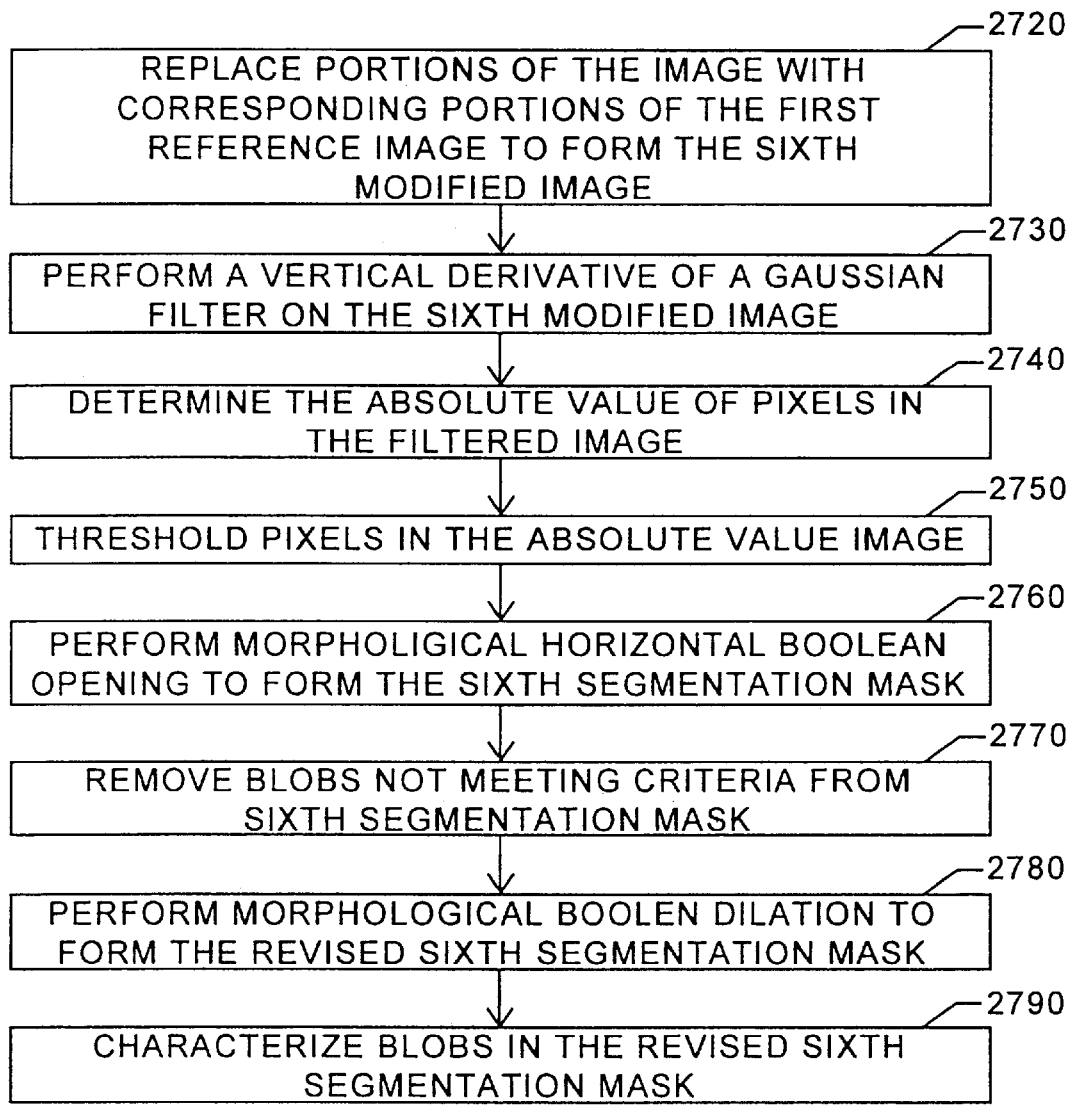
FIG. 27 is a simplified flow diagram of the operation of a module.

FIG. 27 is a simplified flow diagram of the operation of module 2600. FIG. 27 includes steps with reference to the embodiment of FIG. 25 for convenience.

Initially, sixth modified image 2660 is formed in response to the grayscale XORing of first reference image 980 ($B_S$) and extracted image L 970, referencing fifth blob reference mask 2550, step 2720. As discussed previously, preferably the pixels within sixth modified image 2660 are determined on a pixel by pixel basis depending upon the pixel values in fifth blob reference mask 2550.

Next, sixth modified image 2660 is passed through a vertical Sobel derivative filtering step, step 2730. In the preferred embodiment of the present invention, the function is a vertical derivative of a Gaussian filter and is used to highlight horizontal lines or features. Other methods for enhancing horizontal edges can alternatively be used. Because the result of step 2730 is typically signed, the absolute value of each pixel is determined to obtain the magnitude of the horizontal lines or features, step 2740.

The absolute value image ($A_6$) is then binarized using a threshold, step 2750. In particular, a threshold of the absolute value image ($A_6$) occurs preferably only in a region of interest specified by $ROI_R$. Region of interest $ROI_R$ excludes blocking and border regions. The threshold level is preferably user-definable.

The thresholded image ($T_6$) is subsequently processed using a horizontal Boolean opening function, step 2760. At this stage sixth segmentation mask 2640 is formed.

Based upon the criteria set forth above for blob reject module 2610 in FIG. 26, blobs not meeting the length criteria $S_6$ for a Horizontal Line Mura defect are preferably removed from sixth segmentation mask 2640, step 2770. Next, the image ($Q_6$) is processed using a conventional Boolean dilate function, step 2780. Blobs meeting the Horizontal Line Mura defects are preferably characterized on-line, or later, off-line, by blob analysis block 620 as discussed above, step 2790. At this stage, revised sixth segmentation mask 2620 is formed.

In alternative embodiments of the present invention, step 2790 is not performed if the user is only interested in detecting or characterizing subsequent or lower contrast blobs. If this is the case, although blobs corresponding to Horizontal Line Mura defects may be present, they are not analyzed.

Other methods, techniques, and processing steps, for determining sixth segmentation mask 2640 and revised sixth segmentation mask 2620 are foreseeable and contemplated in alternative embodiments of the present invention.

7. Vertical Line Mura Defect

Figure 28:
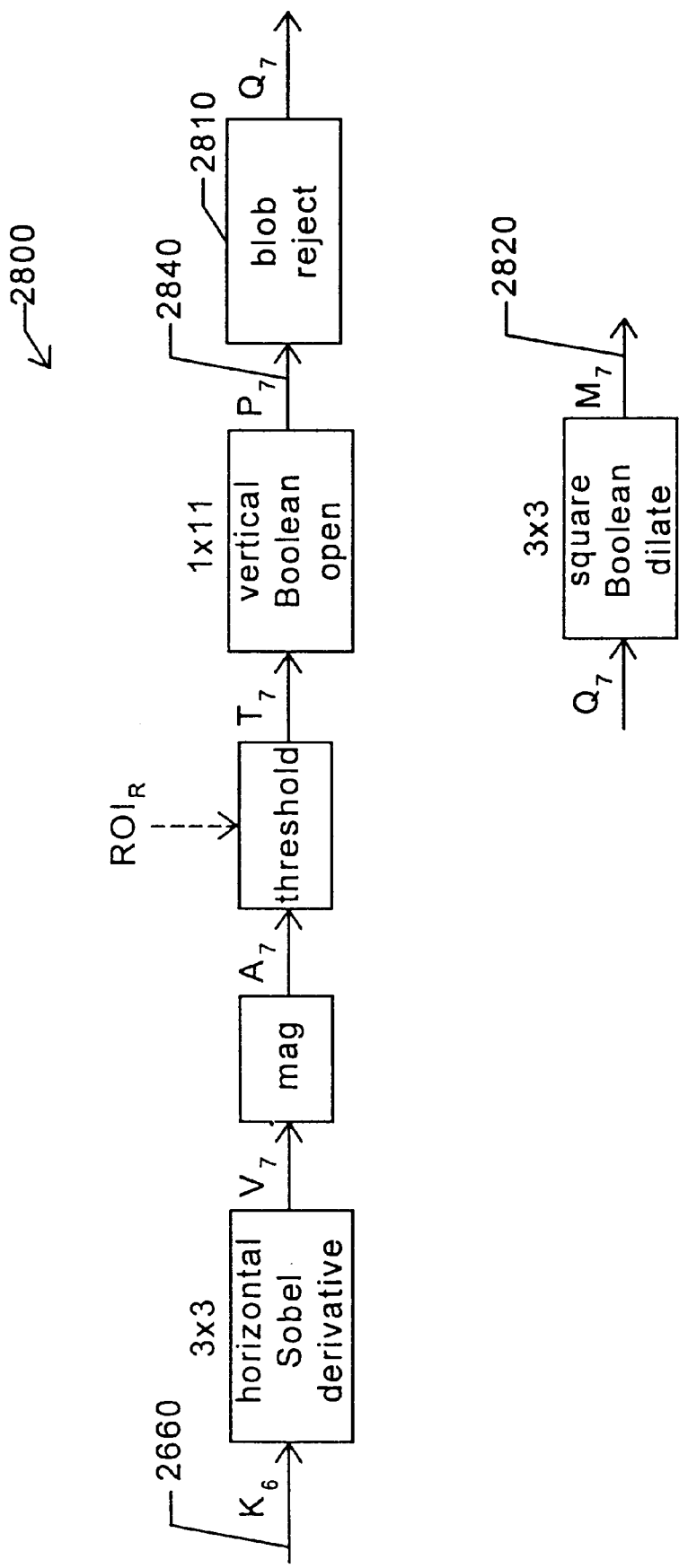
FIG. 28 illustrates a block diagram of a typical module in the segmentation block, according to an embodiment of the present invention.

FIG. 28 illustrates a block diagram of a typical module 2800 in segmentation block 610 according to an embodiment of the present invention. Module 2800 includes a blob reject module 2810. Inputs into module 2800 include sixth modified image 2660 and Region-of-Interest $ROI_R$. Module 2800 is typically used to determine blobs corresponding to vertical line type Mura defects that are not S-Line or vertical blocking defects. Module 2800 forms a seventh segmentation mask 2840 and a revised seventh segmentation mask 2820 that represents a set of blobs meeting a certain blob criteria, such as contrast.

FIG. 29 illustrates a process for rejecting blobs from seventh segmentation mask 2840, according to an embodiment of the present invention.

FIG. 29 illustrates in one embodiment, that if blobs within seventh segmentation mask 2840 have a size count greater than $S_7$, all blobs are rejected from seventh segmentation mask 2840. Otherwise, a square Boolean dilate function is preferably performed and revised seventh segmentation mask 2820 is formed. Next, blobs that are $L_{11}$ or greater in length are classified as vertical line mura and blobs that do not meet the criteria are rejected. Values for $S_7$ and $L_{11}$ can be determined by one of ordinary skill in the art by ordinary experimentation, in light of the current patent disclosure.

Figure 30:
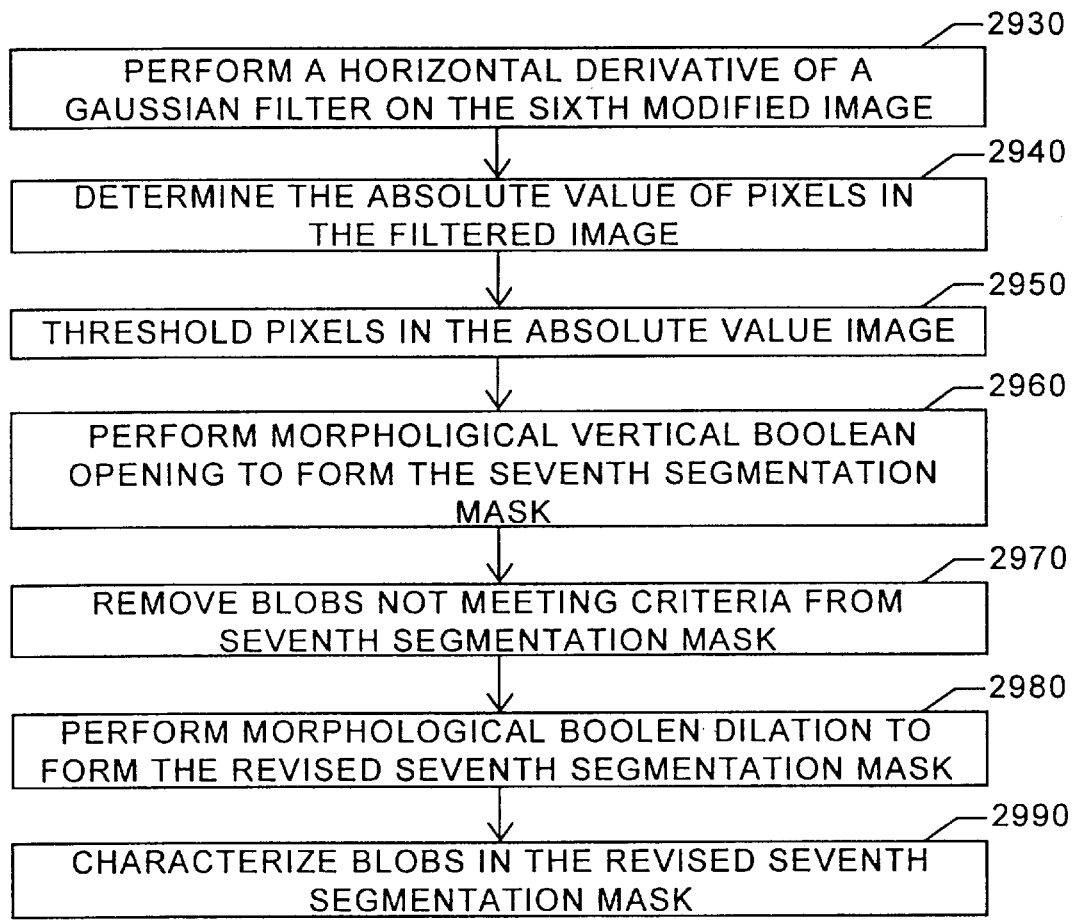
FIG. 30 is a simplified flow diagram of the operation of a module.

FIG. 30 is a simplified flow diagram of the operation of module 2800. FIG. 30 includes steps with reference to the embodiment of FIG. 28 for convenience.

Initially, sixth modified image 2660 is passed through a horizontal Sobel derivative filtering step, step 2930. In the preferred embodiment of the present invention, the function is a horizontal derivative of a Gaussian filter and is used to highlight vertical lines or features. Other methods for enhancing vertical edges can alternatively be used. Because the result of step 2930 is typically signed, the absolute value of each pixel is determined to obtain the magnitude of the vertical lines or features, step 2940.

The absolute value image ($A_7$) is then binarized using a threshold, step 2950. In particular, a threshold of the absolute value image ($A_7$) occurs preferably only in a region of interest specified by $ROI_R$. Region of interest $ROI_R$ excludes blocking and border regions. The threshold level is preferably user-definable.

The thresholded image ($T_7$) is subsequently processed using a vertical Boolean opening function, step 2960. At this stage seventh segmentation mask 2840 is formed.

Based upon the criteria set forth above for blob reject module 2810 in FIG. 29, blobs not meeting the length criteria $S_7$ for a Vertical Line Mura defect are preferably removed from seventh segmentation mask 2840, step 2 970. Next, the image ($Q_7$) is processed using a conventional Boolean dilate function, step 2980. Blobs meeting the Vertical Line Mura defects are preferably characterized on-line, or later, off-line, by blob analysis block 620 as previously described, step 2990. At this stage, revised seventh segmentation mask 2820 is formed.

In alternative embodiments of the present invention, step 2990 is not performed if the user is only interested in detecting or characterizing subsequent or lower contrast blobs. If this is the case, although blobs corresponding to Vertical Line Mura defects may be present, they are not analyzed.

Other methods, techniques, and processing steps, for determining seventh segmentation mask 2840 and revised seventh segmentation mask 2820 are foreseeable and contemplated in alternative embodiments of the present invention.

8. Positive Diagonal Line Mura Defect

A similar process for detecting Vertical line Mura defects is preferably performed for determining Positive diagonal line Mura defects.

Figure 31:
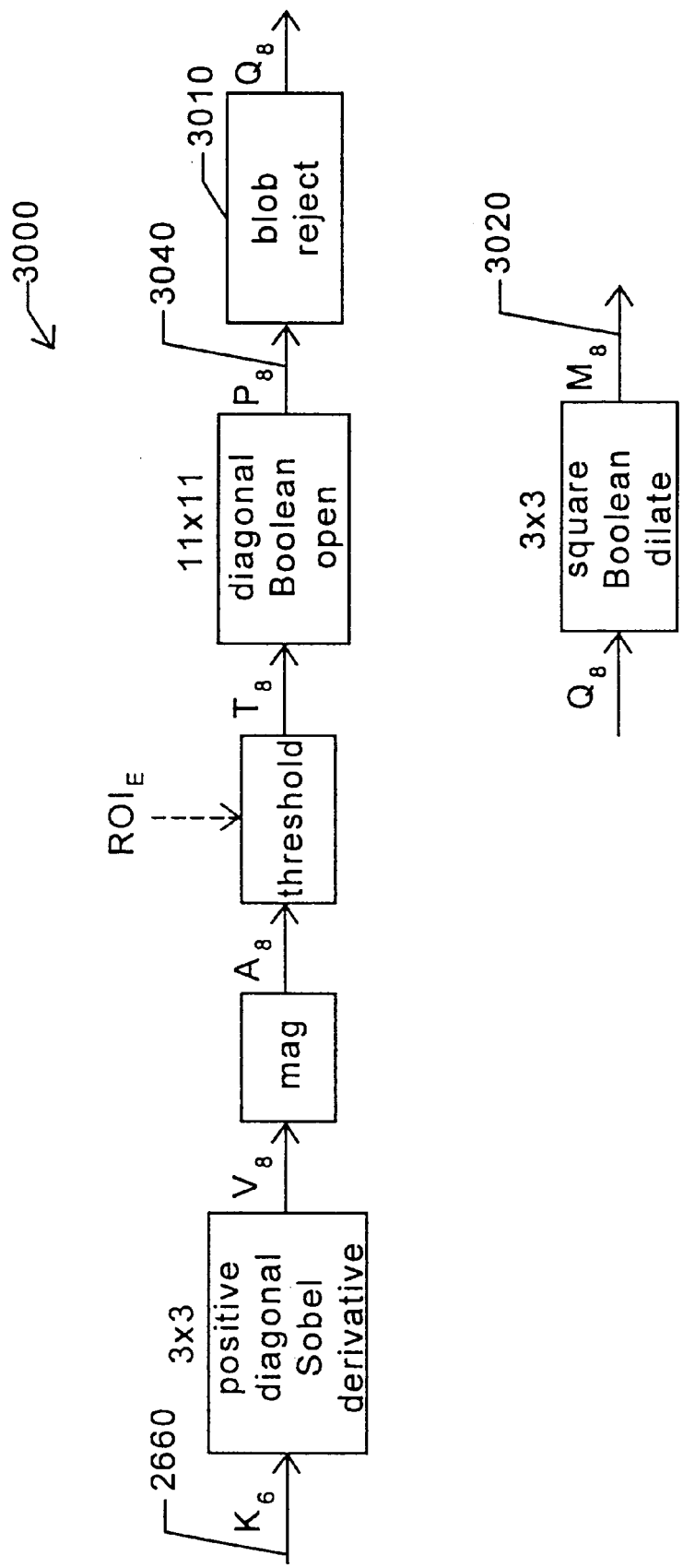
FIG. 31 illustrates a block diagram of a typical module in the segmentation block, according to an embodiment of the present invention.

FIG. 31 illustrates a block diagram of a typical module 3000 in segmentation block 610 according to an embodiment of the present invention. Module 3000 forms an eighth segmentation mask 3040 and a revised eighth segmentation mask 3020.

FIG. 32 illustrates a process for rejecting blobs from the eighth segmentation mask 3040 including rejecting blobs that have a size count greater than $S_8$ or blobs less than length $L_{12}$, according to an embodiment of the present invention.

Figure 33:
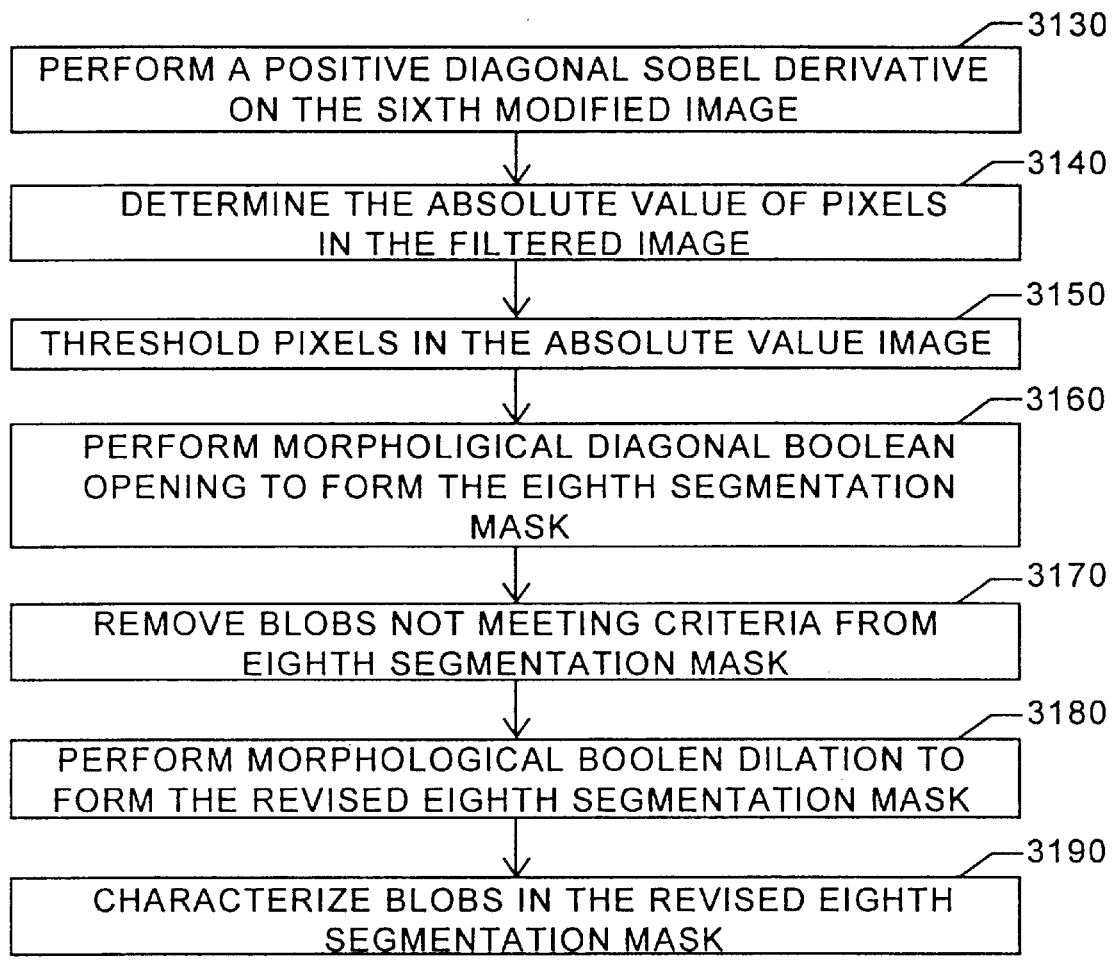
FIG. 33 is a simplified flow diagram of the operation of a module.

FIG. 33 is a simplified flow diagram of a preferred operation of module 3000, including steps 3130–3190.

In the present embodiment, the Sobel filters, threshold values, Boolean opening operations, and blob reject criteria $S_8$ and $L_{12}$ are preferably chosen to highlight and detect positive, lower left to upper right, diagonal line defects. Other methods, techniques, and processing steps, for determining eighth segmentation mask 3040 and revised eighth segmentation mask 3020 are foreseeable and contemplated in alternative embodiments of the present invention.

9. Negative Diagonal Line Mura Defect

A similar process for detecting Positive Diagonal line Mura defects is preferably performed for determining Negative diagonal line Mura defects.

Figure 34:
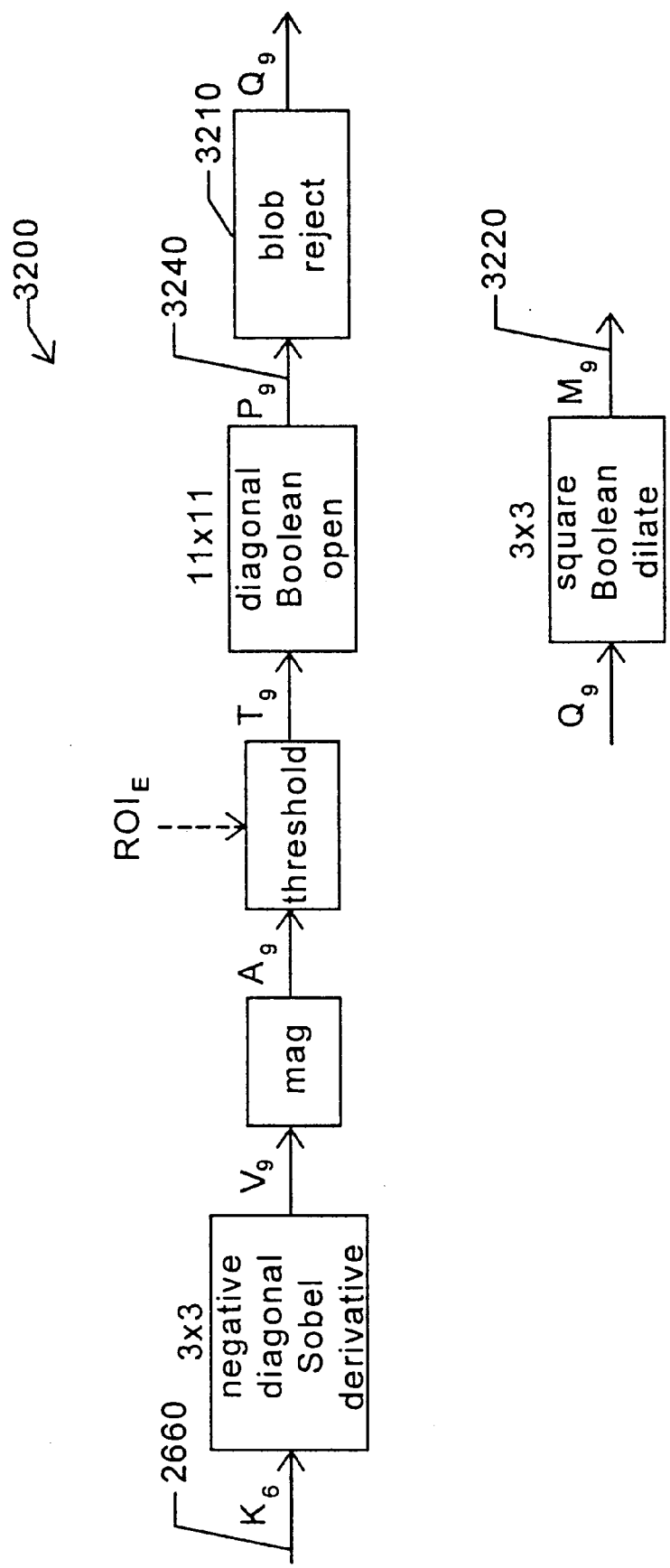
FIG. 34 illustrates a block diagram of a typical module in the segmentation block, according to an embodiment of the present invention.

FIG. 34 illustrates a block diagram of a first portion of typical module 3200 in segmentation block 610 according to an embodiment of the present invention. Module 3200 forms a ninth segmentation mask 3240 and a revised ninth segmentation mask 3220.

FIG. 35 illustrates a process for rejecting blobs from the ninth segmentation mask 3240 including rejecting blobs that have a size count greater than $S_9$ or blobs less than length $L_{13}$, according to an embodiment of the present invention.

Figure 36:
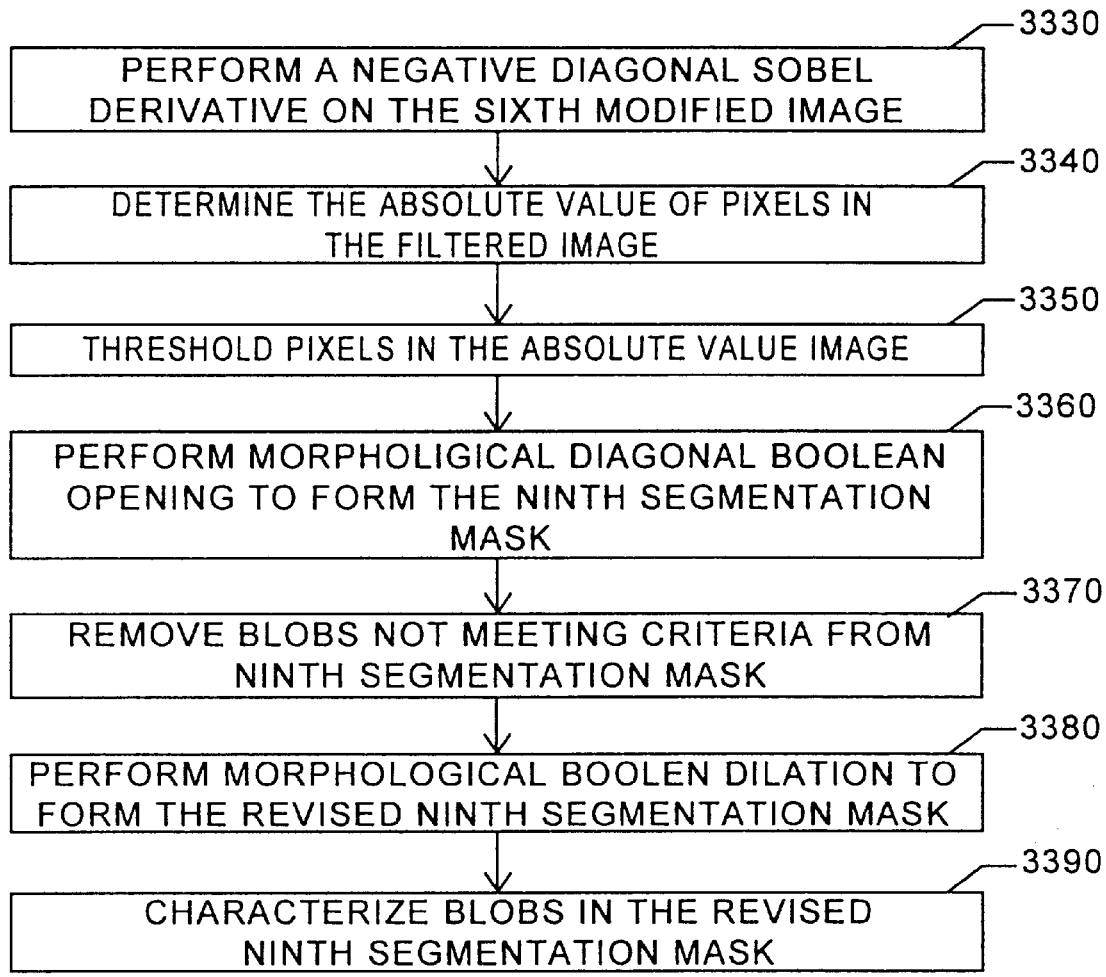
FIG. 36 is a simplified flow diagram of the operation of the first portion of a module.

FIG. 36 is a simplified flow diagram of a preferred operation of the first portion of module 3200, including steps 3330–3390.

In the present embodiment, the Sobel filters, threshold values, Boolean opening operations, and blob reject criteria $S_9$ and $L_{13}$ are preferably chosen to highlight and detect negative, upper left to lower right, diagonal line defects. Other methods, techniques, and processing steps, for determining ninth segmentation mask 3240 and revised ninth segmentation mask 3220 are foreseeable and contemplated in alternative embodiments of the present invention.

Figure 37:
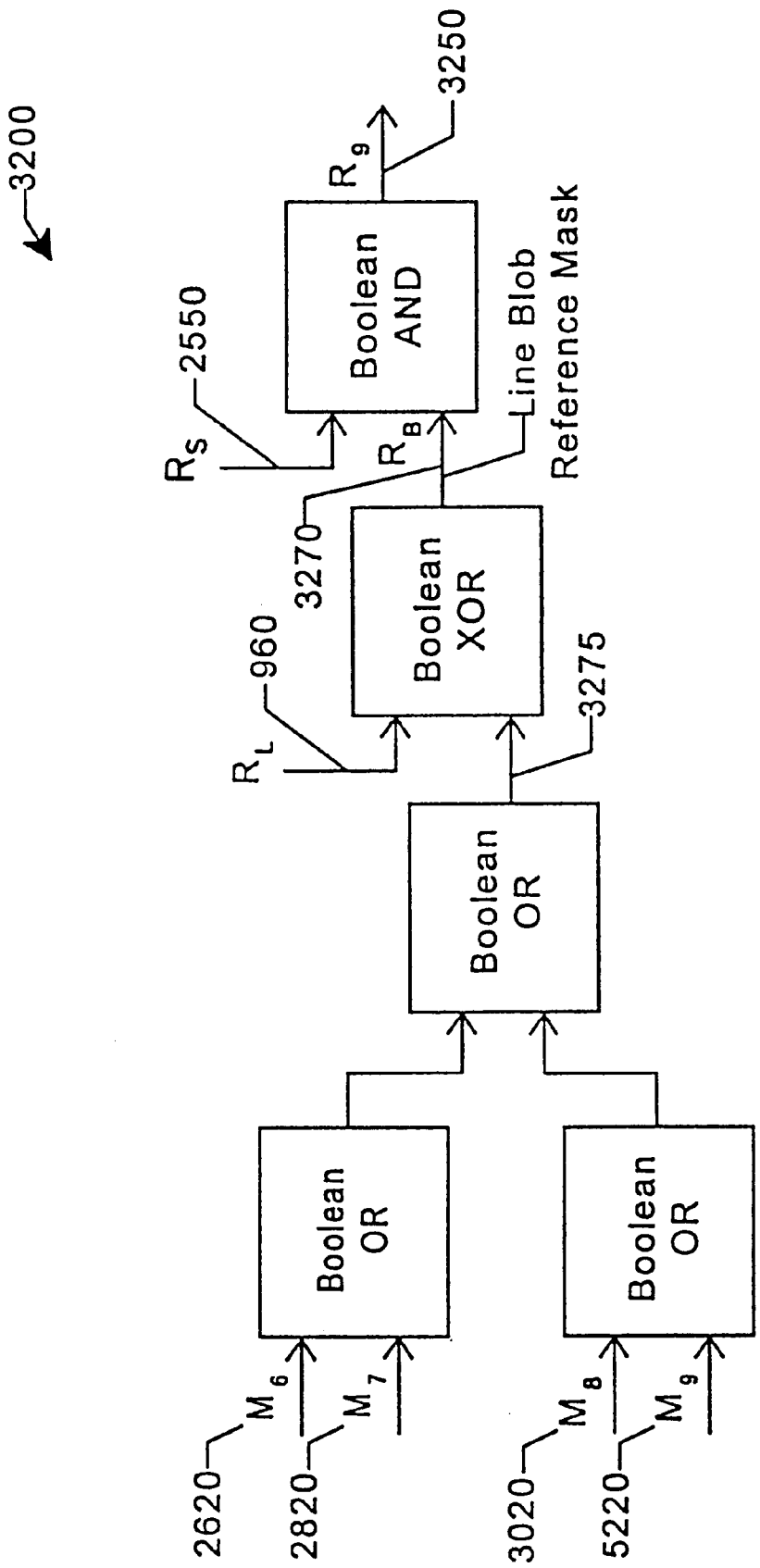
FIG. 37 illustrates a block diagram of a second portion of a module.

FIG. 37 illustrates a block diagram of a second portion of module 3200. Inputs into the second portion of module 3200 include revised sixth segmentation mask 2620, revised seventh segmentation mask 2820, revised eighth segmentation mask 3020, revised ninth segmentation mask 3220, LCD mask $R_L$ 960, and fifth blob reference mask 2550. The second portion of module 3200 forms a Line blob reference mask 3270 and a ninth blob reference mask 3250.

Figure 38:
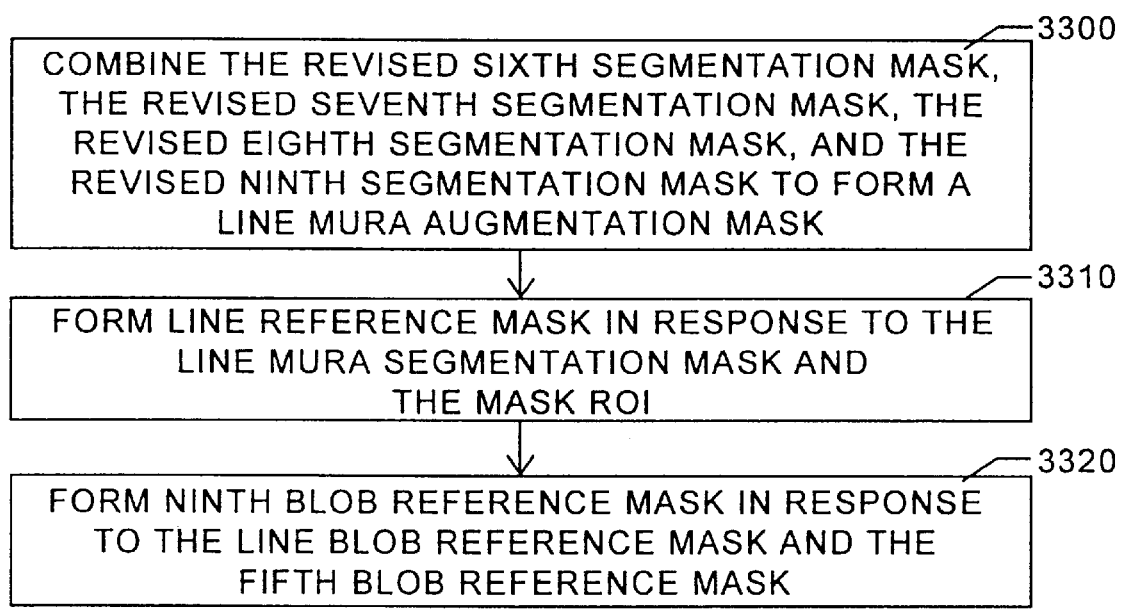
FIG. 38 is a simplified flow diagram of the operation of the second portion of a module.

FIG. 38 is a simplified flow diagram of the operation of the second portion of module 3200. FIG. 38 includes steps with reference to the embodiment of FIG. 37 for convenience.

The convention used in the present embodiment, as described above, for image masks is that all regions of the masks are high, or white, except regions representing blobs that are low, or black. In alternative embodiments, all regions are black, except regions representing blobs (white).

Initially, revised sixth segmentation mask 2620, revised seventh segmentation mask 2820, revised eighth segmentation mask 3020, and revised ninth segmentation mask 3220 are logically ORed together on a pixel by pixel basis to form a line mura segmentation mask 3275, step 3300. As a result of the convention disclosed above, line mura segmentation mask 3275 will be white in all regions, except where all of the above segmentation masks are black, i.e. where all segmentation masks agree there is a blob.

Next, the pixels in line mura segmentation mask 3275 are logically XORed with corresponding pixels in mask ROI $R_L$ 960 to form line blob reference mask 3270, step 3310.

Next, the pixels in Line blob reference mask 3270 are logically ANDed with corresponding pixels in fifth blob reference mask 2550 ($R_5$) to form the ninth blob reference mask 3250 ($R_9$), step 3320. In the preferred embodiment of the present invention, ninth blob reference mask 3250 (a binary image) will be logically high at all regions, except regions where Line Mura defects are present (logically low). In this example, blobs correspond to where defects in previous phases, and the current phase, if any, are present.

Other methods, techniques, and processing steps, for determining Line blob reference mask 3270 ($R_B$), and ninth blob reference mask 3250 are foreseeable and contemplated in alternative embodiments of the present invention.

10. Horizontal Blocking Mura Defect

A similar process for detecting Horizontal line Mura defects (Section 6) is preferably performed for determining Horizontal blocking Mura defects.

Figure 39:
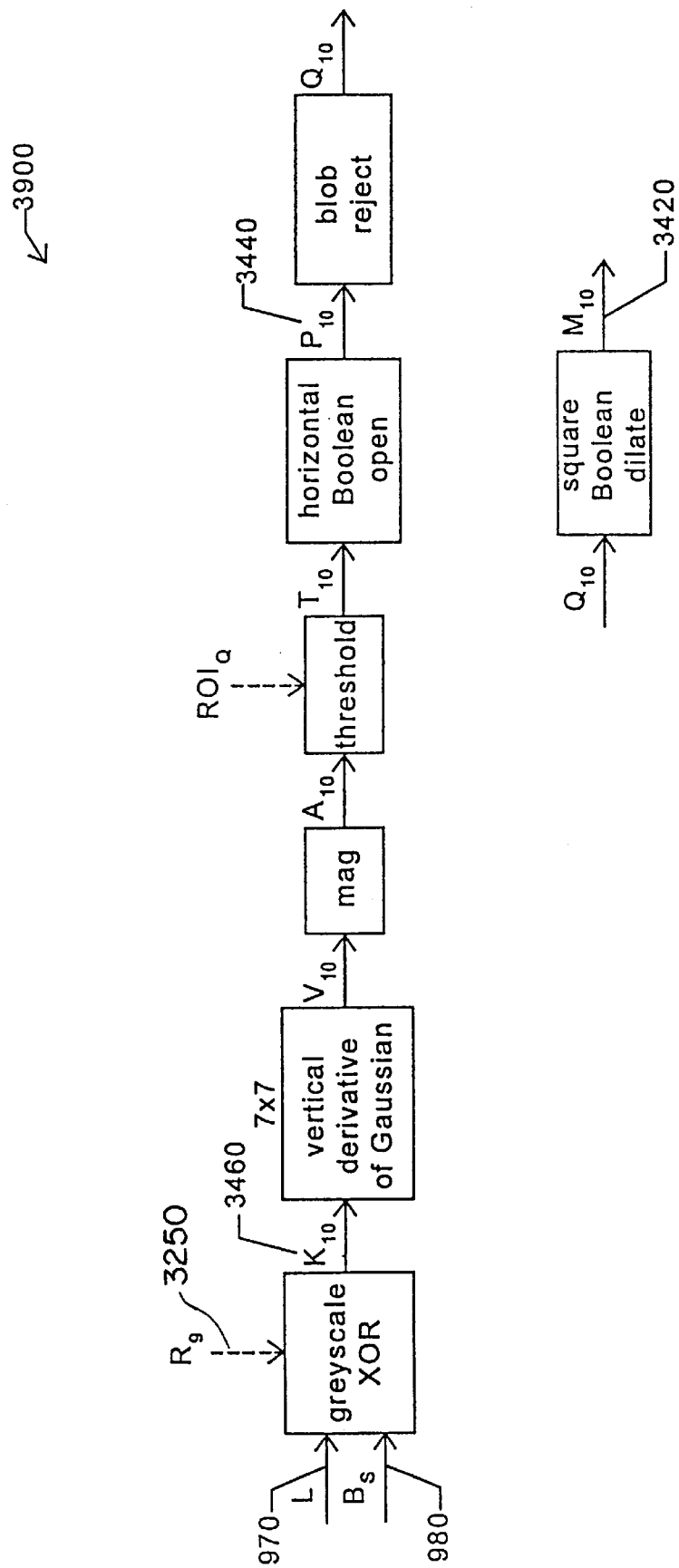
FIG. 39 illustrates a block diagram of a typical module in the segmentation block, according to an embodiment of the present invention.

FIG. 39 illustrates a block diagram of a typical module 3400 in segmentation block 610 according to an embodiment of the present invention. Module 3400 forms a tenth modified image 3460, a tenth segmentation mask 3440 and a revised tenth segmentation mask 3420.

FIG. 40 illustrates a process for rejecting blobs from the tenth segmentation mask 3440 including rejecting blobs that have a size count greater than $S_{10}$ or blobs less than $W_{18}$ and greater than $H_{18}$ according to an embodiment of the present invention.

Figure 41:
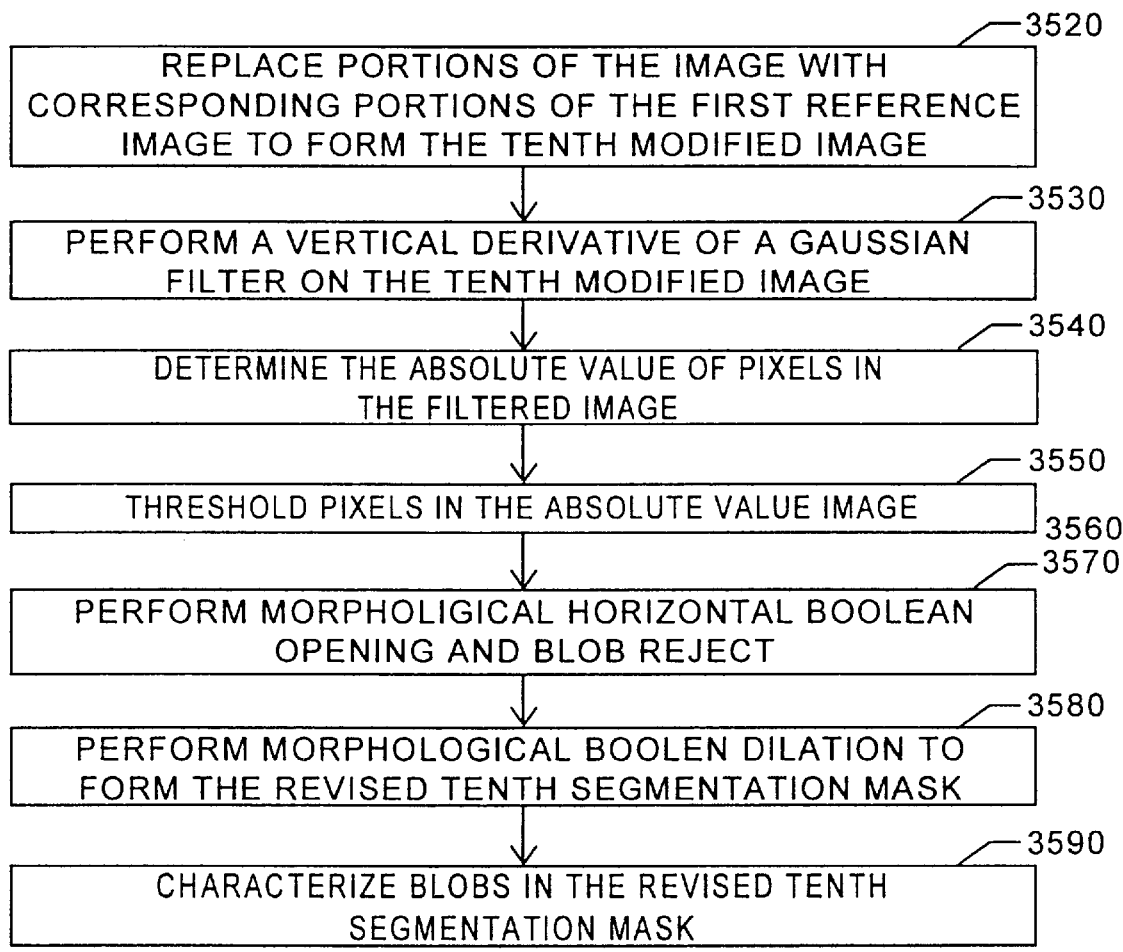
FIG. 41 is a simplified flow diagram of the operation of a module.

FIG. 41 is a simplified flow diagram of the operation of module 3400, including steps 3520–3590.

In the present embodiment, ninth blob reference mask 3250 is used to form the tenth modified image 3460. Further, the vertical derivative filters, threshold values, Boolean opening operations, blob reject criteria $S_{10}$, $W_{18}$, and $H_{18}$, etc. are preferably chosen to highlight and detect horizontal block defects. Other methods, techniques, and processing steps, for determining tenth segmentation mask 3440 and revised tenth segmentation mask 3420 are foreseeable and contemplated in alternative embodiments of the present invention.

11. Vertical Blocking Mura Defect

A similar process for detecting Vertical line Mura defects (Section 7) is preferably performed for determining Vertical blocking Mura defects.

Figure 42:
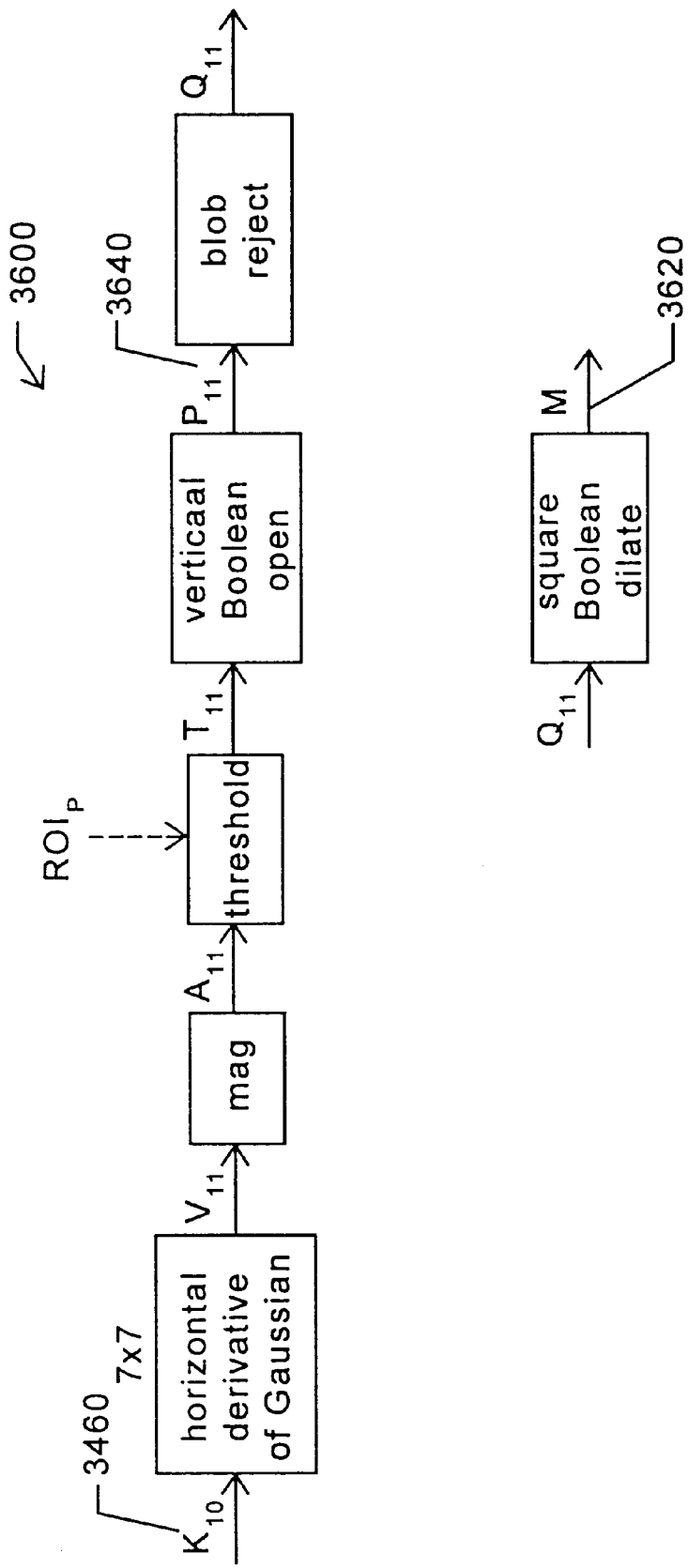
FIG. 42 illustrates a block diagram of a typical module in the segmentation block, according to an embodiment of the present invention.

FIG. 42 illustrates a block diagram of a typical module 3600 in segmentation block 610 according to an embodiment of the present invention. Module 3600 forms an eleventh segmentation mask 3640 and a revised eleventh segmentation mask 3620.

FIG. 43 illustrates a process for rejecting blobs from the eleventh segmentation mask 3640 including rejecting blobs that have a size count greater than $S_{11}$ or blobs less than $H_{19}$ or greater than $W_{19}$ according to an embodiment of the present invention.

Figure 44:
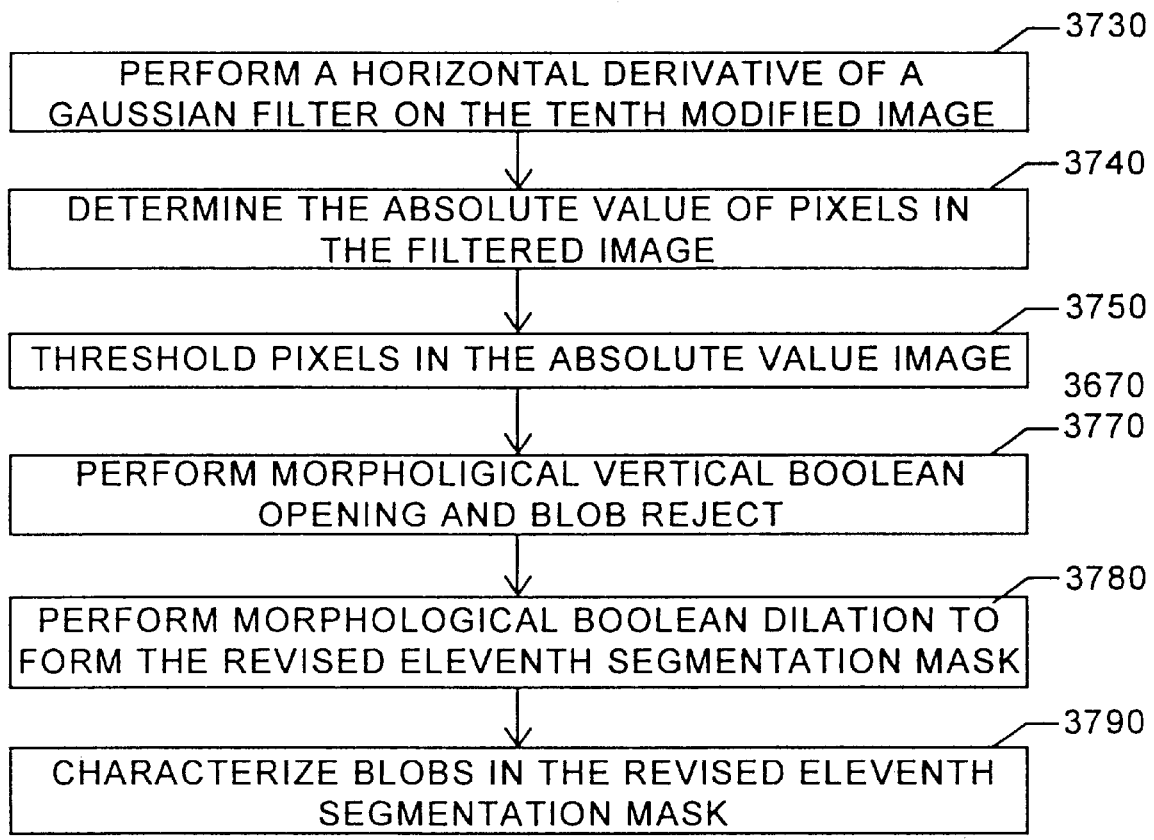
FIG. 44 is a simplified flow diagram of the operation of a module.

FIG. 44 is a simplified flow diagram of the operation of module 3600, including steps 3730–3790.

In the present embodiment, the horizontal derivative filters, threshold values, Boolean opening operations, blob reject criteria $S_{11}$, $H_{19}$, and $W_{19}$, etc. are preferably chosen to highlight and detect vertical block defects. Other methods, techniques, and processing steps, for determining eleventh segmentation mask 3640 and revised eleventh segmentation mask 3620 are foreseeable and contemplated in alternative embodiments of the present invention.

12. Bright Region Mura Defect

Figure 45:
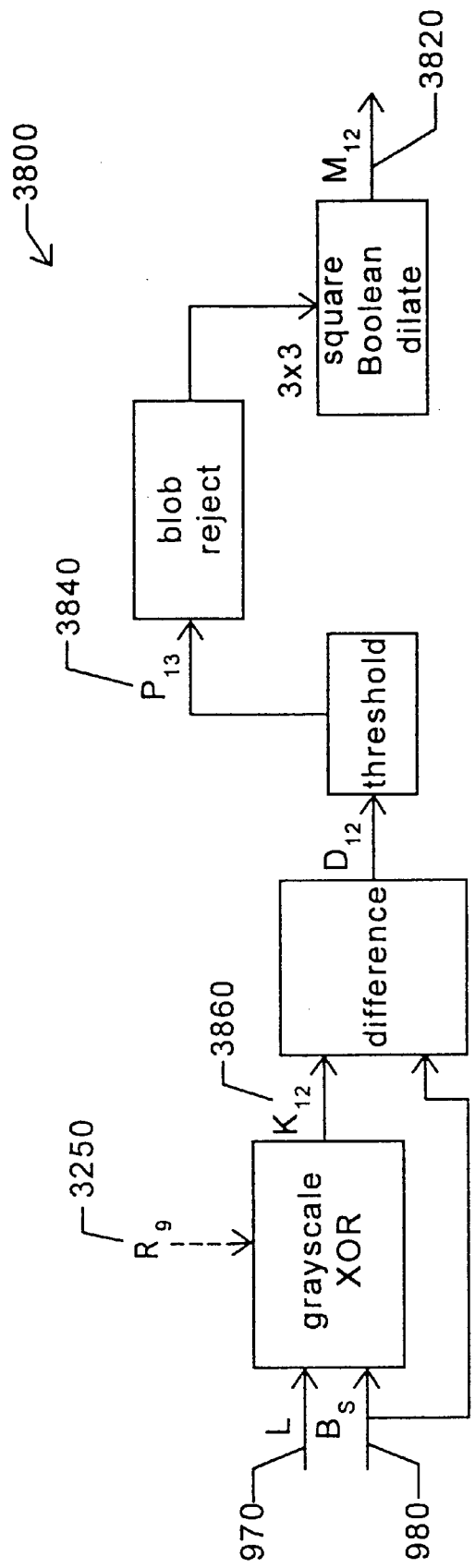
FIG. 45 illustrates a block diagram of a typical module in the segmentation block, according to an embodiment of the present invention.

FIG. 45 illustrates a block diagram of a typical module 3800 in segmentation block 610 according to an embodiment of the present invention. Inputs into module 3800 include extracted image L 970, first reference image $B_S$ 980, and ninth blob reference mask 3250. Module 3800 is typically used to determine blobs corresponding to Bright region Mura defects. Module 3800 forms a twelfth modified image 3860, a twelfth segmentation mask 3840, and a revised twelfth segmentation mask that represents a set of blobs meeting a certain blob criteria, such as contrast.

Figure 46:
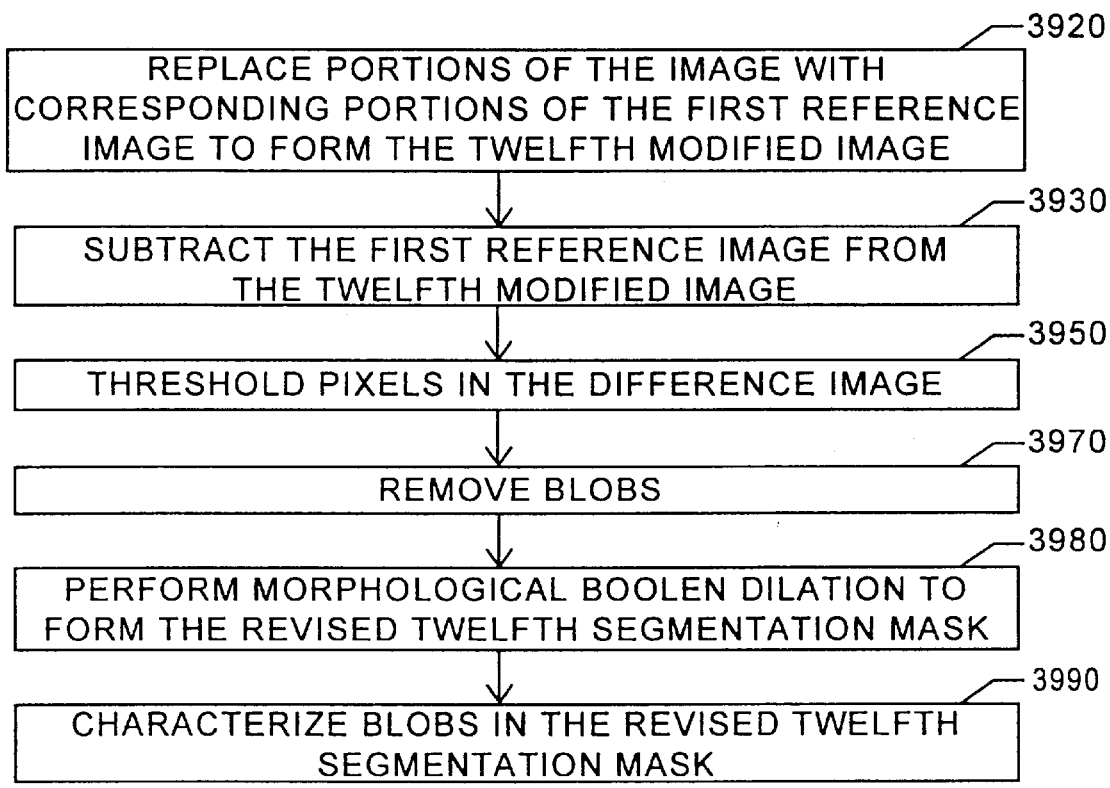
FIG. 46 is a simplified flow diagram of the operation of a module.

FIG. 46 is a simplified flow diagram of the operation of module 3800. FIG. 46 includes steps with reference to the embodiment of FIG. 45 for convenience.

Initially, twelfth modified image 3860 is formed in response to the grayscale XORing of first reference image 980 ($B_S$) and extracted image L 970, referencing ninth blob reference mask 3250, step 3920. As discussed previously, preferably the pixels within twelfth modified image 3860 are determined on a pixel by pixel basis depending upon the pixel values in ninth blob reference mask 3250.

Twelfth modified image 3860 is then subtracted on a pixel by pixel basis from reference image 980 ($B_S$), step 3930.

The difference image ($D_{12}$) is then binarized using a threshold, step 3950. In particular, a threshold of the difference image ($D_{12}$) occurs preferably on the entire image.

FIG. 47 illustrates a process for characterizing blobs from twelfth segmentation mask 3820 including rejecting blobs that have a size count greater than $S_{12}$, according to an embodiment of the present invention.

FIG. 47 illustrates in one preferred embodiment, that if no blobs corresponding to Straw Mura defects were detected in the previous phase, and if the phase count is greater than $C_{12}$: blobs touching the border and within distance $D_{14}$ from the borders are classified as white border bloom and the remaining blobs are classified as general bright regions; if the phase count is less than or equal to $C_{12}$: blobs touching the border and within distance $D_{14}$ from the borders are classified as white border bloom and the remaining blobs are classified as general bright regions.

If blobs corresponding to Straw Mura defects were detected in the previous phase, these new blobs are classified as Straw Mura. Values for $S_{12}$, distance $D_{14}$ and $C_{12}$ can be determined by one of ordinary skill in the art by ordinary experimentation, in light of the current patent disclosure.

The image ($P_{12}$) is processed using a conventional Boolean dilate function, step 3980. Blobs meeting the Bright region Mura defect criteria are preferably characterized on-line, or later, off-line, by blob analysis block 620 as described above, step 3990. At this stage, revised twelfth segmentation mask 3820 is formed.

In alternative embodiments of the present invention, step 3990 is not performed if the user is only interested in detecting or characterizing subsequent or lower contrast blobs. If this is the case, although blobs corresponding to Bright region Mura defects may be present, they are not analyzed.

Other methods, techniques, and processing steps, for determining twelfth segmentation mask 3820 are foreseeable and contemplated in alternative embodiments of the present invention.

13. Dark Region Mura Defect

Figure 48:
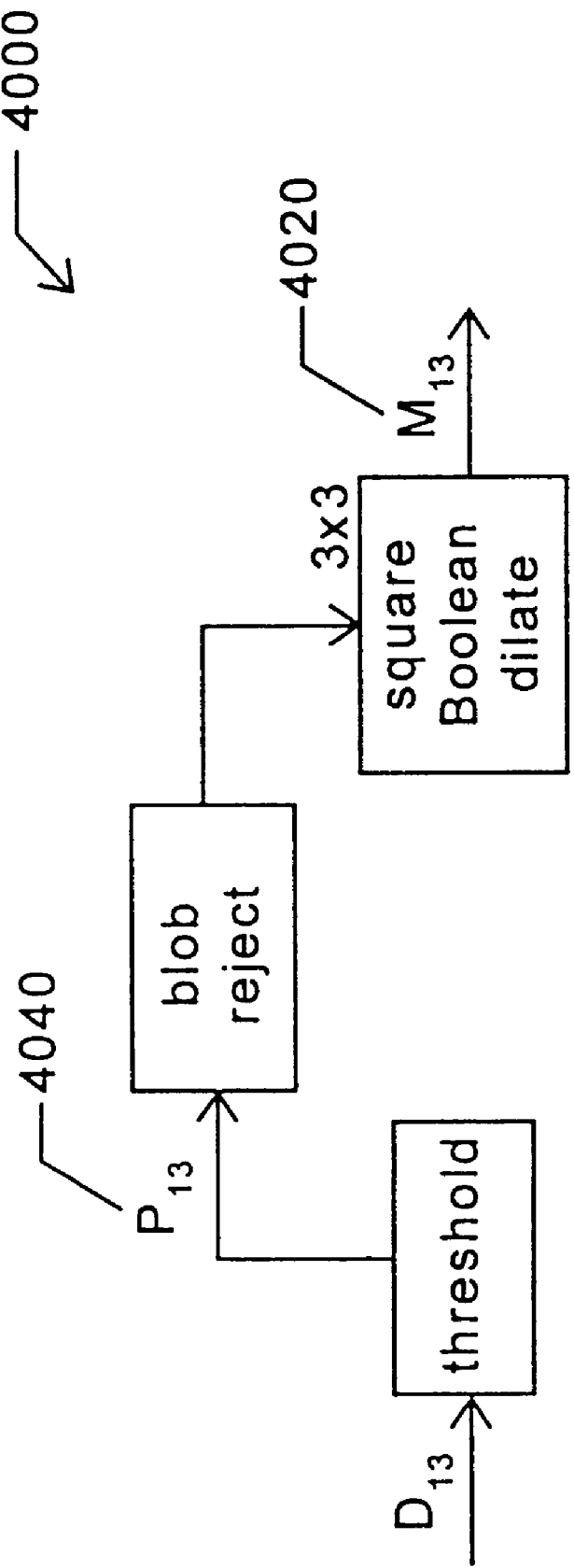
FIG. 48 illustrates a block diagram of a typical module in the segmentation block, according to an embodiment of the present invention.

FIG. 48 illustrates a block diagram of a typical module 4000 in segmentation block 610 according to an embodiment of the present invention.

Inputs into module 4000 include difference image ($D_{12}$). Module 4000 is typically used to determine blobs corresponding to Dark region Mura defects. Module 4000 forms a thirteenth segmentation mask 4040, and a revised thirteenth segmentation mask 4020 that represents a set of blobs meeting a certain blob criteria, such as contrast.

Figure 49:
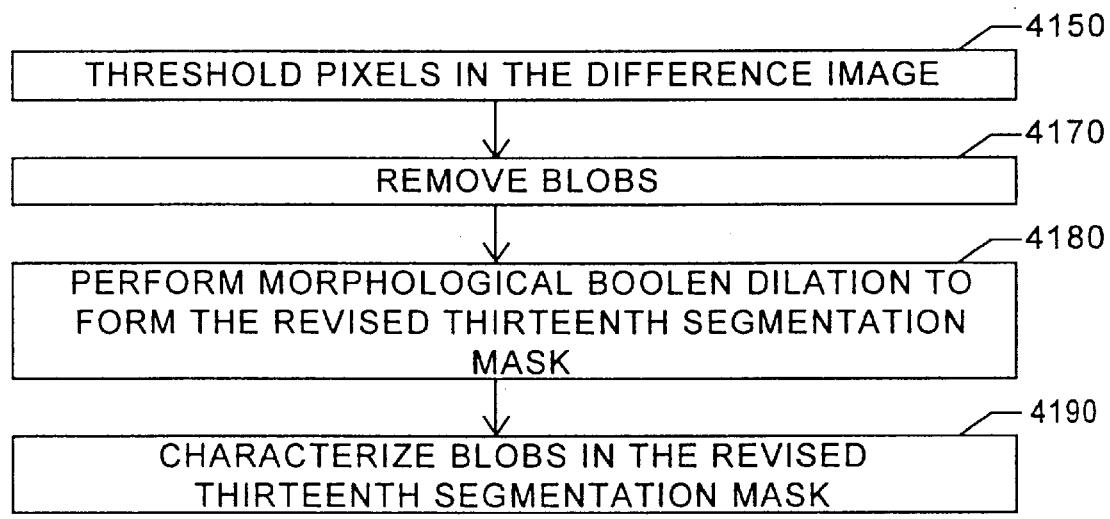
FIG. 49 is a simplified flow diagram of the operation of a module.

FIG. 49 is a simplified flow diagram of the operation of module 4000. FIG. 41 includes steps with reference to the embodiment of FIG. 48 for convenience.

Initially, the difference image ($D_{12}$) is binarized using a threshold, step 4150. In particular, a threshold of the difference image ($D_{12}$) occurs preferably on the entire image.

In the present embodiment of the present invention, morphic processor is used to detect blobs that are contiguous and appear similar to the types of blobs being detected. Further, the morphic processor is used to reject individual pixel anomalies from the image. In the present embodiment, this function is typically performed by scanning a region around a center pixel for values of neighboring pixels. For example, if the value of the center pixel is high and the values of the neighboring pixels are low, the center pixel is set low.

FIG. 50 illustrates a process for characterizing blobs from thirteenth segmentation mask 4020 including rejecting blobs that have a size count greater than $S_{13}$, according to an embodiment of the present invention.

FIG. 50 illustrates in one preferred embodiment, that if no blobs corresponding to Straw Mura defects were detected in the previous phase, and if the phase count is greater than $C_{13}$: blobs touching the border and within distance $D_{16}$ from the borders are classified as dark border bloom and the remaining blobs are classified as general dark regions; if the phase count is less than or equal to $C_{13}$: blobs touching the border and within distance $D_{16}$ from the borders are classified as dark border bloom and the remaining blobs are classified as general dark regions. If blobs corresponding to Straw Mura defects were detected in the previous phase, these new blobs are also classified as Straw Mura. Values for $S_{13}$, distance $D_{16}$ and $C_{13}$ can be determined by one of ordinary skill in the art by ordinary experimentation, in light of the current patent disclosure.

Next, the image ($P_{13}$) is processed using a conventional Boolean dilate function, step 4180. Blobs meeting the Dark region Mura defect criteria are preferably characterized on-line, or later, off-line, by blob analysis block 620, step 4190. At this stage, revised thirteenth segmentation mask 4020 is formed.

In alternative embodiments of the present invention, step 4190 is not performed if the user is only interested in detecting or characterizing subsequent or lower contrast blobs. If this is the case, although blobs corresponding to Dark region Mura defects may be present, they are not analyzed.

Other methods, techniques, and processing steps, for determining thirteenth segmentation mask 4020 are foreseeable and contemplated in alternative embodiments of the present invention.

14. Bright BNU Mura Defect

Figure 51:
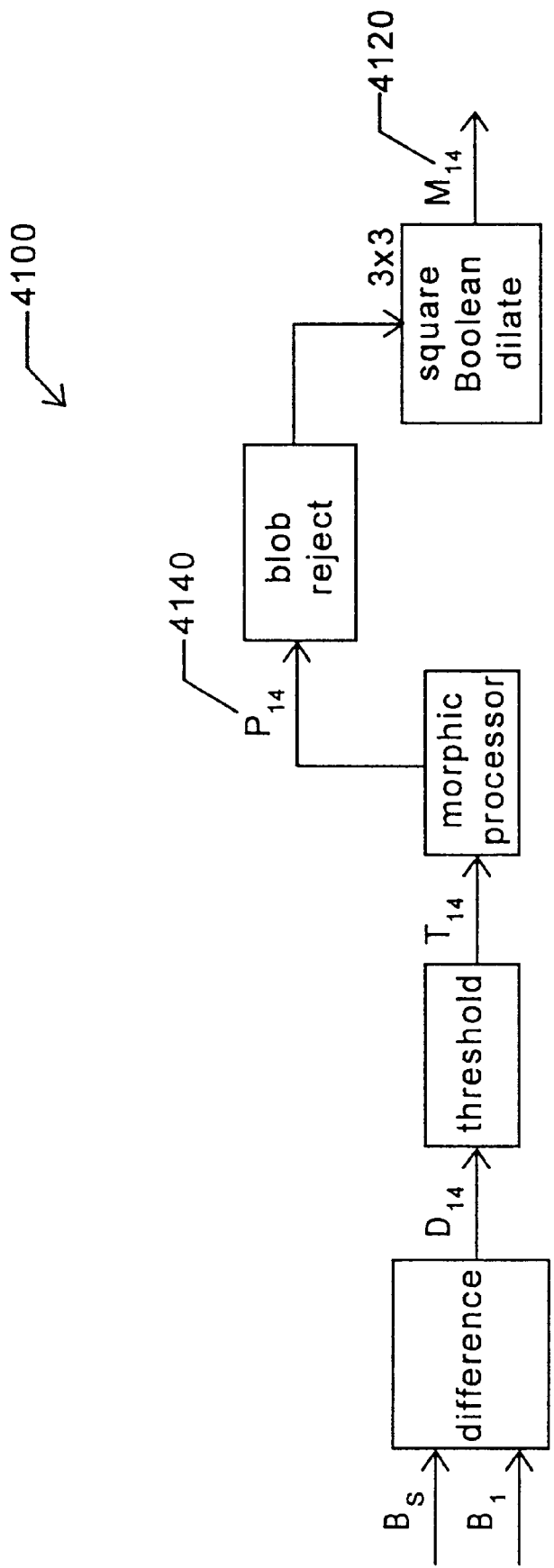
FIG. 51 illustrates a block diagram of a typical module in the segmentation block, according to an embodiment of the present invention.

FIG. 51 illustrates a block diagram of a typical module 4100 in segmentation block 610 according to an embodiment of the present invention. Inputs into module 4100 include reference image $B_S$ 980 and second reference image $B_1$ 990. Module 4100 is typically used to determine large area bright brightness-non-uniformities (BNU). Module 4100 forms a fourteenth segmentation mask 4140 and a revised fourteenth segmentation mask 4120 that represents a set of blobs meeting a certain blob criteria, such as contrast.

Figure 52:
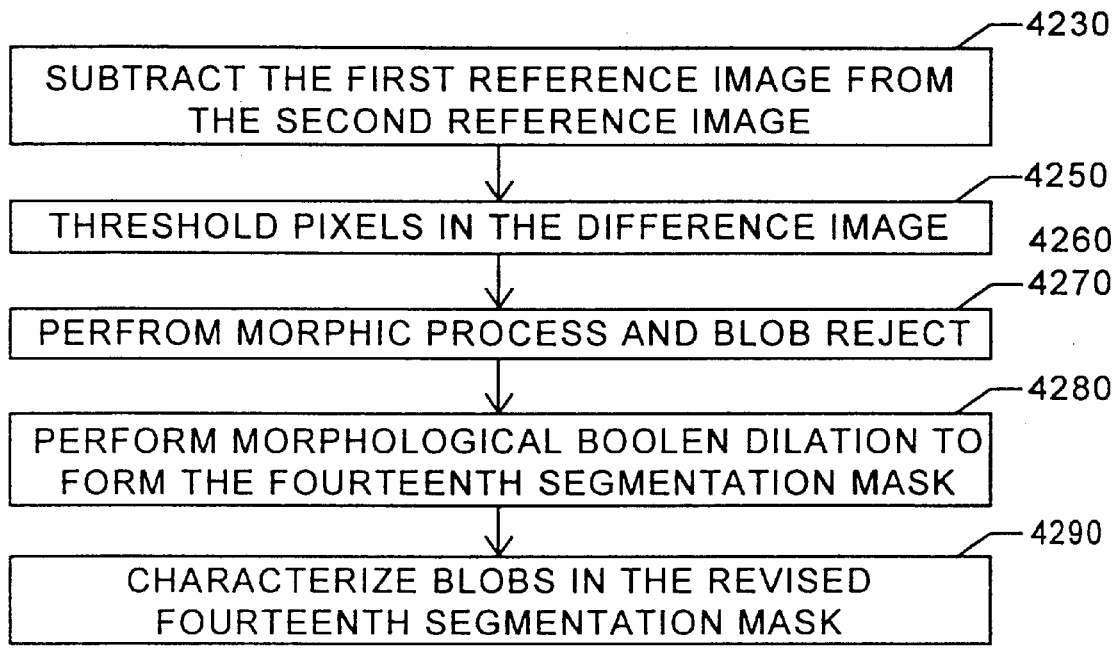
FIG. 52 is a simplified flow diagram of the operation of a module.

FIG. 52 is a simplified flow diagram of the operation of module 4100. FIG. 52 includes steps with reference to the embodiment of FIG. 51 for convenience.

Initially, first reference image $B_S$ 980 and second reference image 990 are subtracted on a pixel by pixel basis, step 4230.

The difference image ($D_{14}$) is then binarized using a threshold, step 4250. In particular, a threshold of the difference image ($D_{14}$) occurs preferably on the entire image. The thresholded image ($T_{14}$) is subsequently processed using a morphic processor, step 4260.

In the present embodiment of the present invention, morphic processor is used to detect blobs that are contiguous and appear similar to the types of blobs being detected. Further, the morphic processor is used to reject individual pixel anomalies from the image. In the present embodiment, this function is typically performed by scanning a region around a center pixel for values of neighboring pixels. Next, blobs not meeting certain criteria are rejected, step 4270.

Next, the image is processed using a conventional Boolean dilate function, step 4280. Blobs meeting the Bright BNU Mura defect criteria are preferably characterized on-line, or later, off-line, by blob analysis block 620, step 4290. At this stage, revised fourteenth segmentation mask 4120 is formed.

In alternative embodiments of the present invention, step 4290 is not performed if the user is only interested in detecting or characterizing subsequent or lower contrast blobs. If this is the case, although blobs corresponding to Bright BNU Mura defects may be present, they are not analyzed.

Other methods, techniques, and processing steps, for determining revised fourteenth segmentation mask 4120 are foreseeable and contemplated in alternative embodiments of the present invention.

FIG. 53 illustrates a process for characterizing blobs from fourteenth segmentation mask 4140 including rejecting blobs that have a size count greater than $S_{14}$, according to an embodiment of the present invention. Values for $S_{14}$, $W_{21}$, and $H_{21}$ can be determined by one of ordinary skill in the art by ordinary experimentation, in light of the current patent disclosure.

15. Dark BNU Mura Defect

Figure 54:
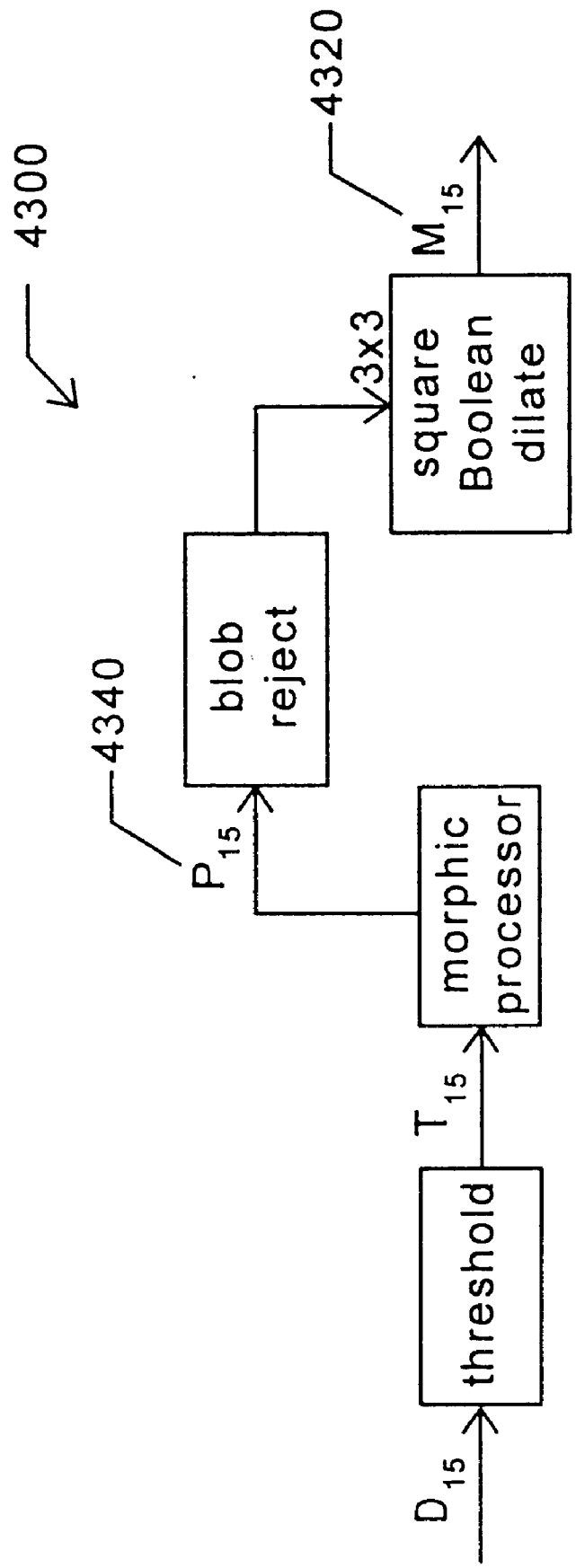
FIG. 54 illustrates a block diagram of a typical module in the segmentation block, according to an embodiment of the present invention.

FIG. 54 illustrates a block diagram of a typical module 4300 in segmentation block 610 according to an embodiment of the present invention. Inputs into module 4300 include the difference image $D_{14}$. Module 4300 is typically used to determine large area dark BNU. Module 4300 forms a fifteenth segmentation mask 4340 and a revised fifteenth segmentation mask 4320 that represents a set of blobs meeting a certain blob criteria, such as contrast.

Figure 55:
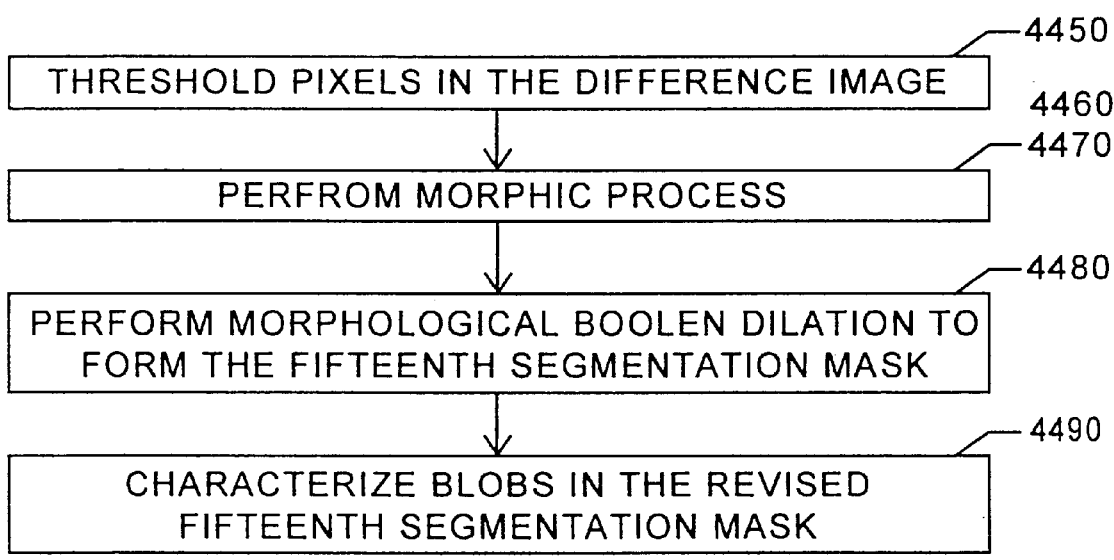
FIG. 55 is a simplified flow diagram of the operation of a module.

FIG. 55 is a simplified flow diagram of the operation of module 4300. FIG. 55 includes steps with reference to the embodiment of FIG. 54 for convenience.

Initially, the difference image ($D_{14}$) is binarized using a threshold, step 4450. In particular, a threshold of the difference image ($D_{14}$) occurs preferably on the entire image. The thresholded image ($T_{15}$) is subsequently processed using a morphic processor, step 4460.

In the present embodiment of the present invention, morphic processor is used to detect blobs that are contiguous and appear similar to the types of blobs being detected. Further, the morphic processor is used to reject individual pixel anomalies from the image. In the present embodiment, this function is typically performed by scanning a region around a center pixel for values of neighboring pixels. Next a blob reject step is performed, step 4470.

FIG. 56 illustrates a process for characterizing blobs from fifteenth segmentation mask 4340 including rejecting blobs that have a size count greater than $S_{15}$, according to an embodiment of the present invention. Values for $S_{15}$ $W_{23}$ and $H_{23}$ can be determined by one of ordinary skill in the art by ordinary experimentation, in light of the current patent disclosure.

Next, the image ($P_{15}$) is processed using a conventional Boolean dilate function, step 4480. Blobs meeting the Dark BNU Mura defect criteria are preferably characterized on-line, or later, off-line, by blob analysis block 620, step 4490. At this stage, revised fifteenth segmentation mask 4340 is formed.

In alternative embodiments of the present invention, step 4490 is not performed if the user is only interested in detecting or characterizing subsequent or lower contrast blobs. If this is the case, although blobs corresponding to Dark BNU Mura defects may be present, they are not analyzed.

Other methods, techniques, and processing steps, for determining revised fifteenth segmentation mask 4340 are foreseeable and contemplated in alternative embodiments of the present invention.

16. Parameters

Typical blob detection for Blob and Shape Analysis Module 620 includes determining a bounding box of blobs in each phase to reduce blob processing time. Further, blobs within each phase are typically characterized by the following characteristics: box width, box height, area, perimeter. Other exemplary parameters include contrast, and the like.

The following is an exemplary list of parameters used in the above respective modules for the different Phases, it should be understood, the value in the table will vary according to specific embodiments and applications. Thus, the values in the tables are only illustrative of one of the many embodiments possible.

TABLE 1

Mura Thresholds: $T_n$

| Value | Phase |
|---|---|
| 75 | 1-S-line defect (default = 75) |
| 75 | 2-G-line defect (default = 75) |
| 125 | 3-straw defect (default = 125) |
| 150 | 4-strong white defect (default = 150) |
| −150 | 5-strong black defect (default = 150) |
| 50 | 6-horizontal line defect (default = 60) |
| 50 | 7-vertical line defect (default = 50) |
| 40 | 8-positive diagonal line defect (default = 40) |
| 40 | 9-negative diagonal line defect (default = 40) |
| 35 | 10-horizontal blocking defect (default = 35) |
| 35 | 11-vertical blocking defect (default = 35) |
| 100 | 12-bright region defect (default = 120) |
| −50 | 13-dark region defect (default = 40) |
| 325 | 14-bright non-uniformity defect (default = 325) |
| −325 | 15-dark non-uniformity defect (default = −325) |

TABLE 2

Mura size checks: $S_n$

| Value | Phase |
|---|---|
| 50000 | 1-S-line defect (default = 50000) |
| 50000 | 2-G-line defect (default = 50000) |
| 750 | 3-straw defect (default = 750) |
| 10000 | 4-strong white defect (default = 10000) |
| 10000 | 5-strong black defect (default = 10000) |
| 10000 | 6-horizontal line defect (default = 10000) |
| 10000 | 7-vertical line defect (default = 10000) |
| 10000 | 8-positive diagonal line defect (default = 10000) |
| 10000 | 9-negative diagonal line defect (default = 10000) |
| 10000 | 10-horizontal blocking defect (default = 10000) |
| 10000 | 11-dark region defect (default = 10000) |
| 25000 | 12-bright region defect (default = 25000) |
| 25000 | 13-dark region defect (default = 25000) |
| 300000 | 14-bright non-uniformity defect (default = 300000) |
| 300000 | 15-dark non-uniformity defect (default = 300000) |

TABLE 3

Mura constraints: $W_n$, $H_n$, $D_n$

| Value | Class Constraint |
|---|---|
| 100 | 1-S-line defect height (default = 100) |
| 12 | 1-S-line defect width (default = 12) |
| 12 | 2-G-line defect height (default = 12) |
| 100 | 2-G-line defect width (default = 100) |
| 16 | 4-interior strong white defect height (default = 16) |
| 16 | 4-interior strong white defect width (default = 16) |
| 30 | 5-corner strong white defect height (default = 30) |
| 30 | 5-corner strong white defect width (default = 30) |
| 3 | 6-border strong white defect border distance (default = 3) |
| 16 | 7-interior strong black defect height (default = 16) |
| 16 | 7-interior strong black defect width (default = 16) |
| 30 | 8-corner strong black defect height (default = 30) |
| 30 | 8-corner strong black defect width (default = 30) |
| 3 | 9-border strong black defect border distance (default = 3) |
| 20 | 10-horizontal line defect length (default = 20) |
| 20 | 11-vertical line defect length (default = 20) |
| 20 | 12-positive diagonal line defect length (default = 20) |
| 20 | 13-negative diagonal line defect length (default = 20) |
| 5 | 14-bright region defect border distance (default = 5) |
| 5 | 16-dark region defect border distance (default = 5) |
| 8 | 18-horizontal blocking defect height (default = 8) |
| 30 | 18-horizontal blocking defect width (default = 30) |
| 30 | 19-vertical blocking defect height (default = 30) |
| 8 | 19-vertical blocking defect width (default = 8) |
| 50 | 21-bright non-uniformity defect height (default = 50) |
| 50 | 21-bright non-uniformity defect width (default = 50) |
| 50 | 23-dark non-uniformity defect height (default = 50) |
| 50 | 23-dark non-uniformity defect width (default = 50) |

TABLE 4

Mura phase counts: $C_n$

| Value | Phase |
|---|---|
| 600 | 12-bright region defect (default = 600) |
| 600 | 13-dark region defect (default = 600) |

TABLE 5

Mura measures

| Value | Class |
|---|---|
| 1.00 | 1-vertical S-line defect (default = 100) |
| 1.00 | 2-horizontal G-line defect (default = 100) |
| 0.50 | 3-straw pattern defect (default = 0.50) |
| 1.00 | 4-white interior spot defect (default = 1.00) |
| 1.00 | 5-white corner spot defect (default = 1.00) |
| 1.00 | 6-white border bloom defect (default = 1.00) |
| 1.00 | 7-black interior spot defect (default = 1.00) |
| 1.00 | 8-black corner spot defect (default = 1.00) |
| 1.00 | 9-black border bloom defect (default = 1.00) |
| 0.25 | 10-positive diagonal line defect (default = 0.25) |
| 0.35 | 11-negative diagonal line defect (default = 0.25) |
| 0.35 | 12-horizontal line defect (default = 0.35) |
| 0.35 | 13-vertical line defect (default = 0.35) |
| 3.00 | 14-bright region defect (default = 3.00) |
| 0.75 | 15-bright region collection defect (default = 3.00) |
| 3.00 | 16-dark region defect (default = 3.00) |
| 0.75 | 17-dark region collection defect (default = 0.75) |
| 0.50 | 18-horizontal blocking defect (default = 0.50) |
| 0.50 | 19-vertical blocking defect (default = 0.50) |
| 1.00 | 20-bright region non-uniformity defect (default = 1.00) |
| 0.50 | 21-bright border non-uniformity defect (default = 0.50) |
| 1.00 | 22-dark region non-uniformity defect (default = 1.00) |
| 0.50 | 23-dark border non-uniformity defect (default = 0.50) |

IV. Example

Figure 57K:
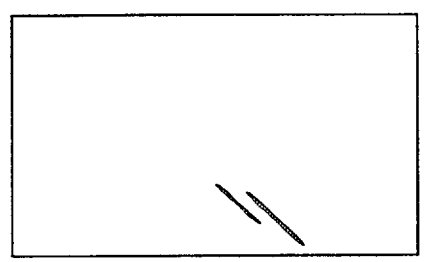
Figure 57O:
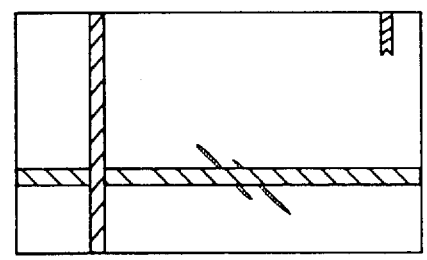
Figure 57L:
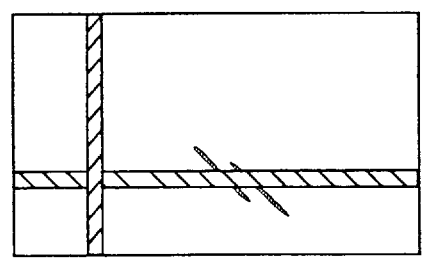
Figure 57P:
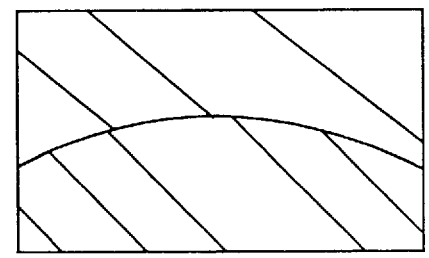

FIGS. 57a–p illustrate an example of the present invention.

FIGS. 57a illustrates a typical image 4500 including a vertical S-line defect 4510, a horizontal G-line defect 4520, a vertical line defect 4530, and straw mura defects 4540. Typical image 4500 typically includes areas of different intensity, 4550 and 4560, due to viewing angle distortions. Typically these are ignored in the present invention, and are inspected in other applications.

FIG. 57b illustrate the first reference image formed in response to typical image 4500.

FIG. 57c illustrates the result of a threshold detection of vertical line segments. When detecting for S-Line defects, defects such as 4530 that are not located in a region for a S-Line defect, are ignored.

As is illustrated in FIG. 57c, S-line defect 4510 has a break 4570. However, because a prior knowledge is known about how a typical S-line appears, the entire S-line defect is detected in FIG. 57d. FIG. 57d illustrates a "first" blob reference mask.

FIG. 57e illustrates the "second" modified image. That is at areas where first blob reference mask are present, the corresponding portions of the first reference mask are substituted for the typical image 4500. As can be seen, break 4580 is due to this substitution.

FIG. 57f illustrates the detection of horizontal blobs, and FIG. 57g illustrates the G-line blob reference mask.

FIG. 57h illustrates the "second" blob reference mask, a logical AND between FIG. 57d and FIG. 57g.

FIG. 57i illustrates the "third" modified image. That is at areas where second blob reference mask are present, the corresponding portions of the first reference mask are substituted for the typical image 4500. As can be seen, break 4590 and 4600 are due to this substitution.

FIG. 57j illustrates the detection of straw blobs, and FIG. 57l illustrates the straw reference mask after the square Boolean dilate step.

FIG. 57l illustrates the "third" blob reference mask, a logical AND between FIG. 57k and FIG. 57h.

FIG. 57m illustrates the "fourth" modified image. That is at areas where third blob reference mask are present, the corresponding portions of the first reference mask are substituted for the typical image 4500.

FIG. 57n illustrates the detection of line blobs, and FIG. 57p illustrates the line blob reference mask.

FIG. 57o illustrates the "fourth" blob reference mask, a logical AND between FIG. 57a and FIG. 57l.

FIG. 57p illustrates the "fifth" modified image. That is at areas where fourth blob reference mask are present, the corresponding portions of the first reference mask are substituted for the typical image 4500.

Further detection and characterization of other types of blobs is envisioned.

Conclusion

In the foregoing specification, the invention has been described with reference to specific exemplary embodiments thereof. Many changes or modifications are readily envisioned.

Embodiments are described in terms of performing a first process on an image and then a second process on the output of the first process. However, it should be clearly understood that processing may occur in a continuous processing pipeline, or frame by frame. In a typical example, suppose a Sobel filter (3×3) is performed on an image, followed by a threshold function. Because the image is a stream of pixels in a processing pipeline, output pixels from the Sobel filter typically appear on the processing pipeline approximately three pixel lines after they are input into the Sobel filter. The output pixels can then immediately be input into the threshold function, even before the Sobel filter has processed the entire image. Although there typically is some latency due to processing, processing by subsequent modules typically can begin before previous modules have finished. This concept is well known to one of ordinary skill in the art.

In the above embodiment, blob reference masks were logically high at all regions, except where blobs are present, logically low. Thus, to combine blob reference masks of different phases, the Boolean AND function was used. In alternative embodiments, blob reference masks are logically low at all regions, except where blobs are present, logically high. Thus, to combine blob reference masks of different phases, the Boolean OR function is preferably used.

In an alternative embodiment, blob reference masks of different phases are not combined. As a result, the user is able to "remove" defects of only certain phases as opposed to "removing" defects from all prior phases.

The embodiments of the present invention are not limited to the phases illustrated. Embodiments including subsets of the phases described above are contemplated, as well as embodiments including phases not explicitly disclosed.

Further, embodiments having phases in different orders are contemplated. For example, phases 12 and 13 can be performed before phases 10 and 11 in a preferred embodiment. By having different ordering of phases than disclosed herein may provide enhanced detection of certain defects.

Further, phases may be processed using different functions and modules than that illustrated. Not only are different weighting factors for different filters contemplated, but also different techniques for highlighting and locating different defects. Thus, many embodiments of the present invention are contemplated, and are known to one of ordinary skill in the art.

The presently claimed inventions may also be applied to other areas of technology such as cathode ray tube calibration and inspection systems, semiconductor wafer inspection and alignment systems, mask inspection systems, web inspection systems, lenticular lens inspection, metal inspection, textile inspection, surface particle inspection, glass substrate inspection, polarizer sheet inspection (for transmission characteristics, scratches, etc.), medical applications such as x-ray analysis (for cancer, mammograms), and the like.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for locating blobs in an image, the method comprising:
    forming a blob reference mask from the image, the blob reference mask including a portion indicating a portion of the image containing a first blob, if any;
    forming a reference image from the image, the reference image corresponding to the image;
    forming a modified image from the image by replacing the portion of the image containing the first blob, if any, with a portion of the reference image corresponding to the portion of the image; and
    locating a second blob in the image in response to the modified image.

2. The method of claim 1 further comprising:
    modifying the blob reference mask to include a portion indicating a portion of the image containing the second blob.

3. The method of claim 1 further comprising the:
    forming another modified image from the image by replacing the portion of the image containing the second blob, with a portion of the reference image corresponding to the portion of the image containing the second blob; and
    locating a third blob in the image in response to the another modified image.

4. The method of claim 3 wherein forming the another modified image further comprises:
    replacing the portion of the image containing the first blob, if any, with the portion of the reference image.

5. The method of claim 1 further comprising:
modifying the modified image by replacing the portion of the image containing the second blob, with a portion of the reference image corresponding to the portion of the image containing the second blob, and
locating a third blob in the image in response to the modified image.

6. The method of claim 1 wherein forming the reference image comprises performing an image processing function upon the image.

7. The method of claim 6 wherein performing the image processing function comprises performing morphological operations upon the image.

8. The method of claim 6 wherein performing the image processing function comprises performing a smoothing operation upon the image.

9. The method of claim 1 further comprising characterizing the second blob.

10. The method of claim 1 further comprising:
before the step of forming the modified image, performing the image processing function on the image.

11. A method for forming an image having reduced contrast blobs, the method comprising:
locating a blob at a portion of a first image, the blob having a first contrast relative to the first image;
forming a reference image from the first image, the reference image having a portion corresponding to the portion of the first image; and
forming a second image from the first image by replacing the portion of the first image with the portion of the reference image.

12. The method of claim 11 further comprising:
locating another blob at another portion of the first image, in response to the second image, the another blob having a second contrast relative to the first image;
wherein the reference image includes another portion corresponding the another portion of the first image; and
forming a third image from the first image by replacing the another portion of the first image with the another portion of the reference image.

13. The method of claim 12 wherein forming the third image further comprises:
replacing the portion of the first image with the portion of the reference image.

14. The method of claim 12 wherein the first contrast is greater than the second contrast.

15. The method of claim 12 wherein the first contrast comprises an absolute value of a difference between a value of at least one pixel in the portion of the first image and a value of at least one pixel in the portion of the reference image.

16. The method of claim 15 wherein the second contrast comprises an absolute value of a difference between a value of at least one pixel in the another portion of the first image and a value of at least one pixel in the another portion of the reference image.

17. The method of claim 11 wherein forming the reference image comprises performing an image processing function upon the first image.

18. The method of claim 17 wherein performing the image processing function comprises performing morphological operations upon the first image.

19. The method of claim 17 wherein performing the image processing function comprises performing a smoothing operation upon the first image.

20. The method of claim 11 further comprising characterizing the blob.

21. The method of claim 12 further comprising characterizing the another blob.

22. The method of claim 11 further comprising:
before the step of forming a second image from the first image, performing an image processing function on the first image.

23. The method of claim 11 wherein locating the blob in the first image comprises thresholding the first image.

24. The method of claim 12 wherein locating the blob in the first image comprises thresholding the first image at a first threshold; and
wherein locating the another blob in the first image comprises thresholding the second image at a second threshold, the second threshold lower than the first threshold.

25. A system for locating blobs in an image, the system comprising:
an image masking unit for forming a blob reference mask from the image, the blob reference mask including a portion indicating a portion of the image containing a first blob, if any;
a reference unit for forming a reference image from the image, the reference image corresponding to the image;
a modifying unit for forming a modified image from the image by replacing the portion of the image containing the first blob, if any, with a portion of the reference image corresponding to the portion of the image; and
a locating unit for locating a second blob in the image in response to the modified image.

26. A computer program product for a system including a plurality of processors for locating blobs in an image, each of the plurality of processors configurable into more than one group of processors, the computer system comprising:
a computer-readable memory including:
code that directs a first group of processors to form a blob reference mask from the image, the blob reference mask including a portion indicating a portion of the image containing a first blob, if any;
code that directs a second group of processors to form a reference image from the image, the reference image corresponding to the image;
code that directs a third group of processors to form a modified image from the image by replacing the portion of the image containing the first blob, if any, with a portion of the reference image corresponding to the portion of the image; and
code that directs a fourth group of processors to locate a second blob in the image in response to the modified image.

27. The system of claim 25 wherein the image masking unit is also configured to modify the blob reference mask to include a portion indicating a portion of the image containing the second blob.

28. The system of claim 25
wherein the modifying unit is also configured to form another modified image from the image by replacing the portion of the image containing the second blob, with a portion of the reference image corresponding to the portion of the image containing the second blob; and
wherein the location unit is also configured to locate a third blob in the image in response to the another modified image.

29. The system of claim 25 wherein the reference unit is also configured to perform an image processing function.

30. The system of claim 29 wherein the image processing function comprises a morphological operation.

31. The system of claim 29 wherein the image processing function comprises a smoothing operation upon the image.

32. The system of claim 25 further comprising a unit configured to characterize the second blob.

33. The computer program product of claim 26 wherein the computer-readable memory also includes:

code that directs group of processors to modify the blob reference mask to include a portion indicating a portion of the image containing the second blob.

34. The computer program product of claim 26 wherein the computer-readable memory also includes:

code that directs a fifth group of processors to form another modified image from the image by replacing the portion of the image containing the second blob, with a portion of the reference image corresponding to the portion to the image containing the second blob; and code that directs a sixth group of processor to locate a third blob in the image in response to the another modified image.

35. The computer program product of claim 26 wherein code that directs the fifth group of processors comprises code that directs the fifth group of processors to perform an image processing function upon the image.

36. The computer program product of claim 35 wherein the image processing function comprises a morphological operation.

37. The computer program product of claim 35 wherein the image processing function comprises a smoothing operation.

38. The computer program product of claim 26 wherein the computer-readable memory also includes code that direct a fifth group of processors to characterize the second blob.

* * * * *